US008162287B2

(12) United States Patent
Overman et al.

(10) Patent No.: US 8,162,287 B2
(45) Date of Patent: Apr. 24, 2012

(54) VALVE ASSEMBLY FOR MODULATING FUEL FLOW TO A GAS TURBINE ENGINE

(75) Inventors: Nicholas R. Overman, West Des Moines, IA (US); Jerry Lee Goeke, West Des Moines, IA (US)

(73) Assignee: Delavan Inc, West Des Moines, IA (US)

(*) Notice: Subject to any disclaimer, the term of this patent is extended or adjusted under 35 U.S.C. 154(b) by 884 days.

(21) Appl. No.: 12/284,380

(22) Filed: Sep. 22, 2008

(65) Prior Publication Data
US 2009/0026398 A1    Jan. 29, 2009

Related U.S. Application Data

(63) Continuation-in-part of application No. 11/321,203, filed on Dec. 29, 2005, now Pat. No. 7,665,305.

(51) Int. Cl.
*F16K 31/06* (2006.01)

(52) U.S. Cl. ............... 251/129.09; 251/129.11; 137/613; 137/637

(58) Field of Classification Search ............. 251/129.11, 251/129.09, 129.1, 208, 343, 344, 345; 137/613, 137/637
See application file for complete search history.

(56) References Cited

U.S. PATENT DOCUMENTS

| | | | |
|---|---|---|---|
| 374,072 A * | 11/1887 | Johnson | 251/129.09 |
| 579,249 A * | 3/1897 | Ackerman | 251/129.09 |
| 2,468,584 A | 4/1949 | Wotring | |
| 2,975,785 A | 3/1961 | Sheldon | |
| 3,352,155 A | 11/1967 | Penet | |
| 3,532,121 A | 10/1970 | Sturman et al. | |
| 3,689,773 A | 9/1972 | Wheeler | |
| 3,762,442 A | 10/1973 | Paul | |
| 3,772,540 A | 11/1973 | Benson | |
| 4,521,088 A | 6/1985 | Masom | |
| 4,709,155 A | 11/1987 | Yamaguchi et al. | |
| 4,909,212 A * | 3/1990 | Minowa et al. | 251/129.11 |
| 4,976,227 A | 12/1990 | Draper | |
| 5,051,631 A | 9/1991 | Anderson | |
| 5,071,105 A | 12/1991 | Donze et al. | |
| 5,242,150 A * | 9/1993 | Shiffler et al. | 251/209 |

(Continued)

FOREIGN PATENT DOCUMENTS

EP    0 638 770 A1    2/1995

(Continued)

OTHER PUBLICATIONS

U.S. Appl. No. 12/116,928, Goeke et al.

(Continued)

*Primary Examiner* — Eric Keasel
(74) *Attorney, Agent, or Firm* — Scott D. Wofsy; Edwards Wildman Palmer LLP

(57) ABSTRACT

A valve assembly for modulating fuel flow is disclosed which includes a valve housing having an inlet section and an outlet section, at least one valve rotor disposed between the inlet section and the outlet section for modulating fuel flow through the valve housing, wherein the at least one valve rotor is formed from a ferritic magnetic flux permeable material and is mounted for rotational movement within the valve housing, under the influence of a torsion spring, between first and second magnetically latched positions, and a pair of electromagnets means for alternately latching the at least one valve rotor in the first and second magnetically latched positions.

22 Claims, 31 Drawing Sheets

U.S. PATENT DOCUMENTS

| | | | |
|---|---|---|---|
| 5,257,496 | A | 11/1993 | Brown et al. |
| 5,303,684 | A | 4/1994 | Brown et al. |
| 5,404,709 | A | 4/1995 | Mac Lean et al. |
| 5,474,234 | A | 12/1995 | Maley |
| 5,488,340 | A | 1/1996 | Maley et al. |
| 5,608,515 | A | 3/1997 | Shu et al. |
| 5,784,300 | A | 7/1998 | Neumeier et al. |
| 5,791,889 | A | 8/1998 | Gemmen et al. |
| 5,797,266 | A | 8/1998 | Brocard et al. |
| 5,809,769 | A | 9/1998 | Richards et al. |
| 5,828,797 | A | 10/1998 | Minott et al. |
| 5,857,320 | A | 1/1999 | Amos et al. |
| 5,961,314 | A | 10/1999 | Myhre et al. |
| 6,058,709 | A | 5/2000 | Richards et al. |
| 6,059,560 | A | 5/2000 | Richards et al. |
| 6,142,665 | A | 11/2000 | Haffner et al. |
| 6,205,764 | B1 | 3/2001 | Hermann et al. |
| 6,205,765 | B1 | 3/2001 | Iasillo et al. |
| 6,244,291 | B1 | 6/2001 | Hughes |
| 6,454,548 | B2 | 9/2002 | Falk et al. |
| 6,517,045 | B1 | 2/2003 | Northedge |
| 6,566,158 | B2 | 5/2003 | Eriksen et al. |
| 6,598,621 | B1 | 7/2003 | Wygnanski |
| 6,640,548 | B2 | 11/2003 | Brushwood et al. |
| 6,672,071 | B2 | 1/2004 | Woltmann |
| 6,688,534 | B2 | 2/2004 | Bretz |
| 6,773,951 | B2 | 8/2004 | Eriksen et al. |
| 6,848,667 | B1 | 2/2005 | Wygnanski |
| 6,918,569 | B2 | 7/2005 | Jansen |
| 6,928,878 | B1 | 8/2005 | Eriksen et al. |
| 7,004,449 | B2 | 2/2006 | Jansen |
| 7,007,661 | B2 | 3/2006 | Warlick |
| 7,665,305 | B2 * | 2/2010 | Cornwell et al. ........ 137/599.07 |
| 2002/0125336 | A1 | 9/2002 | Bretz |
| 2002/0134138 | A1 | 9/2002 | Philipp et al. |
| 2003/0056490 | A1 | 3/2003 | Anderson et al. |
| 2003/0056517 | A1 | 3/2003 | Brushwood et al. |
| 2003/0155031 | A1 | 8/2003 | Barton et al. |
| 2004/0154300 | A1 | 8/2004 | Woltmann |
| 2005/0107942 | A1 | 5/2005 | Nomura et al. |
| 2005/0180699 | A1 | 8/2005 | Shu et al. |
| 2005/0189021 | A1 | 9/2005 | Wygnanski |
| 2005/0247066 | A1 | 11/2005 | Myhre |
| 2006/0000219 | A1 | 1/2006 | Myhre |
| 2006/0213200 | A1 | 9/2006 | Critchley et al. |
| 2006/0219968 | A1 | 10/2006 | Jansen |
| 2007/0119147 | A1 | 5/2007 | Cornwell et al. |
| 2007/0151252 | A1 * | 7/2007 | Cornwell et al. ............... 60/773 |
| 2008/0000214 | A1 | 1/2008 | Kothnur et al. |
| 2009/0013693 | A1 | 1/2009 | Ols et al. |
| 2009/0026398 | A1 | 1/2009 | Overman et al. |
| 2009/0049927 | A1 | 2/2009 | Spivak et al. |
| 2009/0077945 | A1 | 3/2009 | Cornwell et al. |

FOREIGN PATENT DOCUMENTS

| | | |
|---|---|---|
| EP | 0 816 760 A1 | 1/1998 |
| EP | 0 926 325 A2 | 6/1999 |
| EP | 1 559 887 A2 | 8/2005 |
| GB | 2 342 504 | 4/2000 |
| GB | 2 342 782 | 4/2000 |
| GB | 2 377 555 | 1/2003 |
| GB | 2 380 064 A | 3/2003 |
| GB | 2 380 065 A | 3/2003 |
| JP | 08-68573 | 3/1996 |
| WO | WO 99/30006 | 6/1999 |
| WO | WO 00/20786 | 4/2000 |
| WO | WO 02/086364 A1 | 10/2002 |
| WO | WO 03/102454 A | 12/2003 |
| WO | WO 2005/047670 A2 | 5/2005 |

OTHER PUBLICATIONS

U.S. Appl. No. 12/046,977, Williams et al.
U.S. Appl. No. 11/652,718, Myhre.
U.S. Appl. No. 12/368,472, Goeke et al.
Hermann et al.; "Active Instability Control (AIC) of Spray Combustors by Modulation of the Liquid Fuel Flow Rate"; Combust. Sci. and Tech., 1996, vol. 118, pp. 1-25.
Paschereit et al.; "Acoustic Control of Combustion Instabilities and Emissions in a Gas-Turbine Combustor"; Proceedings of the 1998 IEEE.
Haile et al.; "Characterization of a Liquid Fuel Injector under Continuous and Modulated Flow Conditions"; Part. Part. Syst. Charact. 15 (1998) 136-144.
Cohen et al.; "Active Control of Combustion Instability in a Liquid-Fueled Low-N0x Combustor"; Journal of Engineering for Gas Turbines and Power, Apr. 1999, vol. 121/281.
Heising et al.; "Periodic Liquid Fuel Sprays Combustion Processes and Their Damping of Combustion Instabilities"; American Institute of Aeronautics and Astronautics, 1999.
Johnson et al.; "Effects of Time Delay and System Noise Upon Active Control of Unstable Combustors"; American Institute of Aeronautics and Astronautics, 2001-0778.
Murugappan et al.; "Application of Extremum Seeking Controller for Suppression of Combustion Instabilities in Spray Combustion"; American Institute of Aeronautics and Astronautics, 2000-1025.
Magill et al.; "Combustion Dynamics and Control in Liquid-Fueled Direct Injection Systems"; American Institute of Aeronautics and Astronautics, 2000-1022.
Darling et al.; "Demonstration of Active Control of Combustion Instabilities on a Fuel-Scale Gas Trubine Combustor"; ASME Turbo Expo 2001, Jun. 4-7, 2001.
Wu et al.; "High Response Valve for Active Combustion Control"; Proceedings of ASME Turbo Expo 2001, Jun. 4-7, 2001.
Johnson et al.; "Demonstration of Active Control of Combustion Instabilities on a Full-Scale Gas Turbine Combustor"; American Society of Mechanical Engineers, Apr. 11, 2002.
Hoff, et al., Closed-Loop Combustion Control using OH Radical Emissions, Proceedings of ASME TURBOEXPO 2000, May 8-11, 2000, Munich Germany.
Natural Gas Fuel for General Electric Aircraft Derivative Gas Turbines in Industrial Applications, General Electric Company Marine & Industrial Engine Projects Department, Cincinnati, Ohio 45215, MID-TD-0001-1, Aug. 1985.
J.E. May; "Active Pattern Factor Control for Gas Turbine Engines", Published 1998 NASA. Available from http://www.grc.nasa.gov/WWW/RT/RT1997/5000/5540may.htm , Apr. 15, 1998 [cited based on URL content as of Jul. 9, 2009].
UK Intellectual Property Office Search Report dated Jan. 5, 2010.

* cited by examiner

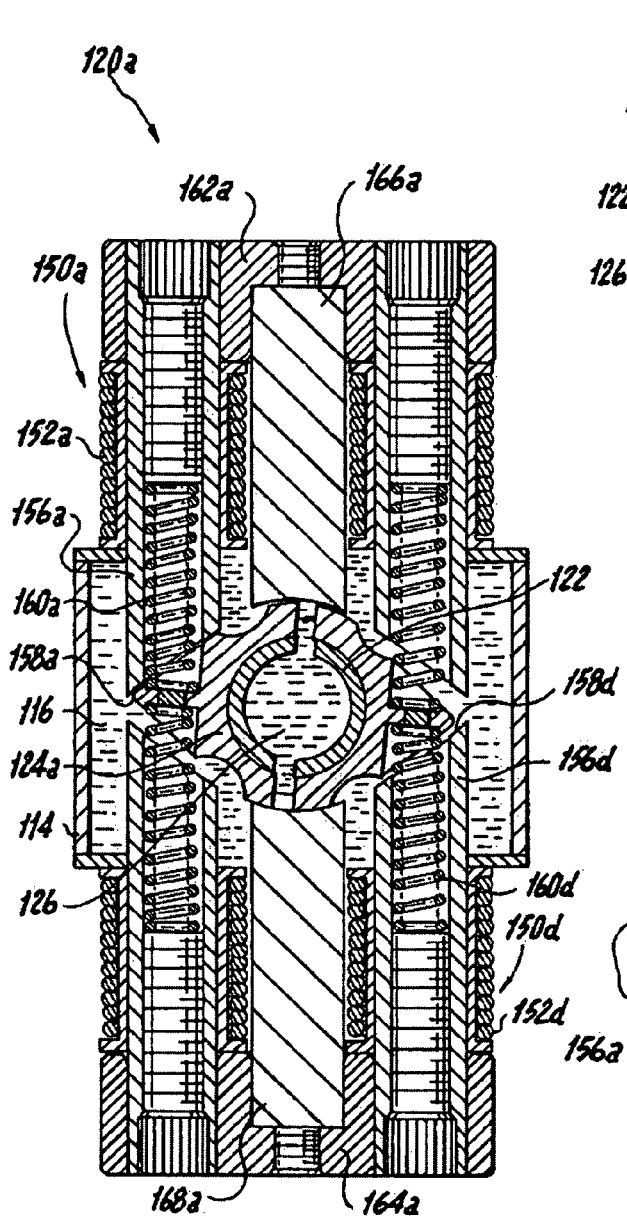
Fig. 7
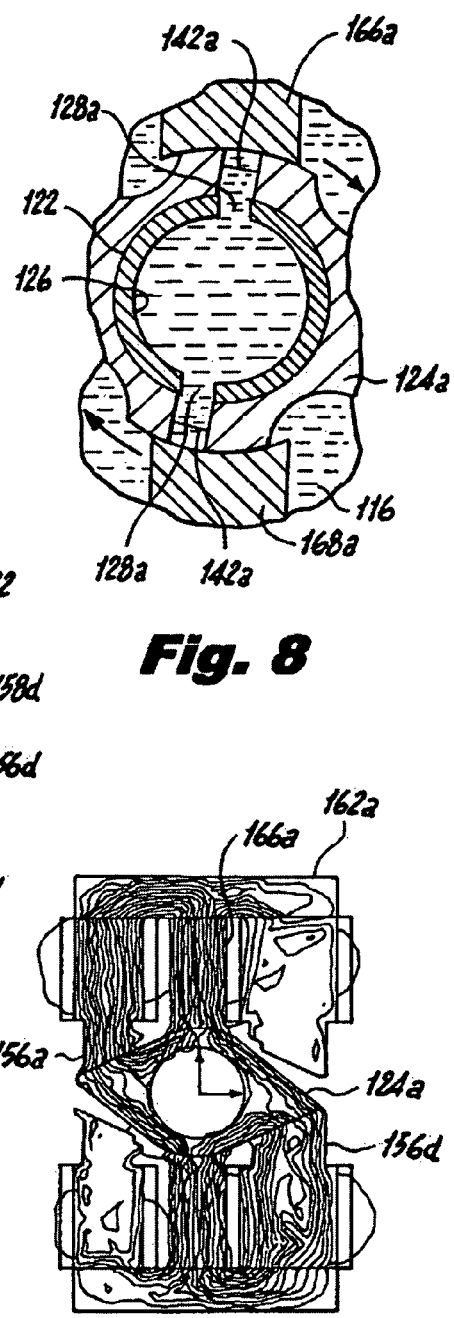
Fig. 8
Fig. 9

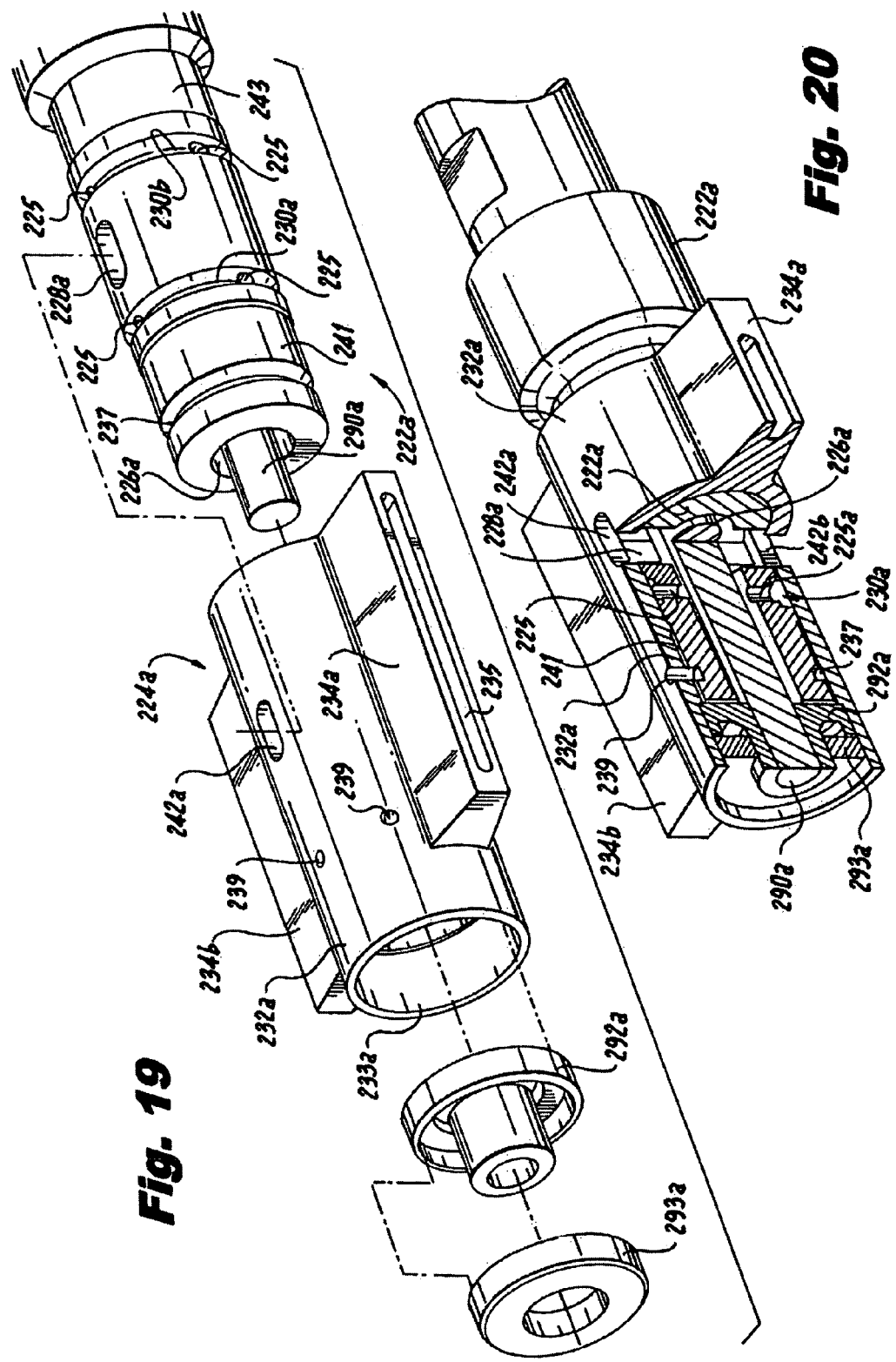

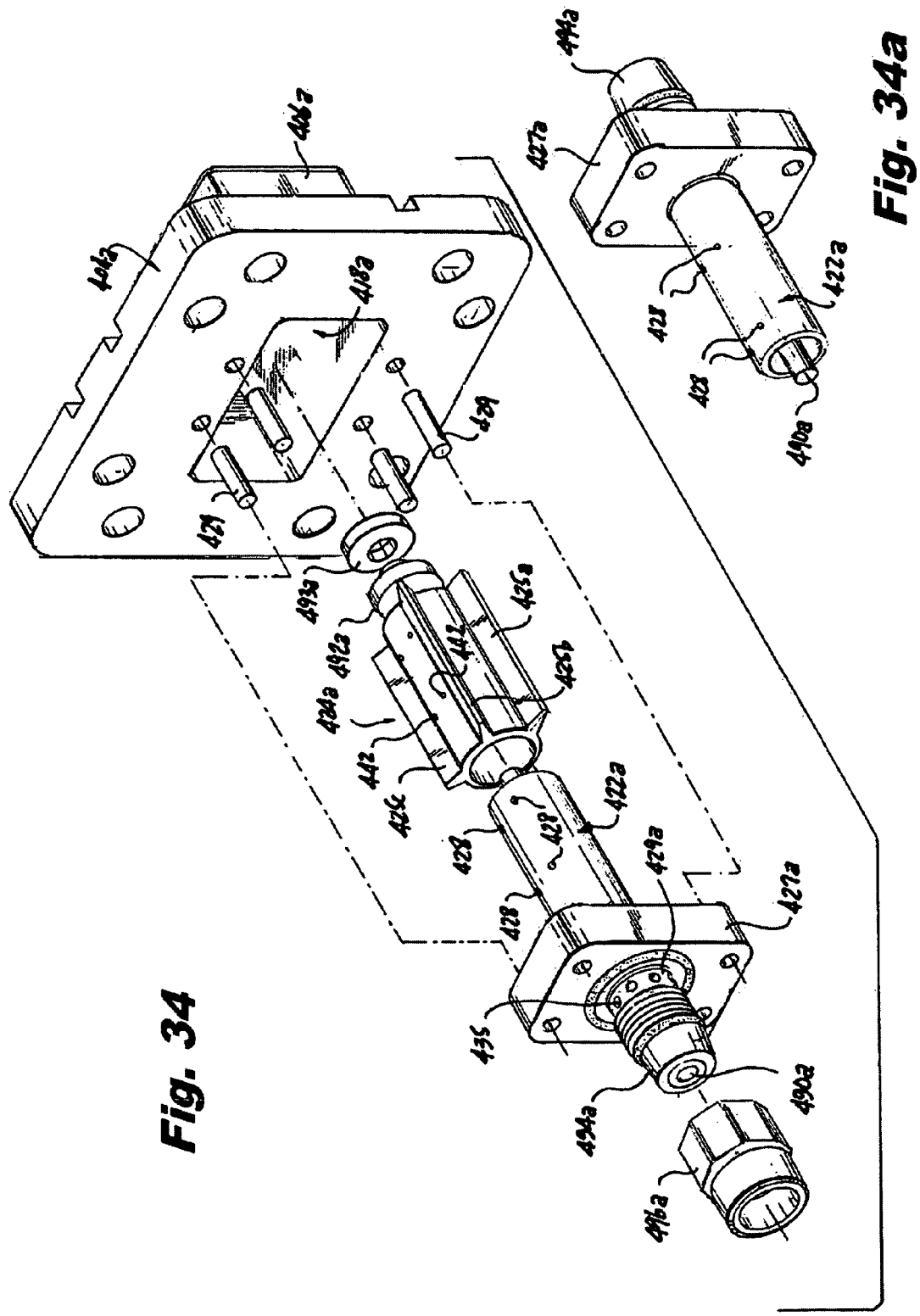

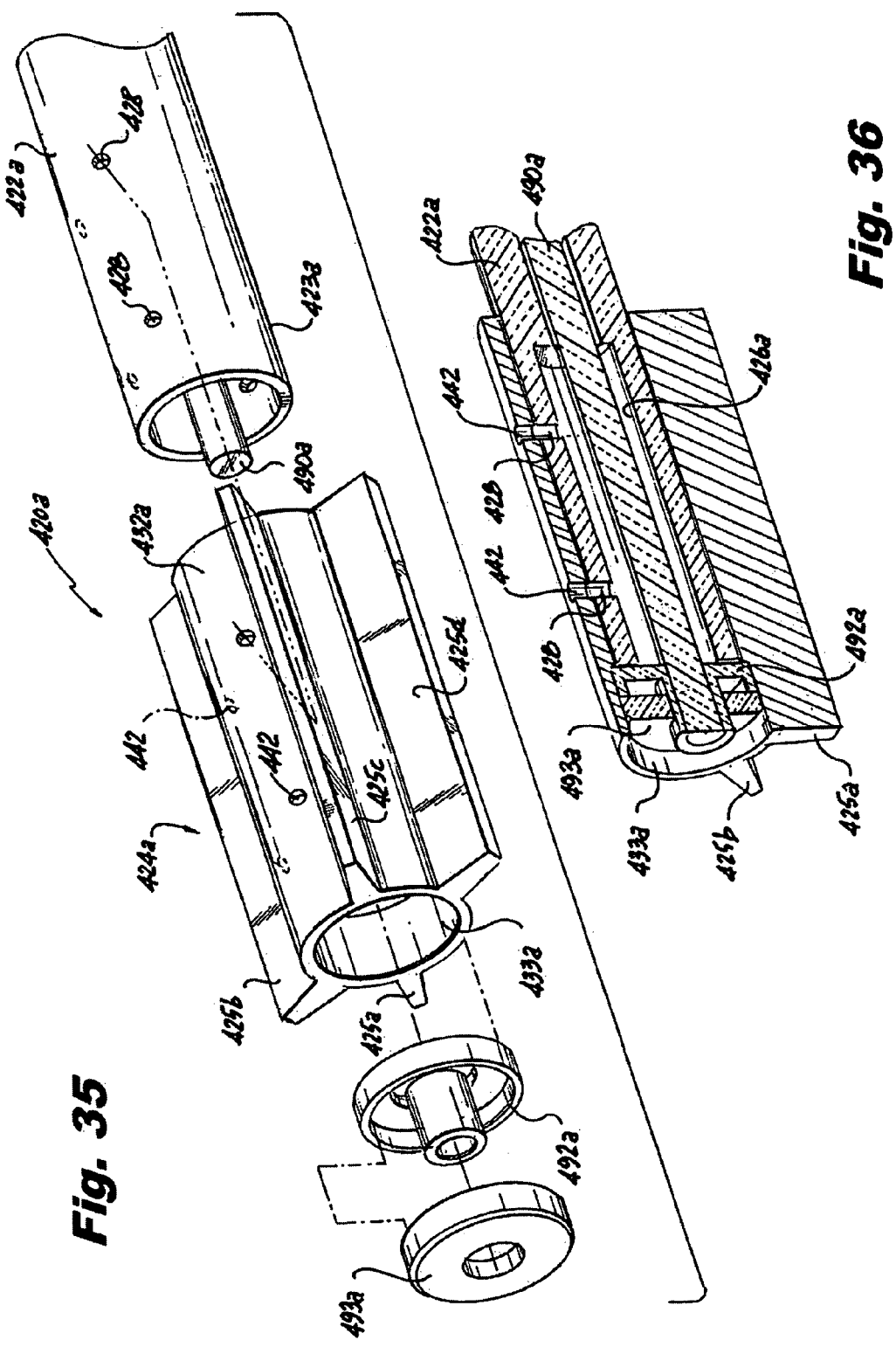

VALVE ASSEMBLY FOR MODULATING FUEL FLOW TO A GAS TURBINE ENGINE

CROSS-REFERENCE TO RELATED APPLICATION

This application is a continuation-in-part of U.S. application Ser. No. 11/321,203 filed Dec. 29, 2005, the disclosure of which is herein incorporated by reference in its entirety.

BACKGROUND OF THE INVENTION

1. Field of the Invention

The subject invention is directed to gas turbine engines, and more particularly, to a valve assembly for modulating the flow of fuel to the combustor of a gas turbine engine for actively controlling the combustion process to maintain combustion stability and otherwise optimize engine performance.

2. Background of the Related Art

Combustion instability is a significant problem in the design of low-emission, high performing combustion chambers for gas turbines. Combustion instability is generally understood as high amplitude pressure oscillations that occur as a result of the turbulent nature of the combustion process and the large volumetric energy release within the combustion chamber. Combustion instability diminishes engine system performance, and the vibrations resulting from pressure oscillations can damage hardware components, including the combustion chamber itself. Moreover, when the combustion heat release becomes in phase with and reinforces acoustic pressure waves, a thermo-acoustic instability results.

In the past, passive control methods were employed to correct combustion instability, including, for example, modifying the fuel injection distribution pattern, or changing the shape or capacity of the combustion chamber. Passive controls are often costly and limit combustor performance. More recently, active control methods have been used to correct combustion instability by modifying the pressure within the system. One way this can be done is by sensing the amplitudes and frequencies of acoustic pressure waves, and then modulating fuel injection at frequencies out of phase with the instabilities.

Currently, fuel injector flow rates are controlled by changing the fuel pressure feeding a common fuel manifold, with no individual control to each of the fuel injectors. For example, U.S. Pat. No. 6,672,071 discloses a combustion control system that includes a fuel pulsator communicating with a plurality of fuel injectors through a manifold. Fuel is pulsed to the injectors through the manifold at a frequency that promotes stable combustion.

Combustion stability could be achieved more effectively with active controls, if fuel flow could be modulated or pulsed at each fuel injector individually. Furthermore, if fuel flow could be pulsed to each fuel injector at high frequencies, the droplet size of fuel could be dramatically reduced, which would improve ignition and optimize engine performance.

It would be beneficial therefore, to provide a valve assembly for an active combustion control system for gas turbine engines, that is designed to modulate or otherwise command pulsed fuel flow to individual fuel injectors at relatively high frequencies on the order of 1000 Hz or more, so as to effectively stabilize combustion and otherwise optimize engine performance.

SUMMARY OF THE INVENTION

The subject invention is directed to a new and useful device for actively controlling fluid flow in a combustion system, and more particularly, to a unique valve assembly for modulating fuel flow to an individual fuel nozzle of a gas turbine engine to actively control combustion based on localized conditions detected within the engine's combustion chamber.

The valve assembly of the subject invention includes a valve housing having an inlet portion for receiving fuel from a fuel metering unit or other source at a given pressure and at an initial fuel flow rate, and an outlet portion for delivering fuel to a fuel nozzle at the initial fuel flow rate or at a modulated fuel flow rate depending upon a detected combustion condition, for example, a thermo-acoustic combustion instability resulting from pressure oscillations or a hot spot.

In instances where the valve assembly of the subject invention is employed to actively stabilize combustion, the fuel flow rate is modulated within a predefined range, preferably about an average fuel flow rate, in response to detected combustion instability. In instances where the valve assembly of the subject invention is employed to improve combustion efficiency by actively controlling the temperature pattern factor of the combustor, the fuel flow through the valve assembly can be maintained at a steady state flow rate, for example an average fuel flow rate, and can be actively decreased or otherwise modulated in response to a detected hot spot. Similarly, the fuel flow rate can be actively increased relative to a steady state flow rate in response to other detected combustion conditions, or to actively tune the engine over time.

The valve assembly of the subject invention further includes means disposed within the valve housing for modulating the flow rate of fuel delivered to the fuel nozzle based upon a detected combustion condition. In instances where the valve assembly is utilized to actively control combustion instabilities, the flow rate is modulated in proportion to the amplitude of detected combustion instabilities, preferably within a predetermined modulation range that extends between a minimum flow rate and the maximum flow rate.

Preferably, combustion instabilities and other combustion conditions are detected by a sensing device operatively associated with the combustion chamber of the engine, such as, an optical sensor that detects flame characteristics or a pressure sensor that detects pressure fluctuations within the combustion chamber. The sensor would communicate with a controller that commands the operation of the valve assembly. An example of a suitable optical sensing device for detecting combustion conditions is disclosed in U.S. Patent Application Publication No. 2005-0247066-A1, the disclosure of which is herein incorporated by reference in its entirety.

The means for modulating the flow rate of fuel delivered to a fuel injector includes at least one valve rotor that is mounted for oscillatory movement within the valve housing relative to a stator. In operation, the valve rotor moves between a first latched position wherein modulating fuel is admitted into the outlet portion of the valve housing and a second latched position wherein modulating fuel is not admitted into the outlet portion of the valve housing.

The valve rotor is formed from a ferritic magnetic flux permeable material, and is mounted for oscillatory movement within the valve housing between first and second magnetically latched positions. Similarly, the stator is also preferably formed from a ferritic magnetic flux permeable material. Therefore, the stator and rotor define a variable magnetic flux path within the valve assembly.

The means for modulating the flow rate of fuel further includes electromagnetic means for alternately latching the valve rotor in the first and second magnetically latched positions, and spring means for rapidly moving or otherwise accelerating the valve rotor from one magnetically latched position to another magnetically latched position.

Preferably, the valve rotor is mounted for oscillatory movement on an elongated valve shaft disposed within the valve housing. The valve rotor and valve shaft have corresponding fuel ports that are arranged so that when the valve rotor is in the first magnetically latched position, the fuel ports of the valve rotor communicate with the fuel ports of the valve shaft, and when the valve rotor is in the second magnetically latched position, the fuel ports of the valve rotor do not communicate with the fuel ports of the valve shaft.

The fuel ports in the valve shaft communicate with a fuel passage formed on the interior of the valve shaft so that when the valve rotor is in the first magnetically latched position, modulating fuel flows into the fuel passage in the valve shaft and is conducted to the outlet portion of the valve housing. When the valve rotor is in the second magnetically latched position, modulating fuel does not flow into the fuel passage. Preferably, the valve rotor is adapted for movement into a neutral position when the electromagnetic means are de-energized, such as in the event of a loss of power, so as to achieve a mean fuel flow condition that promotes safe engine operation.

The spring means for alternately moving or otherwise accelerating the valve rotor from one magnetically latched position to another magnetically latched position can take several different forms. For example, in one embodiment of the invention described herein, the spring means includes a plurality of coiled springs operatively associated with an exterior portion of the valve rotor. In another embodiment of the invention, the spring means includes a torsion spring operatively associated with an interior portion of the valve rotor. In yet another embodiment, the spring means includes a cantilever spring operatively associated with an exterior portion of the valve rotor. In accordance with the subject invention, the spring and rotor oscillate between magnetically latched positions at a natural frequency.

The electromagnetic means preferably includes alternating first and second magnetic flux paths. In accordance with the subject disclosure, the valve rotor rotates or otherwise moves in a first direction to the first magnetically latched position when the first magnetic flux path is energized and the valve rotor rotates or otherwise moves in a second direction to the second magnetically latched position when the second magnetic flux path is energized.

In one embodiment of the subject invention, the electromagnetic means include adjacent first and second upper electromagnetic coils and adjacent third and fourth lower electromagnetic coils. The first and third electromagnetic coils horizontally oppose one another and the second and fourth electromagnetic coils horizontally oppose one another, relative to a horizontal plane that extends through an axis of the valve shaft about which the valve rotor is mounted for oscillatory movement. The valve rotor moves in a first direction to the first magnetically latched position when the first and fourth electromagnetic coils are energized, and it moves in a second direction to the second magnetically latched position when the second and third electromagnetic coils are energized.

It is envisioned that the two alternating magnetic flux paths associated with the horizontally opposed electromagnetic coils can vary depending upon design choice. For example, it is envisioned that the two alternating flux paths could include a common radial return pole (e.g., a pole having an axis that lies within the same plane as the axes of the electromagnetic coils), a common axial return pole (e.g., a pole having an axis that extends perpendicular to the axes of the electromagnetic coils) or no common return pole at all. It is further envisioned and well within the scope of the subject disclosure that the electromagnetic means could include only two electromagnetic coils positioned beside one another or horizontally opposed to one another, in which cases there would be a single electromagnetic coil in each flux path. In such an instance, there may be no common return pole. In instance where there is no common return pole, the magnetic flux path may be defined by independent structural components of the valve housing.

The valve rotor has a generally cylindrical body portion configured for mounting on the valve shaft, and it has a pair of diametrically opposed paddles that extend radially outwardly from the body portion to interact with the electromagnetic means. Preferably, annular grooves are formed about the circumference of the valve shaft, in communication with the interior fuel passage formed therein, to establish a fluidic bearing between the exterior surface of the valve shaft and the interior surface of the cylindrical body portion of the valve rotor. The fluidic bearing supports rapid oscillatory movement of the valve rotor, reducing the frictional surface contact between the shaft and the rotor.

Preferably, to achieve a high degree of flow rate resolution within the modulation range of the device, a plurality of valve rotors are arranged within the valve housing, and each valve rotor is adapted and configured to produce a unique fuel flow condition relative to the valve shaft, in dependence upon the size of the corresponding fuel ports associated therewith. In one embodiment of the invention, four valve rotors are arranged within the valve housing, with each rotor producing a unique fuel flow condition, so that in total, for a single pressure, sixteen different fuel flow rates can be obtained within the range between the initial flow rate and the maximum flow rate. In one configuration of the valve assembly, the four valve rotors are mounted on a single valve shaft in axial succession, and in another configuration each of the four valve rotors are mounted on a separate valve shaft, with the separate valve shafts arranged in parallel.

The subject invention is further directed to a new and useful method for controlling the flow of fuel to a fuel nozzle to actively control combustion in an engine. The method includes the steps of receiving fuel at an initial flow rate, modulating the flow rate of the fuel in response to a detected combustion condition, and delivering the fuel to a fuel injector at the modulated flow rate.

The subject invention is further directed to a method for modulating the flow of fuel to a fuel nozzle to actively control combustion instabilities in a gas turbine engine. The method includes the steps of receiving fuel at an initial flow rate, modulating the initial flow rate of the fuel in proportion to an amplitude of a detected combustion instability, and delivering the fuel to a fuel injector at the modulated flow rate to correct the combustion instability. This method further includes the steps of detecting combustion instability within the combustion chamber of a gas turbine engine and commanding the valve assembly to modulate the fuel flow rate in proportion to the amplitude of the combustion instability.

The subject invention is also directed to a valve assembly wherein the first magnetic flux path is located on a first side of the valve rotor and the second magnetic flux path is located on a second side of the valve rotor, such that the first and second magnetic flux paths do not intersect one another. Moreover, neither magnetic flux path crosses through the center of the valve rotor. In this embodiment, the valve rotor has a generally cylindrical body portion and two pairs of diametrically opposed winglets that extend radially outwardly from the body portion to interact with two electromagnets associated therewith.

Preferably, the winglets of each pair of diametrically opposed winglets are spaced 30° apart from one another, and circumferentially adjacent winglets of diametrically opposed winglet pairs are spaced 60° apart from one another. Thus, the first magnetic flux path is defined at least in part by a first electromagnet and an adjacent pair of winglets of the valve rotor, and the second magnetic flux path is defined at least in part by a second electromagnet and an adjacent pair of winglets of the valve rotor.

These and other aspects of the latching oscillating valve assembly of the subject invention and methods of employing the same will become more readily apparent to those having ordinary skill in the art from the following detailed description of the invention taken in conjunction with the drawings.

BRIEF DESCRIPTION OF THE DRAWINGS

So that those having ordinary skill in the art to which the present invention pertains will more readily understand how to employ the oscillating latching valve assemblies of the present invention, embodiments thereof will be described in detail herein below with reference to the drawings, wherein:

FIG. 7 is a cross-sectional view of the valve of the four rotor assembly taken along line 5-5 of FIG. 1, illustrating the first valve rotor magnetically latched in a fully open position with the diagonally opposed first and third second coil springs compressed to store mechanical energy to accelerate the valve rotor towards the closed position of FIG. 10;

FIG. 8 is an enlarged localized view of the valve rotor as in FIG. 7, illustrating the relative positions of the opposed fuel transfer ports in the valve rotor and the opposed fuel inlet ports in the valve shaft, when the valve rotor is in an open position;

FIG. 9 is a schematic illustration of the magnetic flux lines flowing through the valve rotor and the upper and lower common radial stator poles of the valve housing to magnetically latch the valve rotor in the open position of FIGS. 7 and 8;

FIG. 19 is an exploded perspective view of the valve rotor and valve shaft shown in FIG. 18, with the torsion spring disposed within the central bore of the valve shaft;

FIG. 20 is an assembled perspective view in partial cross-section of the valve rotor and valve shaft of FIG. 19, illustrating the relationship between the two cooperating structures;

FIG. 31 is a perspective view of another valve assembly constructed in accordance with a preferred embodiment of the subject invention, wherein the magnetic circuits are arranged in a non-intersecting manner FIG. 32 is a perspective view of the valve assembly of FIG. 31, with a magnetic coil and associated supply/return plates separated from the valve housing form ease of illustration;

FIG. 34 is a partially exploded perspective view of one valve housing of the valve assembly of FIG. 34, showing a valve rotor and associated components;

FIG. 34a is a perspective view of the valve shaft shown in FIG. 34;

FIG. 35 is an exploded perspective view of a valve rotor assembly, as shown in FIG. 34, with parts separated for ease of illustration;

FIG. 36 is a cross-sectional view of a fully assembled valve rotor assembly, as shown in FIG. 35;

FIG. 45 is a cross-sectional view of the valve housing and rotor assembly shown in FIG. 41, with the valve rotor magnetically latched in a fully open position, against the bias of the torsion spring, as shown in FIG. 42a.

DETAILED DESCRIPTION OF THE PREFERRED EMBODIMENTS

Figure 1:
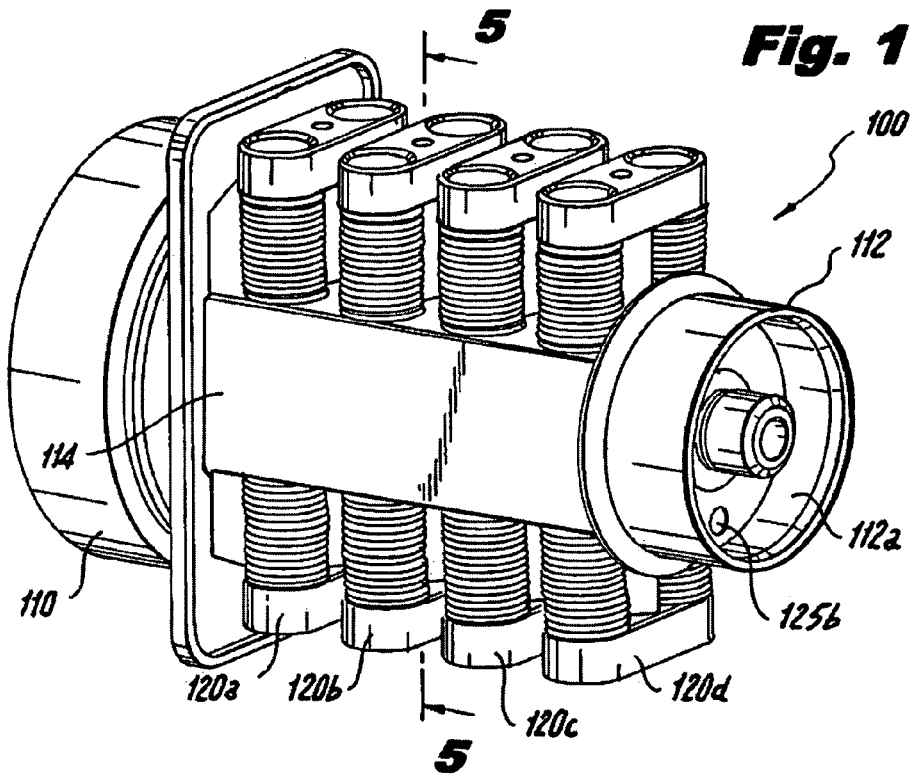
FIG. 1 is a perspective view of a first type of oscillating latching valve assembly constructed in accordance with a preferred embodiment of the subject invention, wherein four sets of electromagnetic coils are shown in a four rotor configuration.

The latching oscillating valve assemblies disclosed herein are intended for use in conjunction with an active combustion control system. Preferably, the active combustion control system is designed to reduce localized thermo-acoustic combustion instabilities within the combustion chamber of a gas turbine engine. In such instances, the valve assemblies disclosed herein can be employed to pulsate or otherwise modulate fuel flow to individual fuel injectors at extremely high frequencies in excess of about 1000 Hz in proportion to detected combustion instability.

The active combustion control system is also intended to lower engine emissions, improve engine dynamics and maximize operating efficiency. In such instances, the valve assemblies of the subject invention can be employed to trim or otherwise actively adjust fuel flow to individual injectors to control the temperature pattern factor in a combustor and thereby reduce hot spots and other detected combustion conditions. The valve assemblies could also be employed to self-tune an engine by actively adjusting localized fuel flow patterns over time, to maintain engine health.

It is envisioned that the valve assemblies disclosed herein could be used in conjunction with various types of fuel injectors, including for example, a two-stage fuel injector having main and pilot fuel flows. In such instances, the pilot fuel flow can be modulated or otherwise pulsed at high frequency relative to the main fuel flow to control combustion conditions.

Those skilled in the art will readily appreciate that the latching oscillating valve assemblies disclosed herein can be readily used in combustion applications outside the field of gas turbine technology. For example, the valve assemblies of the subject invention could be employed as pulse width modulation valves such as those that are found in automotive fuel injection systems.

Indeed, it is envisioned that the valve assemblies of the subject invention could be readily employed to modulate or otherwise pulse fluid flow at relatively high frequency in systems or processes outside the field of combustion technology. For example, valve assemblies as disclosed herein could find utility in applications within the chemical processing industry, such as, in fluid titration systems wherein a first process fluid is proportionally metered into a second process fluid in conjunction an active process control system. Other applications outside the field of combustion technology may include servo-vales for hydraulic systems or gaseous flow control valves in refrigeration systems.

In the description that follows, three different types of latching oscillating valve assemblies are disclosed for use in conjunction with an active combustion control system. Each valve assembly has a different construction, but all three function in a similar manner to actively control or otherwise modulate the flow of fuel to a fuel injector issuing fuel to the combustor of a gas turbine engine. The basic operational similarity between the three valve assemblies is that the valve members operate at a resonance frequency to minimize energy requirements. As will be discussed in more detail below, the energy used to oscillate a valve member of a disclosed valve assembly between operational positions is stored in a mechanical spring. The type of spring and the relative configuration of the valve assembly is what make each of the three valve assemblies different from one another.

In addition, the three valve assemblies are similar in that each valve member reverts to a mean or neutral fuel flow condition if there is a loss of power, and each valve assembly is designed so that the mean fuel flow does not shift when flow is modulated. In operation, the fuel modulation that is achieved by the valve assemblies of the subject invention is proportional to the amplitude of the combustion instability that is present in the combustor during operation. The amplitude of fuel modulation or the fuel flow rate is varied using multiple valve units operating in concert with each other, with each valve member in a particular valve assembly having a distinct fuel flow. The oscillation frequency of a valve member is varied by adjusting the time period during which the valve member is magnetically latched in an operational position, and phase is shifted by timing the release of the valve member from a latched position.

The three valve assemblies are designed to operate at a temperature of about 230° C. and at a very high operational frequency of about 1000 Hz or greater. The valves preferably have an operational life of about 30 billion cycles (i.e., 17,000 operational hours at 500 Hz). The valve assemblies have a maximum power consumption of about 40 Watts, and are designed to modulate 200 pph of fuel with at least a 1000 pph mean fuel flow. The valve assemblies are designed with fluidic or hydraulic bearings so that there is no metal-to-metal contact or friction with respect to the oscillating valve components and they have a mass that is preferably less than about 250 grams.

These and other features of the valve assemblies of the subject invention will become more readily apparent to those having ordinary skill in the art from the following detailed description of the preferred embodiments of the subject invention taken in conjunction with the drawings.

Latching Oscillating Valve Assembly with Coil Springs

A latching oscillating valve assembly having coil spring actuated valve members constructed in accordance with a preferred embodiment of the subject invention is illustrated in FIGS. 1 through 14 and is designated generally by reference numeral 100. Valve assembly 100, as discussed in more detail below, is illustrated and described as a four-bit valve assembly. In other words, the valve assembly is designed in a digital format in which each valve rotor operates in a binary or bit-like manner, having an open (or on) position and a closed (or off) position. Thus, as explained below, valve assembly 100 has four valves and sixteen ($2^4$) different operating positions to produce sixteen different fuel flow conditions for a single fuel flow pressure, providing a substantial degree of resolution to actively control combustion conditions.

However, those skilled in the art will ready appreciate from the following disclosure, that valve assembly 100 can be configured to produce a greater number of fuel flow conditions, to provide higher resolution and more precise control over the fuel flow conditions. For example, the valve assembly could be constructed as a six-bit system producing sixty-four ($2^6$) different fuel flow conditions. Conversely, the valve assembly can be configured to produce a fewer number of fuel flow conditions, to provided more gross control. For example, valve assembly 100 could simply comprise a one-bit system having two ($2^1$) distinct operating positions including a fully open position and a fully closed position, or a true binary valve.

Referring now to FIG. 1, valve assembly 100 has an inlet end portion 110 for receiving fuel upon demand from a fuel source, such as a fuel pump or fuel-metering device (not shown). Fuel is received by the inlet end portion 110 at a given pressure and at an initial flow rate. Valve assembly 100 also has an outlet end portion 112 that defines an annular fuel chamber 112a for delivering fuel to a fuel injection device (not shown). Fuel may be delivered from fuel chamber 112a at the initial fuel flow rate received at the inlet end portion 110 or at a modulated flow rate that differs from the initial flow rate. The modulated fuel flow rate is preferably within a predefined flow rate modulation range or regime, which extends between a minimum fuel flow rate (wherein the valve rotors are all fully closed) and a maximum fuel flow rate (wherein the valve rotors are all fully open) and preferably varies about an average fuel flow rate for the valve assembly.

In applications in which valve assembly 100 is employed to control combustion instabilities, the flow rate is modulated at a high frequency (pulsed fuel flow) so that the modulated flow rate is proportional to the amplitude of detected combustion instabilities. In applications in which valve assembly 100 is employed to control the thermal pattern factor within a combustion chamber of a gas turbine engine, the fuel flow rate can be actively adjusted or otherwise trimmed up or down relative to a steady-state or average fuel flow condition, to reduce or otherwise moderate a detected hot spot or the like. In such instances, the flow rate could be stepped up or down from a first steady-state condition corresponding, for example, to the valve assembly being in a neutral position to another steady-state condition in which the flow rate is increased or decreased relative to the flow rate obtained by having the valve assembly in a neutral position.

Valve assembly 100 includes four latching oscillating valve units or bits, which are arranged in longitudinal succession from the inlet end portion 110 to the outlet end portion 112. The valve units are housed within a valve casing 114 that defines an interior fuel chamber 116 (see e.g., FIG. 5). Fuel chamber 116 conveys by-pass flow (i.e., the primary fuel flow that by-passes the valve units) from the inlet end portion 110 to the outlet end portion 112. For ease of reference, the four valve units or bits of valve assembly 100 shall be designated in succession as valve units 120a through 120d.

As discussed in more detail below with respect to various drawings, each valve unit 120a-120d of valve assembly 100 includes, among other things, a valve rotor formed from flux permeable material and mounted for oscillatory movement on an elongated valve shaft between an open position and a closed position; two pairs of horizontally opposed electromagnets positioned in a manner so as to define diametrically opposed magnetic poles for magnetically latching the valve rotor in either the open position or the closed position depending upon which pair of electromagnets is energized; and four coil springs which provide the mechanical energy needed to accelerate or otherwise rapidly move the valve rotor between the open and closed positions when the valve member is unlatched from one diagonally opposed pair of electromagnets and attracted toward another diagonally opposed pair of electromagnets. The natural frequency of the valve rotor or the switching rate is preferably on the order of about 1000 Hz or more. It should be understood by those skilled in the art that the sole function of the electromagnets is the latching of the rotor, whereas the sole function of the coil springs is the rapid movement of the rotor between latched positions.

Figure 2:
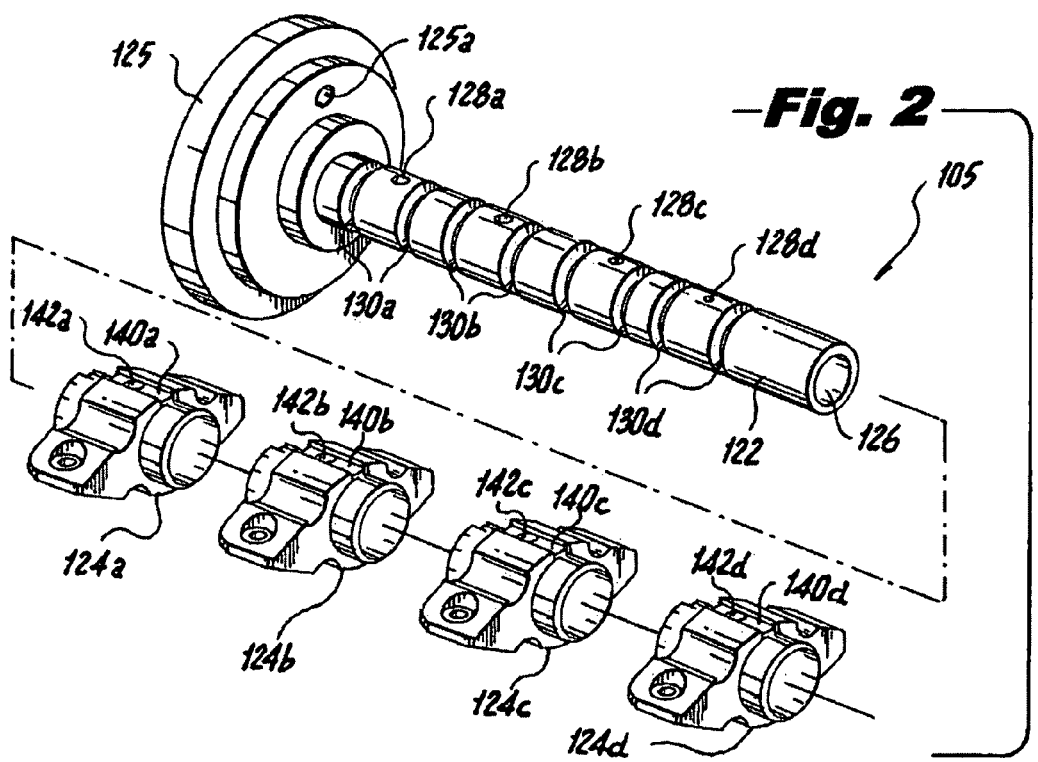
FIG. 2 is a perspective view of the valve shaft that defines the primary fuel conduit of the valve assembly of FIG. 1, and the four valve rotors that are rotatably supported on the valve shaft.

Referring to FIG. 2, valve assembly 100 includes a four-bit rotor assembly 105 consisting of an elongated cylindrical valve shaft 122 extending from an inlet plate 125 and forming a fuel tube or conduit. The inlet plate 125 has an axially offset fuel inlet port 125a, which delivers fuel into the primary fuel chamber 116 from the fuel source at a given pressure. Four rotatably supported valve rotors 124a-124d are supported on the valve shaft 122 in axial succession. Valve shaft 122 has a central fuel passage 126 that communicates with a series of four longitudinally spaced apart pairs of diametrically opposed radial fuel ports 128a through 128d.

In the disclosed embodiment of the valve assembly, the aperture size of the paired fuel ports 128a-128d decreases from the inlet end of fuel passage 126 to the outlet end of fuel passage 126, so that the inlet end fuel ports 128a have the largest relative aperture size and the outlet end fuel ports 128d have the smallest relative aperture size. More particularly, in accordance with the subject invention, as viewed in a downstream direction, from the inlet end to the outlet end, each successive pair of fuel ports in valve shaft 122 provides half the flow area of the next successive pair of opposed fuel ports. Thus, the flow area of fuel port pair 128b is half the flow area of fuel port pair 128a, the flow area of fuel port pair 128c is half the flow area of fuel port pair 128b, and the flow area of fuel port pair 128d is half the flow area of fuel port pair 128c. Those skilled in the art will readily appreciate that the aperture size and associated flow area of the fuel port pairs can vary from the presently disclosed configuration depending upon design choice and application. For example, each successive pair of opposed fuel ports could provide one-third the flow area of the next successive pair of opposed fuel ports, if required by a particular application. Alternatively, the flow areas of the fuel ports could be distributed along the valve shaft in an indiscrete manner.

Valve shaft 122 also includes four pairs of longitudinally spaced annular grooves 130a-130d. The annular groove pairs 130a-130d are in fluid communication with the central fuel passage 126 of valve shaft 122, as will be described in more detail below. Thus, each pair of annular grooves 130a-130d carries a given amount of fuel to form a fluidic bearing at or adjacent to each groove that supports the rotation of a respective valve rotor 124a-124d of rotor of the assembly relative to the outer circumferential surface of valve shaft 122. This serves to reduce the surface-to-surface contact between the valve rotors and the valve shaft.

Figure 3:
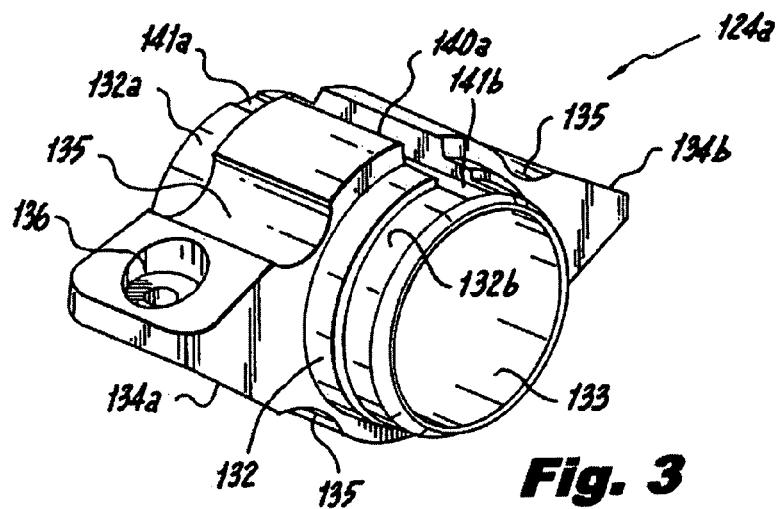
FIG. 3 is a perspective view of a valve rotor of the rotor assembly of FIG. 1.

With continuing reference to FIG. 2 in conjunction with FIG. 3, each valve rotor 124a-124d of valve assembly 100 has a central cylindrical body portion 132 with reduced diameter end portions 132a, 132b and a bore 133 that is dimensioned and configured to receive the valve shaft 122 in rotationally supporting relationship. Each valve rotor 124a-124d has a pair of laterally opposed wing portions 134a, 134b with sloping latching surfaces that are adapted and configured to cooperate with horizontally opposed latching surfaces of the four electromagnets. Each of the latching surfaces of wing portions 134a, 134b has a countersunk seat 136 to accommodate the end portion of a respective coil spring (not shown).

Recesses 135 are formed in the surfaces of the wing portions 134a, 134b to reduce the overall weight of the valve rotor and to accommodate the relative movement of the rotors with respect to adjacent stator structures located within the valve casing 114. The opposed wings 134a and 134b of each rotor 124a-124d are separated from one another by diametrically opposed longitudinally extending paired fuel feed slots 140a-140d. The opposed fuel feed slots in each valve rotor 124a-124d are dimensioned and configured to communicate with the main interior fuel chamber 116 of valve casing 114 (see FIG. 5). More particularly, as best seen in FIG. 3, each longitudinally extending fuel feed slot (i.e., slot 140a) has structurally unobstructed opposed end sections 141a, 141b respectively formed within the diametrically reduced body end sections 132a, 132b, which are in continuous fluid communication with the main interior fuel chamber 116. Thus, during operation, the fuel feed slots in the valve rotors are always filled with fuel for immediate admission into the fuel passage 126 of valve shaft 122 upon demand.

Figure 5:
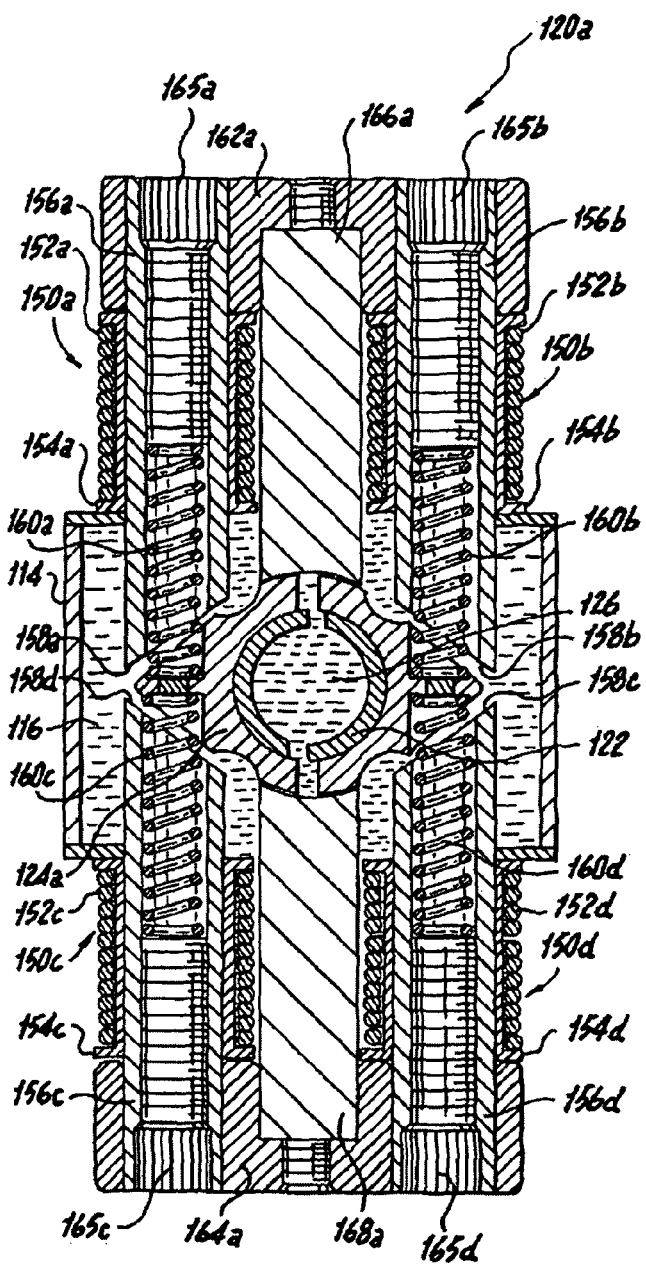
FIG. 5 is a cross-sectional view taken along line 5-5 of FIG. 1 illustrating the first valve rotor of the four-rotor assembly in a neutral unlatched position, which corresponds to mean fuel flow condition within the valve assembly.

Referring to FIGS. 2 and 5, formed within the fuel feed slot pairs 140a-140d of valve rotors 124a-124d are diametrically opposed paired fuel feed ports 142a-142d that are dimensioned and configured to cooperate with the corresponding diametrically opposed paired fuel port 128a-128d formed in valve shaft 122. Thus, for each successively positioned valve rotor, the aperture size of the paired fuel feed ports 142a-142d decreases from the inlet end of the valve shaft to the outlet end of the valve shaft. More particularly, the valve rotor located closest to the inlet end of the valve shaft (i.e., valve rotor 124a) has the largest fuel feed ports, which the valve rotor closest to the outlet end of the valve shaft (i.e., valve rotor 124d) has the smallest fuel feed ports. These aperture size differentials correspond directly to the aperture size differentials of the diametrically opposed fuel inlet port pairs formed in valve shaft 122, with each successive pair of fuel feed ports providing half the flow area of a preceding pair of fuel feed ports. Those skilled in the art will readily appreciate that the size and/or dimensions of the fuel ports in the valve rotors could vary in the manner described above with respect to the fuel ports in the valve shaft.

Figure 4:
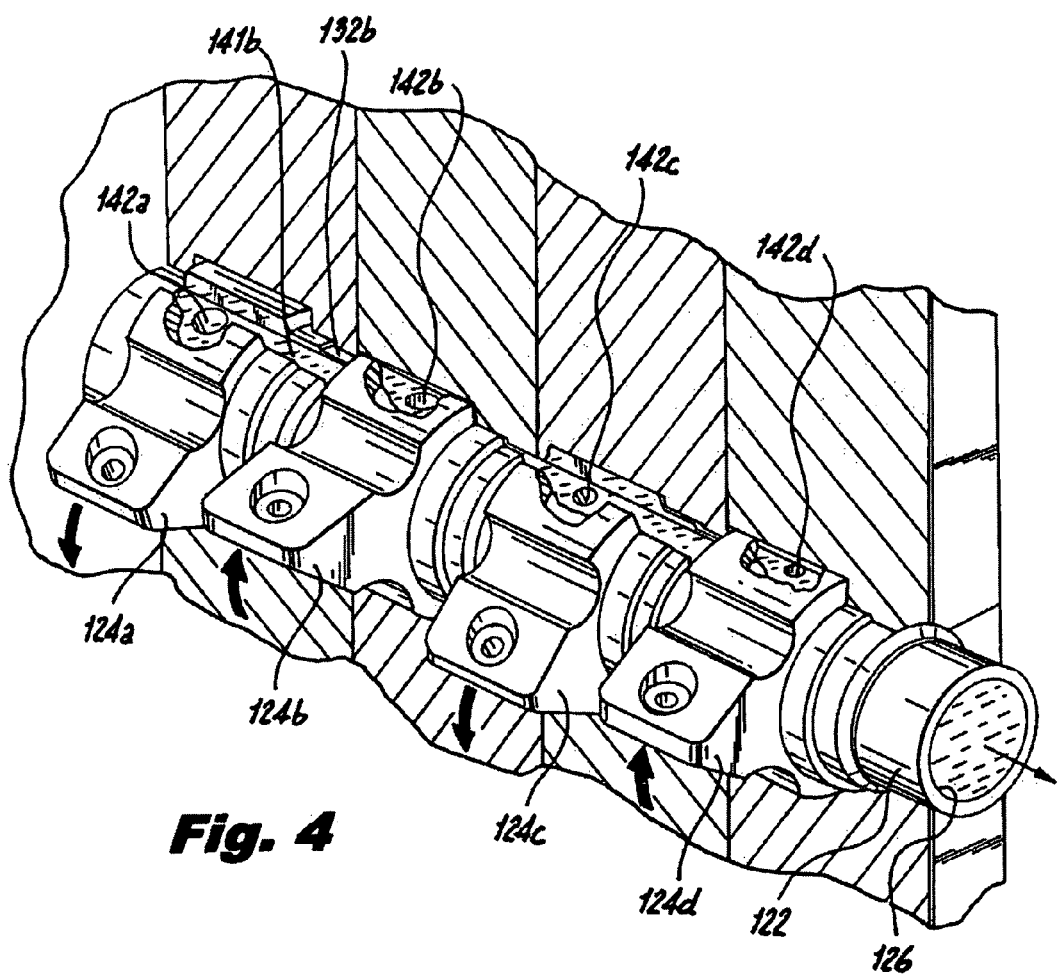
FIG. 4 is a perspective view in cross-section, of a portion of the valve assembly of FIG. 1, wherein the four valve rotors of the rotor assembly are positioned in a manner to achieve a desired modulated fuel flow condition, wherein the first and third valve rotors are rotated in a first or counter-clockwise direction to a closed position and the second and fourth rotors are rotated in a second or clockwise direction to an open position.

As best shown in FIG. 4, in a manner described in more detail below, the valve rotors 124a-124d oscillate between magnetically latched open and closed positions about the outer periphery of valve shaft 122. This enables the paired fuel feed ports 142a-142d in the valve rotors 124a-124d to move into and out of fluid communication with the corresponding paired fuel port 128a-128d formed in valve shaft 122 (see FIG. 2), so as to actively modulate the amount of fuel flowing through the central fuel passage 126 of valve shaft 122.

Thus, with reference to FIGS. 1 and 2, as fuel flows at a given pressure and at an initial flow rate from the fuel inlet port 125a of inlet plate 125, into the interior fuel chamber 116 of casing 114, through the fuel outlet port 125b of outlet end portion 112 and into the outlet chamber 112a, the four valve assembly 105 can be operated, preferably at a high frequency (e.g., 1000 Hz or more) to modulate the flow rate of the fuel delivered to a fuel injector within a predetermined modulation range. This is achieved by delivering a demanded amount of modulating fuel from fuel chamber 116 of casing 114 (see FIG. 5) into the outlet chamber 112a of outlet end portion 112 by way of the central fuel passage 126 of valve shaft 122. The demanded amount of modulating fuel from the central fuel passage 126 of valve shaft 122 merges with the primary (or by-passed) fuel flow from the outlet port 125b of interior fuel chamber 116 within the outlet chamber 112a of outlet end portion 112. This merged or combined modulated fuel flow is then delivered from outlet chamber 112a to a fuel injector communicating with valve assembly 100.

More particularly, when the four valve rotors 124a-124d of the rotor assembly 105 are all magnetically latched in a closed position, so that there is no fluid communication between the fuel feed port pairs 142a-142d of valve rotors 124a-124d and the fuel port pairs 128a-128d of valve shaft 122, the fuel flow rate through the valve assembly 100 corresponds to the minimum fuel flow rate for the system. In contrast, when the four valve members 124*a*-124*d* of the four-bit rotor assembly 105 are all magnetically latched in an open position, so that there is complete fluid communication between the fuel feed port pairs 142*a*-142*d* of valve rotors 124*a*-124*d* and the fuel port pairs 128*a*-128*d* of valve shaft 122, the fuel flow rate through valve assembly 100 corresponds to the maximum fuel flow rate for the system.

It follows therefore, that in any commanded combination of valve rotor positions, of which there are fourteen in a four valve assembly, in addition to the fully open position and the fully closed position, the flow rate of fuel delivered to a fuel injector associated with the valve assembly will vary between the minimum and maximum fuel flow rates, within a predefined flow rate modulation range. Preferably, the modulated fuel flow rate varies about an average fuel flow rate for the system.

Those skilled in the art will readily appreciate that the magnitude of the fuel modulation range can vary depending upon the operating conditions of the fuel control system and the engine with which the valve assembly is employed. For example, the valve assembly could be designed so that the fuel rate modulation range would be about 30%. It is also envisioned that resolution within the modulation range of the valve assembly can be increased relative to a four-bit valve assembly by providing additional valve units in accordance with the above teachings. Thus, for example, a six-bit valve assembly having six valve rotors of varying flow area could produce sixty-four different fuel flow conditions for a single pressure.

An example of an intermediate fuel modulation condition for the four-valve assembly 100 is shown in FIG. 4. In this instance, the first valve rotor 124*a* and the third valve rotor 124*c* are latched in an open position (see also FIGS. 7-9), while the second valve rotor 124*b* and the fourth valve rotor 124*d* are latched in a closed position (see also FIGS. 10-12). Consequently, fuel is delivered through the fuel feed ports 142*a* and 142*c* of valve rotors 124*a* and 124*c*, respectively, to the correspondingly positioned fuel inlet ports 128*a* and 128*c* and into the fuel passage 126 of valve shaft 122, whereas fuel is not delivered through the fuel feed ports 142*b* and 142*d* of valve rotors 124*b* and 124*d* to the correspondingly positioned fuel inlet ports 128*b* and 128*d* of fuel tube 122.

The exemplary valve arrangement illustrated in FIG. 4 could correspond to a commanded operating condition in which the amount of modulating fuel admitted into the fuel passage 126 of valve shaft 122 by valve rotors 124*a*, 124*c* is proportional to detected combustion instability within the combustion chamber of the gas turbine engine with which the valve assembly is associated. In which case, the valve would open or close at a commanded frequency out of phase with the instability.

Alternatively, the exemplary valve arrangement of FIG. 4 could correspond to a steady-state reduced or trimmed fuel flow condition relative to a steady-state or average fuel flow condition, which is commanded in response to a detected hot spot in the combustion chamber. It follows too, that the exemplary valve arrangement could correspond to an increased fuel flow condition relative to a steady state or average fuel flow condition, which corresponds to a demanded fuel flow condition needed to tune the engine relative to a detected combustion condition. Those skilled in the art will readily appreciate that although the valve assembly of the subject invention can be utilized to pulse or otherwise modulate fuel at high frequencies, it may also be used to modulate fuel flow by stepping from one steady-state fuel flow condition to another steady state fuel flow condition.

Referring now to FIG. 5, by way of example, valve unit 120*a* includes four electromagnets 150*a*-150*d* that are individually connected to a source of current. Each electromagnet includes a coiled winding 152*a*-152*d* supported on a bobbin 154*a*-154*d* and surrounding a magnetic pole piece 156*a*-156*d*. Diagonally opposed pole pieces define coordinating magnetic flux paths, such that pole pieces 156*a* and 156*d* define part of a first magnetic flux path, and pole pieces 156*b* and 156*c* define part of a second magnetic flux path that is distinct from the first. The magnetic pole pieces 156*a*-156*d* each define a sloping magnetic latching surface 158*a*-158*d* for interacting magnetically with the sloping latching surfaces of the laterally opposed wings 134*a*, 134*b* of valve rotor 124*a*, as described in more detail herein below.

Each of the four valve units or bits 120*a*-120*d* of valve assembly 100 also includes four coil springs 160*a*-160*d*, which are individually supported within corresponding pole pieces 156*a*-156*d*. The inward end portion of each coil spring 160*a*-160*d* is accommodated or otherwise supported within the corresponding countersunk seats 136 formed in the latching surfaces of the opposed wings 134*a*, 134*b* of the valve rotor 124*a*. The coil springs are maintained within the pole pieces by respective threaded fasteners 165*a*-165*d*. Coil springs 160*a*-160*d* store mechanical energy to accelerate or otherwise move the valve rotor 124*a* between open and closed magnetically latched positions, as described in more detail herein below.

Figure 6:
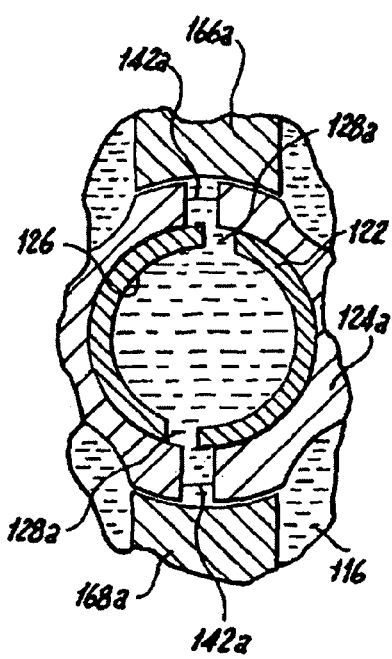
FIG. 6 is an enlarged localized view of the valve rotor in the position shown in FIG. 5, illustrating the relative positions of the opposed fuel transfer ports in the valve rotor and the opposed fuel inlet ports in the valve shaft, when the valve rotor is in a neutral position.

In FIG. 5, valve rotor 124*a* is depicted in an unlatched neutral position, which occurs if there is a loss of power and none of the four electromagnets 150*a*-150*d* associated with the valve rotor are energized. This condition corresponds to a mean fuel flow condition for valve unit 120*a*, wherein the valve rotor 124*a* is partially open, as best seen in FIG. 6. Consequently, in the unlikely case of a power failure, the flow of fuel through valve assembly 100 will be maintained at a reliable level, since the opposed fuel feed ports 142*a* of the valve rotor 124*a* are partially aligned with the opposed fuel inlet ports 128*a* in valve shaft 122, and combustion will continue to take place in the engine. This condition will occur in each valve unit 120*a*-120*d* so that a mean or neutral flow rate will be attained for valve assembly 100.

Referring to FIGS. 7 through 9, valve unit 120*a* is shown with the valve rotor 124*a* in an open position. When the valve rotor 124*a* is in this open position, it is rotated in a first direction (e.g., a clockwise direction) from the partially open/closed neutral position shown in FIG. 5. Accordingly, the opposed fuel feed ports 142*a* of valve rotor 124*a* are wholly aligned with the opposed fuel inlet ports 128*a* of valve shaft 122, as best seen in FIG. 8, so that a demanded amount of modulating fuel can flow from the interior fuel chamber 116 of valve casing 114 into the fuel passage 126 of valve shaft 122. In this position, the electromagnets 150*a* and 150*d* of valve unit 120*a* are energized so that valve rotor 124*a* is magnetically latched with respect to the diagonally opposed latching surfaces 158*a* and 158*d* of pole pieces 156*a* and 156*d*, respectively. In this instance, as depicted in FIG. 9, the magnetic flux field that serves to latch the valve rotor 124*a* in the open position flows between diagonally opposed pole pieces 156*a* and 156*d* by traveling through a path defined in large part by the valve rotor 124*a* itself, an upper end cap 162*a*, a lower end cap 164*a*, an upper central stator 166*a* and a lower central stator 168*a*.

When the valve rotor 124*a* is magnetically latched in this open position, diagonally opposed coil springs 160*a* and 160*d* are compressed, thus storing mechanical energy. The stored mechanical energy in coil springs 160*a* and 160*d* is sufficient to accelerate or otherwise rapidly move the valve rotor 124a toward the closed position of FIG. 10 when it is unlatched and diagonally opposed electromagnets 150b and 150c are concomitantly energized. This oscillation occurs at the natural frequency of the rotor and spring system. The torque produced by the coil springs 160a and 160d in a compressed state is not sufficient however, to overcome the magnetic latching forces holding the valve rotor 124a in the open position of FIG. 7.

Figure 10:
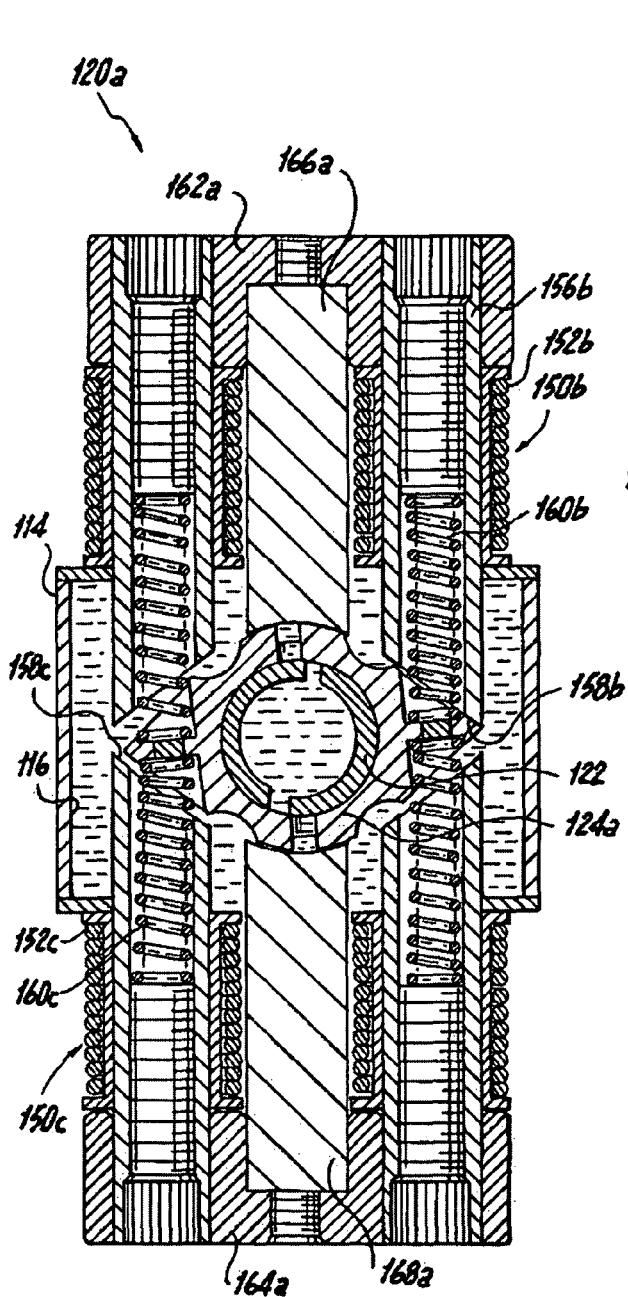
FIG. 10 is a cross-sectional view of the valve of the four rotor assembly taken along line 5-5 of FIG. 1, illustrating the first valve rotor magnetically latched in a fully closed position with the diagonally opposed second and fourth coil springs compressed to store mechanical energy to accelerate the valve rotor towards the open position of FIG. 7.
Figure 11:
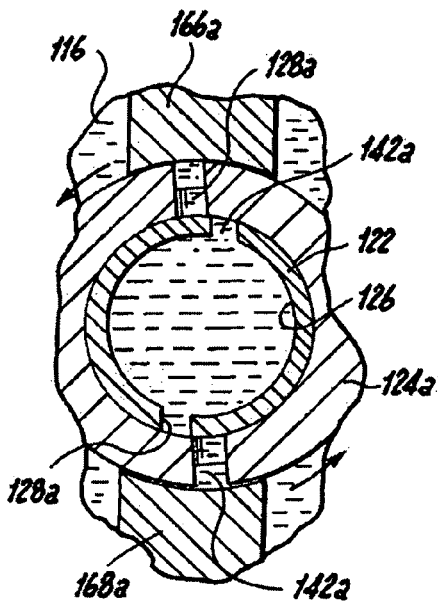
FIG. 11 is an enlarged localized view of the valve rotor as in FIG. 10, illustrating the relative positions of the opposed fuel transfer ports in the valve rotor and the opposed fuel inlet ports in the valve shaft, when the valve rotor is in a closed position.
Figure 12:
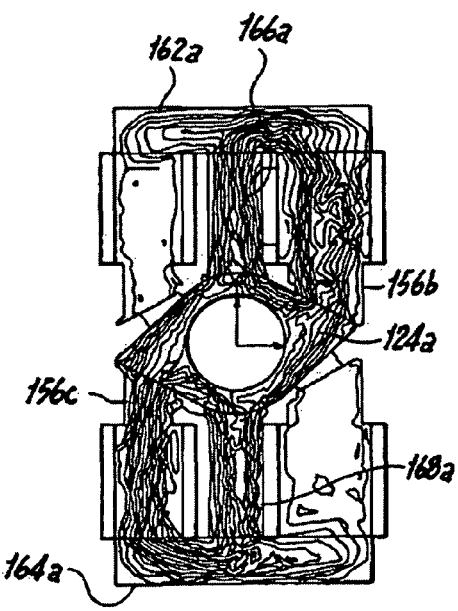
FIG. 12 is a schematic illustration of the magnetic flux lines flowing through the valve rotor and the upper and lower common radial stator poles of the valve housing to magnetically latch the valve rotor in the closed position of FIGS. 9 and 10.

Referring now to FIGS. 10 through 12, valve unit 120a is shown with the valve rotor 124a in a closed position. When the rotor 124a is in this closed position, it is rotated in a second direction (e.g., a counter-clockwise direction) from the neutral position shown in FIG. 5. Accordingly, the opposed fuel feed ports 142a of valve rotor 124a are not in fluid communication with the opposed fuel inlet ports 128a in valve shaft 122, as shown in FIG. 11, so modulating fuel cannot flow from the interior fuel chamber 116 to the fuel passage 126 of valve shaft 122. In this position, the diagonally opposed electromagnets 150b and 150c are energized so that valve rotor 124a is magnetically latched with respect to the diagonally opposed latching surfaces 158b and 158c of pole pieces 156b and 156c, respectively. In this instance, as depicted in FIG. 12, the magnetic flux field that serves to latch the valve rotor 124a in the open position, flows between pole pieces 156b and 156c by traveling through a path defined by the valve rotor 124a itself, upper end cap 162a, lower end cap 164a, upper stator 166a and lower stator 168a.

When the valve rotor 124a is magnetically latched in this closed position, diagonally opposed coil springs 160b and 160c are compressed, thus storing mechanical energy. The stored mechanical energy in coiled springs 160b and 160c is sufficient to accelerate or otherwise rapidly move the valve rotor 124a toward the open position when it is unlatched and electromagnets 156a and 156d are concomitantly energized. The torque produced by the compressed coil springs 160b and 160c is insufficient however, to overcome the magnetic latching force holding rotor 124a in this closed position of FIG. 10.

Figure 13:
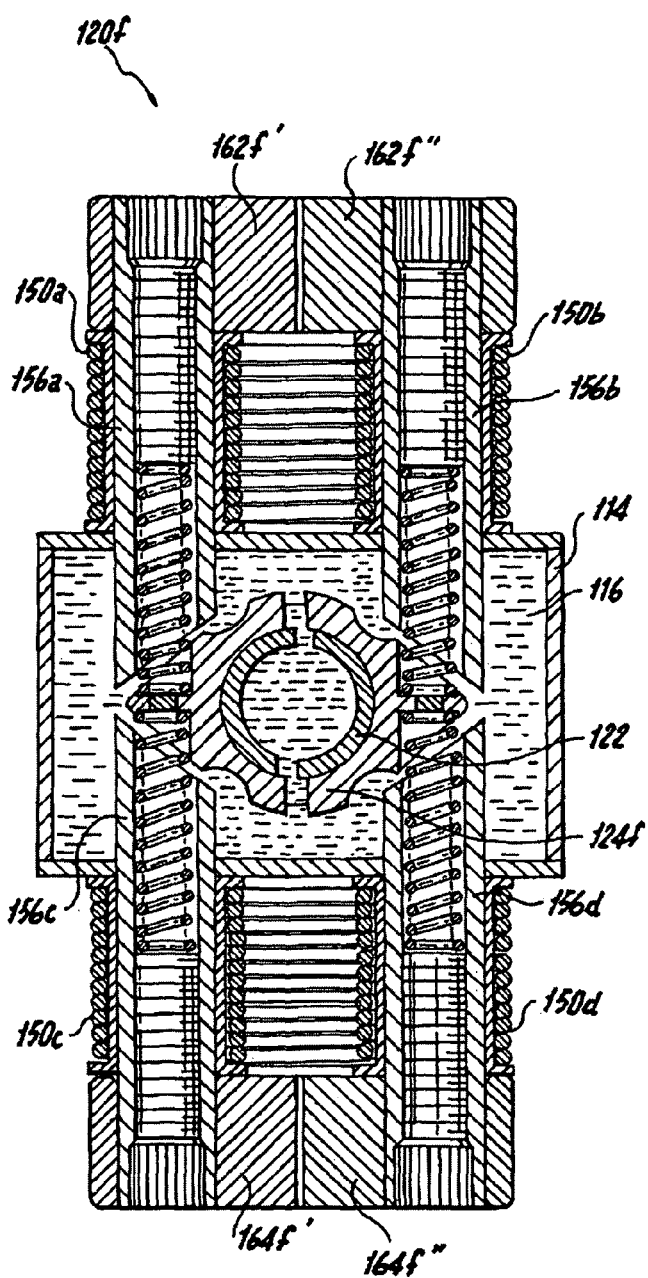
FIG. 13 is a cross-sectional view of an alternative embodiment of the valve assembly of FIG. 5, wherein the valve stator housing is without common radial stator poles to reduce the overall weight of the valve assembly.
Figure 14:
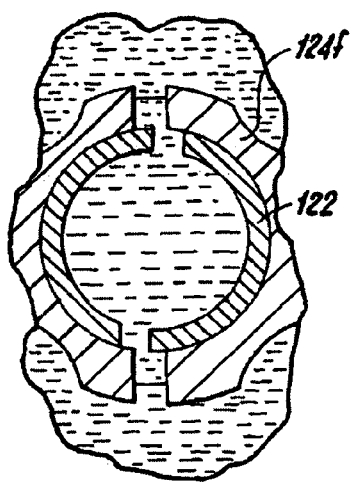
FIG. 14 is an enlarged localized view of the valve rotor shown in FIG. 13 in a neutral position corresponding to a mean fuel flow condition.

Referring now to FIGS. 13 and 14, there is illustrated another embodiment of a coil spring actuated valve unit constructed in accordance with a preferred embodiment of the subject invention, which is designated generally by reference numeral 120f. Valve unit 120f is shown in a mean fuel flow position, wherein the valve rotor 124f is disposed in a partially open condition with respect to valve shaft 122. Valve unit 120f is substantially identical to valve units 120a-120d of valve assembly 100 in all respects, except that valve unit 120f does not include the upper and lower stators 166a, 168a of valve unit 120a, shown for example in FIG. 5.

In this instance, the magnetic flux path for both of the energized states of the electromagnets 150a-150d shown for example in FIGS. 9 and 12 is formed at least in part by the valve rotor 124f, and the end caps (162f', 162f'') and (164f', 164f'') and the pole pieces 156a-156d. More particularly, a first flux path is defined by diagonally opposed end caps 162f' and 164f'', diagonally opposed pole pieces 156a and 156d, and valve rotor 124f. A second flux path is defined by diagonally opposed end caps 162f'' and 164f', diagonally opposed pole pieces 156b and 156c, and valve rotor 124f. The remainder of the alternative flux paths, while not shown, may be formed by part of the valve casing or by other means such as flux permeable return straps. Consequently, the overall mass of valve unit 120f is reduced as compared to the mass of a valve 120a. It is also envisioned, although not shown herein, that a valve unit of the valve assembly can include only two electromagnets, as opposed to four. In such an instance, the magnetic flux path for each energized state would include only one electromagnet and associated pole piece. A respective structurally isolated portion of the valve casing, which communicates with a respective pole piece, would further define each magnetic flux path. The valve rotor would not form part of the flux path. This arrangement would further reduce the mass of the valve.

Latching Oscillating Valve Assembly with Torsion Spring

A latching oscillating valve assembly having torsion spring actuated valve members constructed in accordance with a preferred embodiment of the subject invention is illustrated in FIGS. 15 through 25 and is designated generally by reference numeral 200. Valve assembly 200 is illustrated and described as a two-valve (two-bit) assembly. Thus, as explained below, valve assembly 200 has eight different operating positions to produce four ($2^2$) different fuel flow conditions for a single fuel flow pressure. The two valve assembly 200 is adapted and configured to cooperatively join together with one or more additional two-bit valve assemblies, as shown for example in FIGS. 26 and 27, to produce sixteen or more different fuel flow conditions for a single fuel flow pressure, as explained in more detail herein below.

Figure 15:
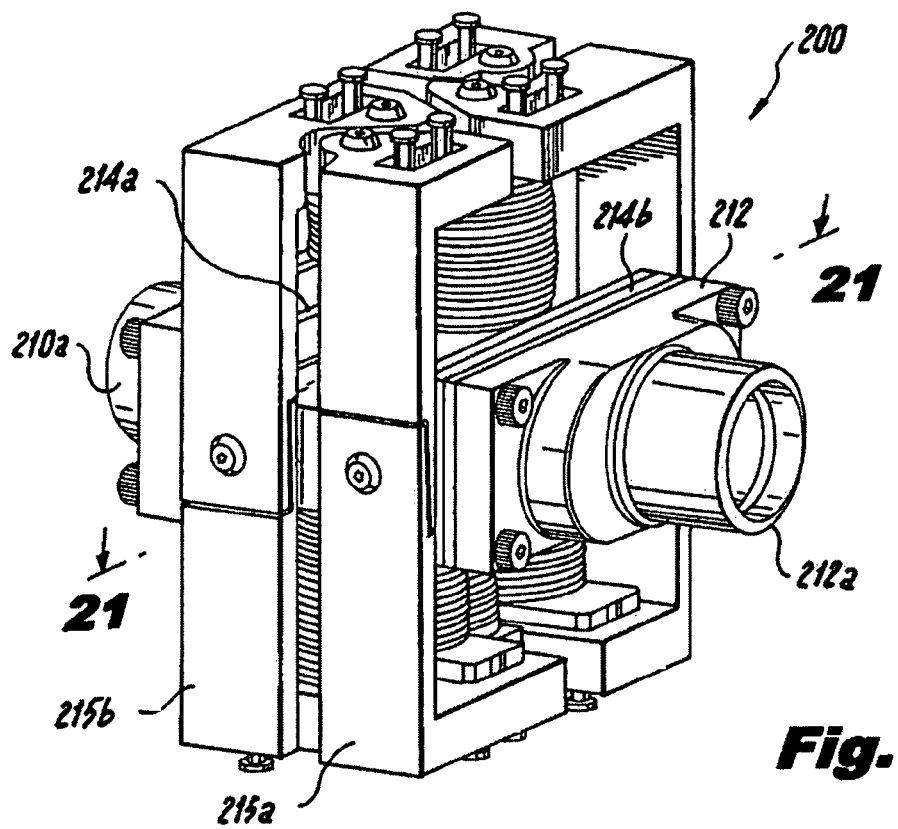
FIG. 15 is a perspective view of a second type of valve assembly constructed in accordance with a preferred embodiment of the subject invention.
Figure 16:
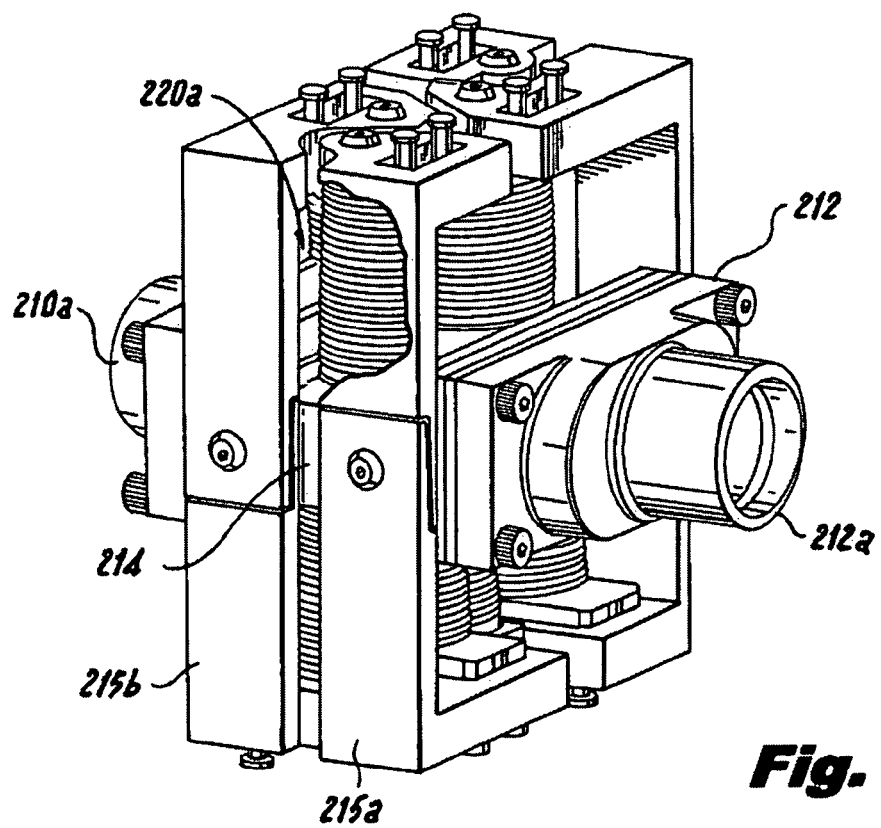
FIG. 16 is a perspective view of the valve assembly shown in FIG. 15, with the sidewall removed to illustrate several of the horizontally opposed electromagnets located within the interior of the valve casing.
Figure 17:
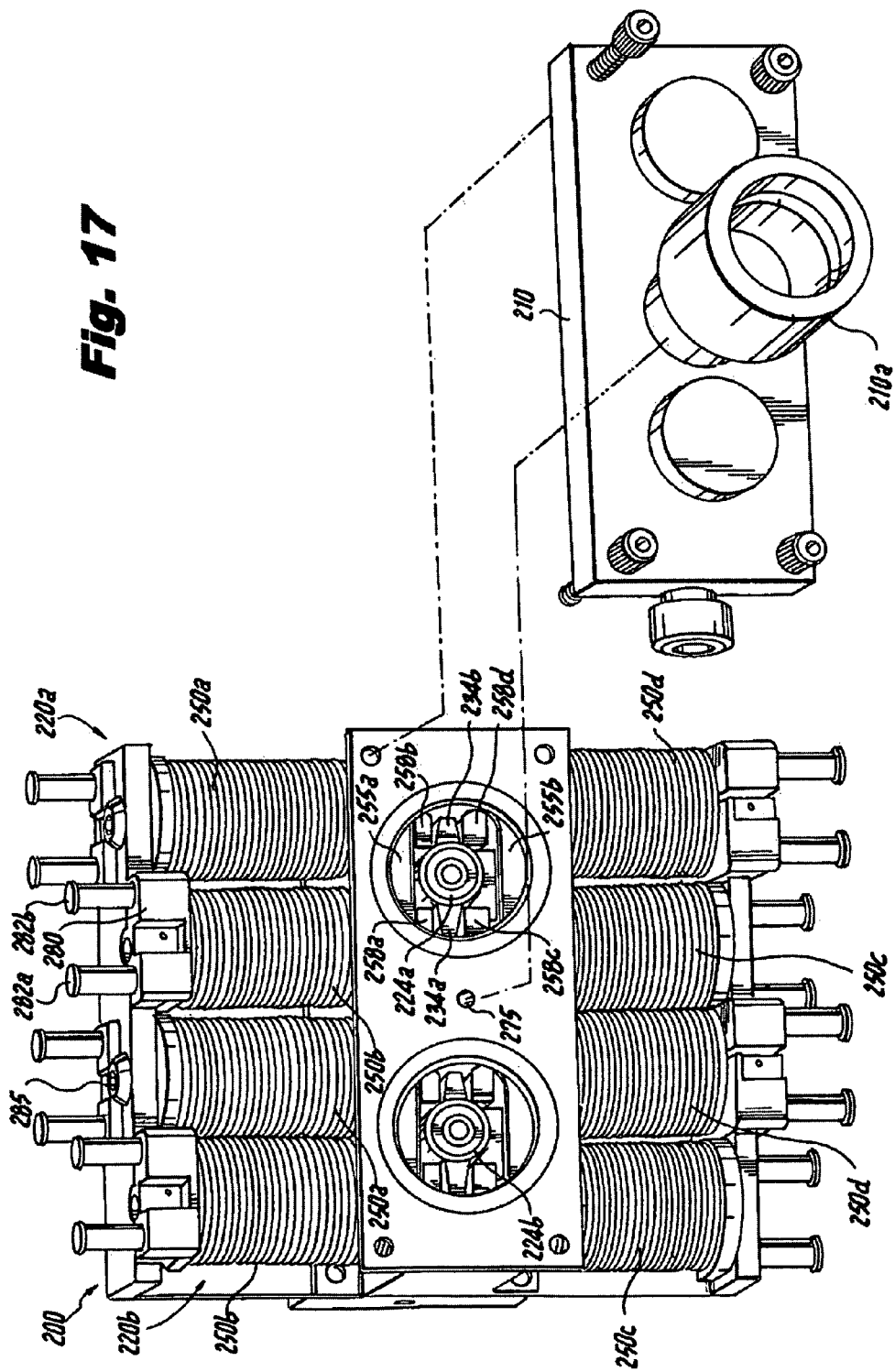
FIG. 17 is a perspective view of the valve assembly of FIG. 15, with the outlet plate removed to illustrate the valve rotors of the two-rotor assembly located within the valve casing.

Referring to FIGS. 15 through 17, valve assembly 200 includes two latching oscillating valve units 220a and 220b, which are arranged in coplanar parallel relationship with respect to one another. Valve units 220a and 220b are housed within a generally rectangular valve casing 214, that includes front and rear end plates 214a, 214b. Valve casing 214 is enclosed by spatially isolated return straps, such as return straps 215a, 215b of valve unit 220a, which form part of the magnetic flux paths associated with each valve unit described in more detail herein below.

An inlet plate 210 is mounted to the inlet side of valve casing 214 adjacent front end plate 214a, and an outlet plate 212 is mounted to the outlet side of valve casing 214 adjacent rear end plate 214b. The inlet plate 210 includes an inlet fitting 210a for receiving fuel from a fuel pump or metering unit at a given pressure and at an initial flow rate. The outlet plate 212 includes an outlet fitting 212a for delivering fuel at the initial flow rate or at a modulated flow rate to a fuel injection device communicating with the combustor of a gas turbine engine.

Figure 18:
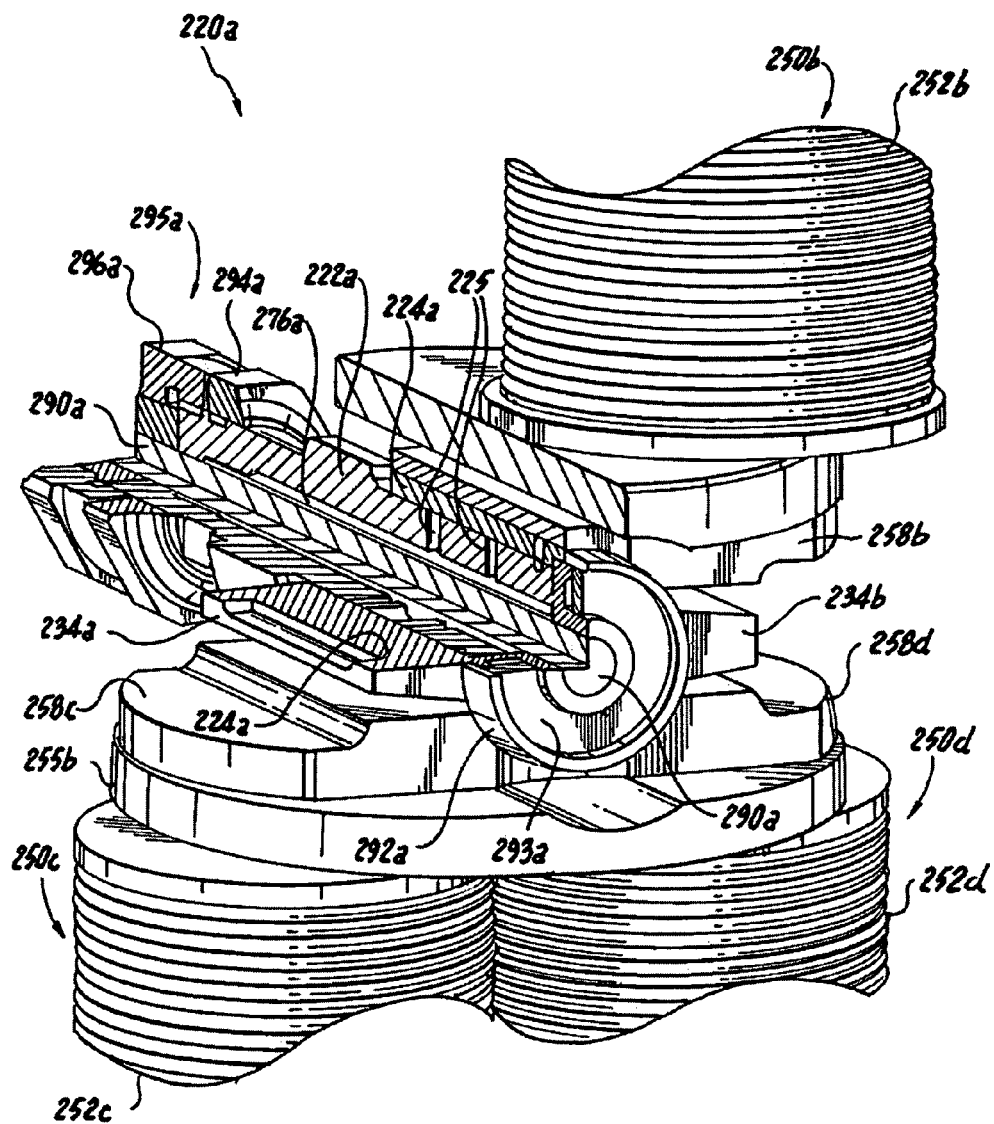
FIG. 18 is a perspective view of a valve rotor and associated valve shaft within the valve assembly of FIG. 15, with the valve rotor and valve shaft shown in cross-section to illustrate the torsion spring and passage provided within the valve shaft.

Referring now to FIGS. 17 and 18, in an exemplary non-limiting embodiment of the subject disclosure, each valve unit 220a, 220b of valve assembly 200 includes four electromagnets, including upper electromagnets 250a, 250b and lower electromagnets 250c, 250d. The upper electromagnets 250a, 250b are supported on an upper coil support plate 255a formed from a material that is not flux permeable. The lower electromagnets 250c, 250d are similarly supported on a lower coil support plate 255b, also formed from a material that is not flux permeable. Each electromagnet includes a coil winding 252a-252d surrounding a respective pole piece 256a-256b, and each pole piece 256a-256d has an associated latching surface 258a-258d (see FIGS. 22-24).

As shown in FIG. 17, the upper and lower electromagnets of each valve unit 220a, 220b are individually connected to a source of current through terminal mounts 280, with each terminal mount having a pair of wiring posts 282a, 282b for mounting conductive wires (not shown). Terminal mounts 280 are secured to respective pole pieces by way of threaded fasteners 285.

In valve assembly 200, as in valve assembly 100, diagonally opposed electromagnets define cooperating magnetic poles, which form part of the alternating magnetic flux paths. Thus, diagonally opposed electromagnets 250a and 250d define part of a first magnetic flux path, and diagonally opposed electromagnets 250b and 250d define part of a second magnetic flux path. The two flux paths that are associated with the two sets of diagonally opposed electromagnets also include spatially isolated flux permeable return straps 215a, 215b, respectively (see FIGS. 15 and 16).

The electromagnets 250a-250d of each valve unit are operatively associated with respective latching plates 258a-258d that interact magnetically with the diverging surfaces of the laterally opposed wings 234a, 234b of each valve rotor 224a, 224b, as shown in FIG. 17, for example. Elongated recesses 235 are formed in the opposed wings 234a, 234b of each valve rotor 224a to reduce the weight of valve rotor 224, as shown in FIGS. 18 and 19, for example.

Referring now to FIGS. 17 through 21, the valve rotors 224a, 224b of valve units 220a, 220b are mounted for oscillatory motion on a respective valve shaft 222a, 222b. By way of example, valve shaft 222a has a central bore or fuel passage 226a extending at least partially if not wholly therethrough. As shown in FIG. 19, a pair of longitudinally spaced apart annular grooves 230a, 230b are formed in the outer surface of fuel tube 222a. Grooves 230a, 230b are in fluid communication with the central bore 226a of valve shaft 222a through a plurality of circumferentially spaced apart radial passages 225. The annular grooves 230a, 230b receive fuel from central bore 226a to balance fluidic pressure differentials during operation.

In addition, as shown in FIG. 19, an annular fuel supply groove 237 is formed in the outer surface of fuel tube 222a. Supply groove 237 is in fluid communication with a plurality of circumferentially disposed fuel feed apertures 239, which are formed in the body 232a of valve rotor 224a. Fuel feed apertures 239 deliver fuel to the fuel supply groove 237, which in turn supplies fuel to a diametrically reduced annular bearing region 241. That fuel acts as a fluidic bearing to support the rotation of valve rotor 224a relative to valve shaft 222a. A similar fluidic bearing arrangement is established with respect to the diametrically reduced annular bearing region 243 of valve shaft 222a. Fuel is supplied to this region of the valve shaft 222a in a more direct manner through a dimensional clearance that exists between the valve shaft and rotor, which is not shown.

The central fuel passage 226a of valve shaft 222a also communicates with diametrically opposed radial fuel feed ports 228a, 228b that are formed in valve shaft 222a between the annular grooves 230a, 230b, as best seen in FIG. 20. Fuel feed ports 228a, 228b are dimensioned and positioned to communicate with corresponding diametrically opposed fuel inlet ports 242a, 242b formed in the cylindrical body portion 232a of valve rotor 224a, as described in more detail below with respect to FIGS. 22 through 24.

In accordance with the teachings of the subject invention, the aperture size of the opposed fuel feed ports 228a, 228b in valve shaft 222a and the corresponding fuel inlet ports 242a, 242b in the valve rotor 224a of valve unit 220a differ from the aperture size of the opposed fuel feed ports 228a, 228b in fuel tube 222b and the corresponding fuel ports 242a, 242 in the valve rotor 224b of valve unit 220b. For example, the size of the fuel ports differ such that the flow area provided by the corresponding rotor and shaft fuel ports in valve unit 220a is twice as great as the flow area provide by the corresponding rotor and shaft fuel ports in valve unit 220b.

Valve rotor 224a is operatively mounted to a cylindrical torsion spring 290a. Torsion spring 290a extends through the central bore 226a of valve shaft 222a. More particularly, the leading end of torsion spring 290a is brazed or otherwise fastened to an annular fitting 292a. Fitting 292a is secured within the central bore 233a of the cylindrical body portion 232a of valve rotor 224a by an annular locking ring 293a. Therefore, valve rotor 224a and torsion spring 290a will oscillate in conjunction with one another between magnetically latched positions. In operation, the oscillation of the conjoined torsion spring and valve rotor occurs at the natural resonant frequency of the system.

As best seen in FIG. 18, the trailing end of torsion spring 290a is operatively associated with an adjustable collet assembly 295a that includes hexagonally-shaped cooperating adjustable fasteners 294a, 296a for locking the trailing end of the torsion spring 290a to the valve shaft 222a. Preferably, the fasteners are designed to cooperate with the valve casing 214 to maintain the valve shaft 222a in a fixed axial position with respect to the valve rotor 224a. Furthermore, the cooperating fasteners 294a, 296a of the adjustable collet assembly 295a is adapted and configured to facilitate the proper alignment of torsion spring 290a relative to valve rotor 224a to obtain the appropriate spring bias necessary to achieve the requisite oscillatory acceleration from one magnetically latched portion to another.

Figure 21:
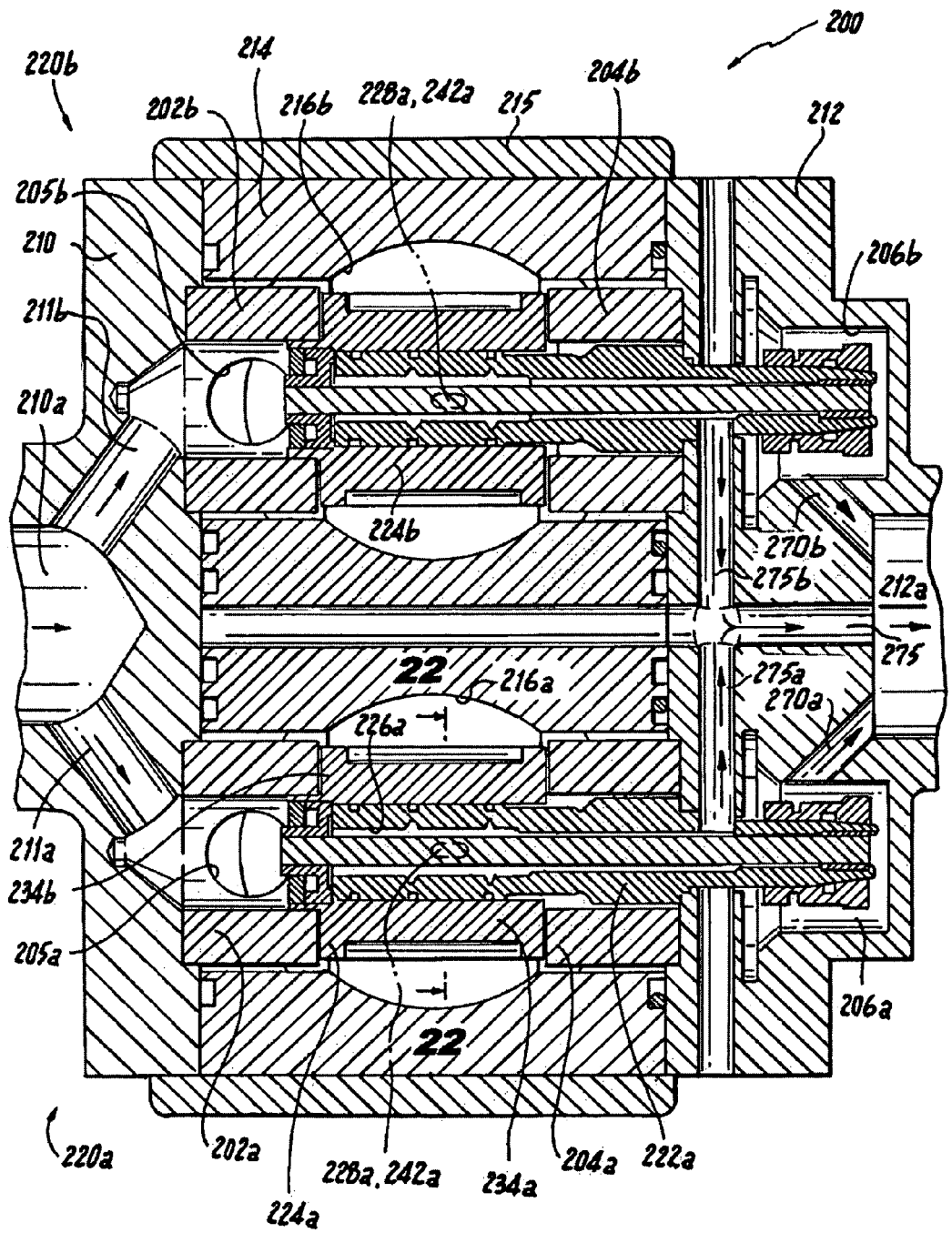
FIG. 21 is a cross-sectional view taken along line 21-21 of FIG. 15, illustrating the primary and modulating fuel flow passages defined within the valve casing that houses the two rotor assembly, whereby fuel enters the inlet plate at a given pressure and initial flow rate and exits the outlet plate at the given pressure and at the same or a modulated flow rate depending upon the positions of the valve rotors.

Referring to FIG. 21, both valve assemblies 220a, 220b are shown in parallel relationship within valve casing 214. The inlet port 210a of inlet plate 210 bifurcates into first and second diverging inlet passages 211a, 211b, which respectively feed fuel to valve units 220a, 220b, at an initial fuel flow rate. Inlet passage 211a communicates with a primary fuel chamber 216a of valve unit 220a through an aperture 205a in a forward flux permeable structure 202a, which forms an axial end pole.

Figure 22:
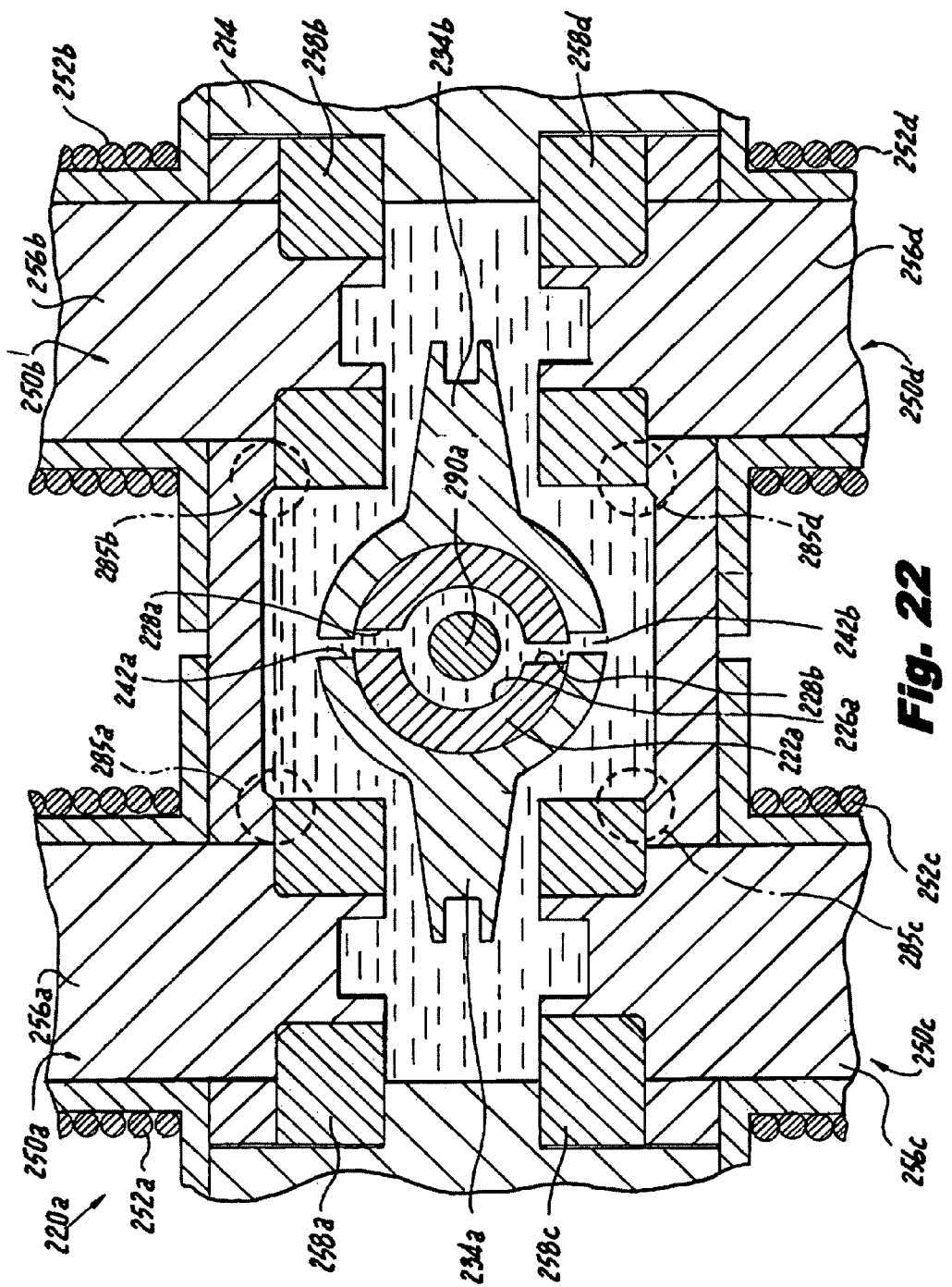
FIG. 22 is a cross-sectional view taken along line 22-22 of FIG. 21, illustrating the relative positions of the opposed fuel transfer ports in the valve rotor and the opposed fuel inlet ports in the valve shaft, when the valve rotor is in a neutral position.
Figure 23:
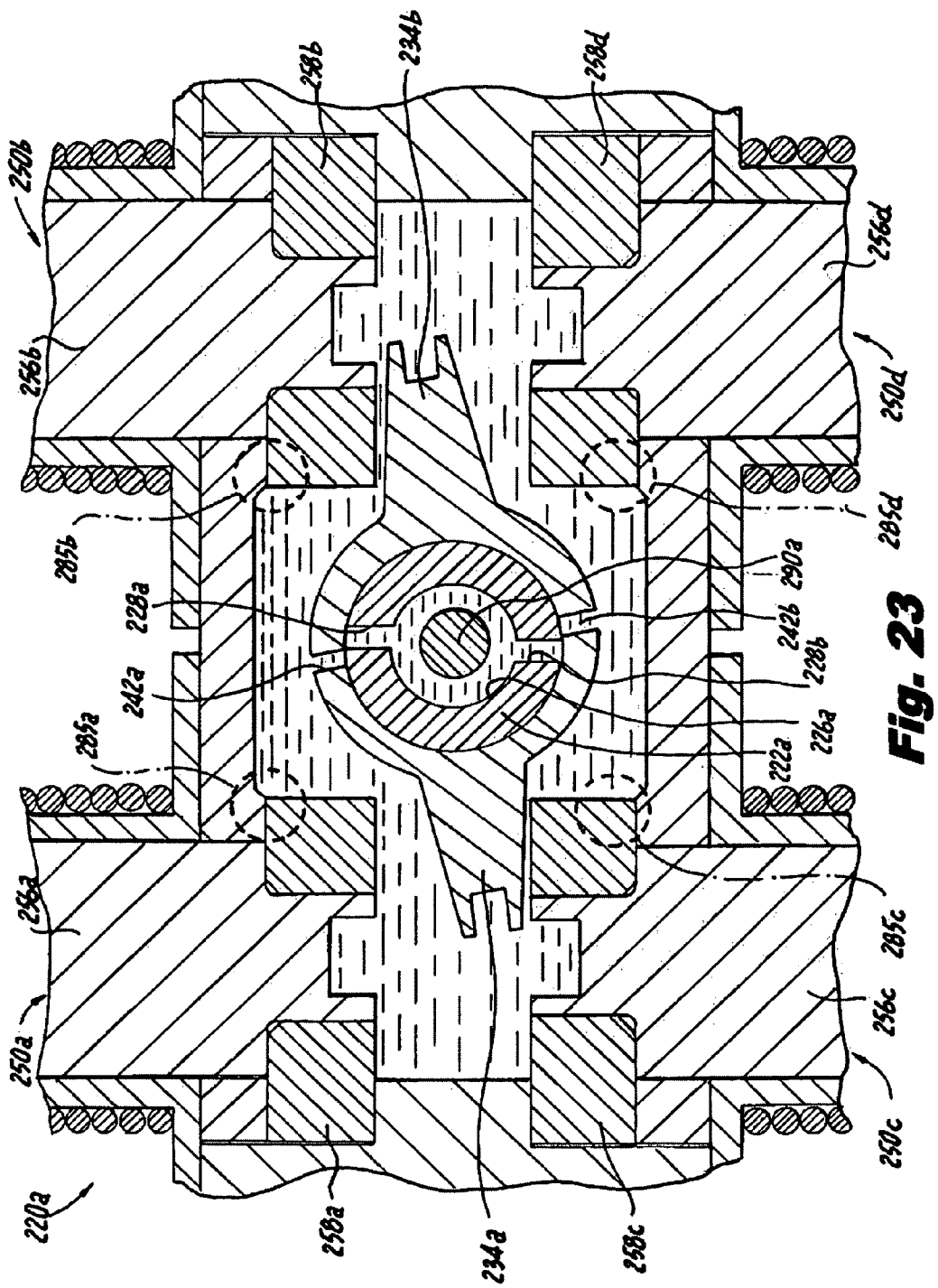
FIG. 23 is a cross-sectional view taken along line 22-22 of FIG. 21, illustrating the relative positions of the opposed fuel transfer ports in the valve rotor and the opposed fuel inlet ports in the valve shaft, when the valve rotor is magnetically latched in a fully closed position.
Figure 24:
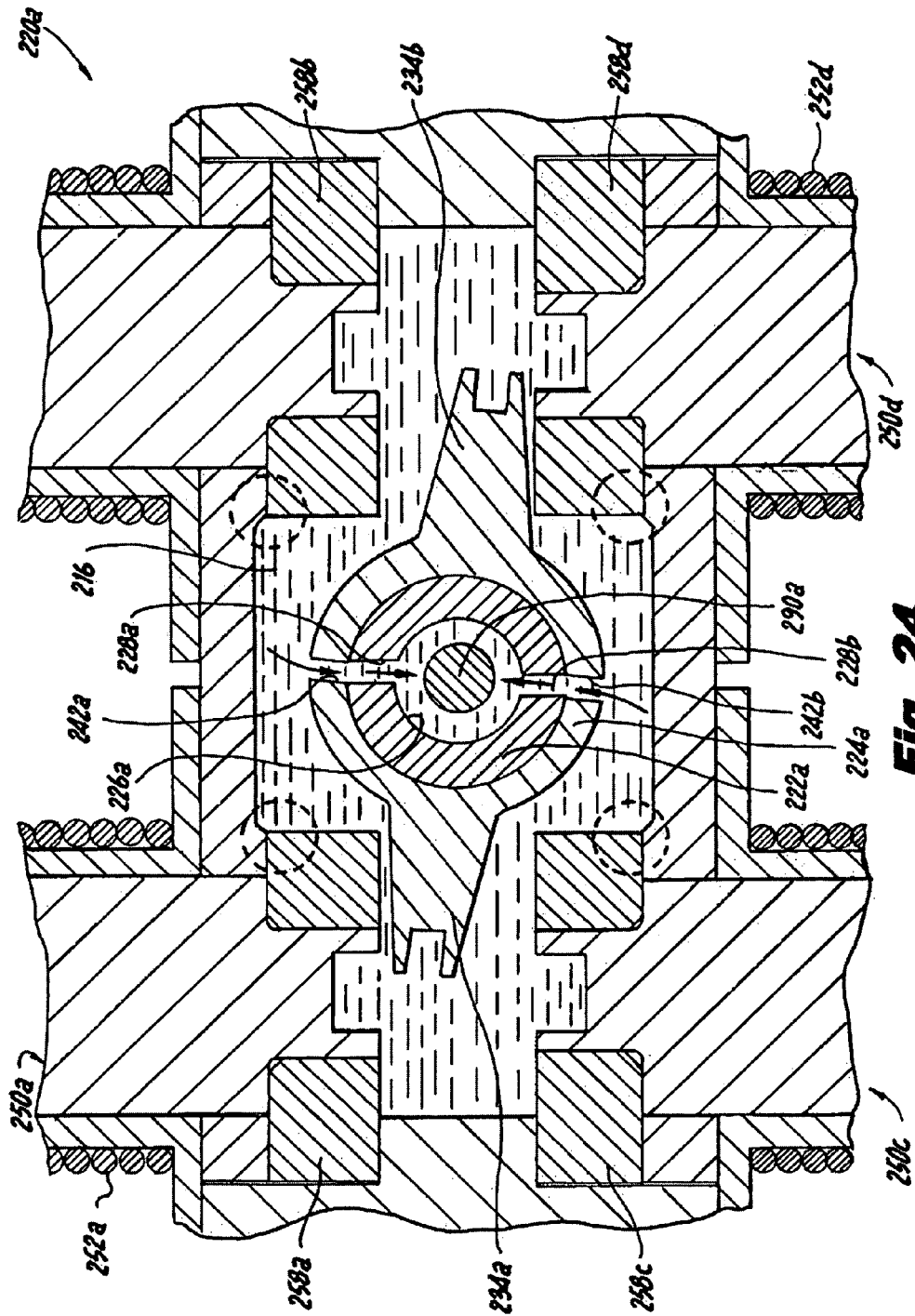
FIG. 24 is a cross-sectional view taken along line 22-22 of FIG. 21, illustrating the relative positions of the opposed fuel transfer ports in the valve rotor and the opposed fuel inlet ports in the valve shaft, when the valve rotor is magnetically latched in a fully open position.

As best seen in FIGS. 22-24, the primary fuel chamber 216a of valve unit 220a communicates with an outlet chamber 206a formed in outlet plate 212 through a set of four apertures 285a through 285d located behind flux permeable axial end pole 204a. These apertures supply the by-pass or primary fuel flow from fuel chamber 216a to outlet chamber 206a. The outlet chamber 206a of valve assembly 220a communicates directly with the outlet port 212a in outlet plate 212 through fuel passage 270a.

Similarly, inlet passage 211b communicates with a primary fuel chamber 216b defined in valve assembly 220b through an aperture 205b formed in forward flux permeable structure 202b. The primary fuel chamber 216b of valve assembly 220b communicates with an outlet chamber 206b formed in outlet plate 212 by way of apertures formed in outlet plate 212 behind flux permeable structure 204b axial end pole (as shown for example in FIG. 22). The outlet chamber 206b of valve assembly 220b communicates directly with the outlet port 212a in outlet plate 212 through fuel passage 270b.

Valve rotor 224a of valve assembly 220a is positioned within the primary fuel chamber 216a between the front and rear magnetic flux permeable structures 202a, 204a. In operation, when valve rotor 224a is in a fully open magnetically latched position, modulating fuel from the primary fuel chamber 216a is admitted into the central fuel passage 226a of valve shaft 222a, through the aligned fuel ports 228a, 242a of valve shaft 222a and valve rotor 224a, respectively. The central fuel passage 226a of valve shaft 222a communicates with a transverse secondary fuel channel 275a formed in outlet plate 212 for delivering modulating fuel to outlet port 212a by way of a central fuel feed channel 275.

The valve rotor 224b of valve unit 220b is similarly positioned within the primary fuel chamber 216b located between flux permeable axial end poles 202b and 204b. In operation, when valve rotor 224b is in a fully open magnetically latched position, modulating fuel from the primary fuel chamber 216b is admitted into the central fuel passage 226b in valve shaft 222b through the aligned fuel ports of valve shaft 222b and valve rotor 224b. The central fuel passage 226b of fuel tube 222b communicates with a transverse secondary fuel channel 275b formed in outlet plate 212 for delivering modulating fuel to outlet port 212a by way of a central fuel feed channel 275. Thus, fuel feed channel 275 serves as junction for secondary fuel channels 275a and 275b, of valve units 220a and 220b, respectively.

Referring to FIG. 22, by way of example, the valve rotor 224a of valve unit 220a is depicted in an unlatched neutral position, which occurs when none of the four electromagnets 250a-250d are energized. This condition corresponds to a mean fuel flow condition, wherein the valve rotor 224a is disposed in a partially open position. In this position, the opposed fuel feed ports 242a, 242b of valve rotor 224a are partially aligned with the opposed fuel inlet ports 228a, 228b in valve shaft 222a so that modulating fuel flows into the annular fuel passage defined between the torsion spring 290a and the interior wall of the fuel passage 226a.

When valve rotor 224a is in the fully closed position shown in FIG. 23, it is rotated in a first or counter-clockwise direction from the neutral position shown in FIG. 22. Accordingly, the opposed fuel feed ports 242a, 242b of valve rotor 224a are moved completely out of alignment with the opposed fuel inlet ports 228a, 228b in valve shaft 222a. In this position, electromagnets 250b and 250c are energized so that valve rotor 224a is magnetically latched with respect to the diagonally opposed latching surfaces 258b and 258c of pole pieces 256b and 256c.

When valve rotor 224a is magnetically latched in this closed position of FIG. 23, torsion spring 290a is twisted in a counter-clockwise direction, thus storing mechanical energy in the form of torque. The stored mechanical energy in the torsion spring 290a is sufficient to accelerate or otherwise rapidly move the valve rotor 224a toward the open position shown in FIG. 25 when the valve rotor 224a is unlatched from latching surfaces 258b and 258c and electromagnets 250a and 250d are concomitantly energized. In this instance, the torque generated by the twisted torsion spring 290a is insufficient however, to overcome the magnetic latching force holding the valve rotor 224a in the closed position of FIG. 23.

When valve rotor 224a is in the fully open position shown in FIG. 24, it is rotated in a second or clockwise direction from the neutral position shown in FIG. 22. Accordingly, the opposed fuel feed ports 242a, 242b of valve rotor 224a are wholly aligned with the opposed fuel inlet ports 228a, 228b in valve shaft 222a. In this position, electromagnets 250a and 250d are energized so that valve rotor 224a is magnetically latched with respect to the diagonally opposed latching surfaces 258a and 258d of pole pieces 256a and 256d.

When valve rotor 224a is magnetically latched in this open position of FIG. 24, torsion spring 290a is twisted in a clockwise direction, thus storing mechanical energy in the form of torque. This stored mechanical energy in the torsion spring 290a is sufficient to rapidly move the valve rotor 224a toward the closed position shown in FIG. 23 when valve rotor 224a is unlatched from latching surfaces 258a and 258d and electromagnets 250b and 250c are concomitantly energized. In this instance, the torque generated by the twisted torsion spring 290a is insufficient however, to overcome the magnetic latching force holding the valve rotor 224a in the open position of FIG. 24.

Figure 25:
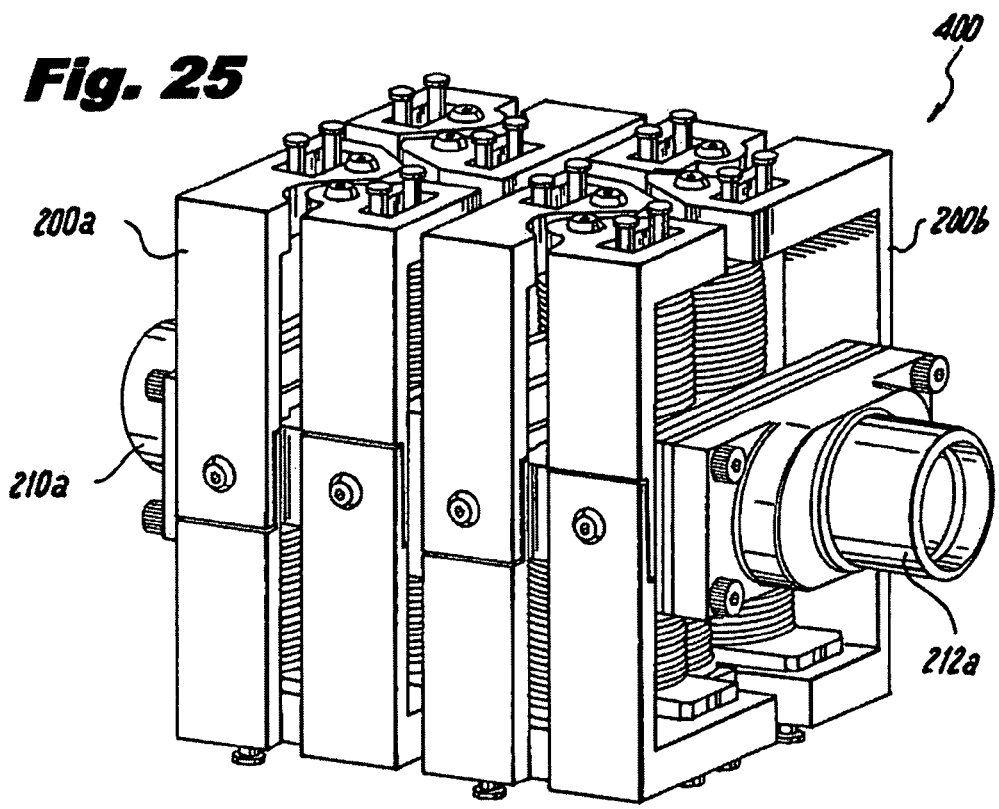
FIG. 25 is a perspective view of a four-valve assembly constructed with two serially connected two-valve assemblies of FIG. 15.
Figure 26:
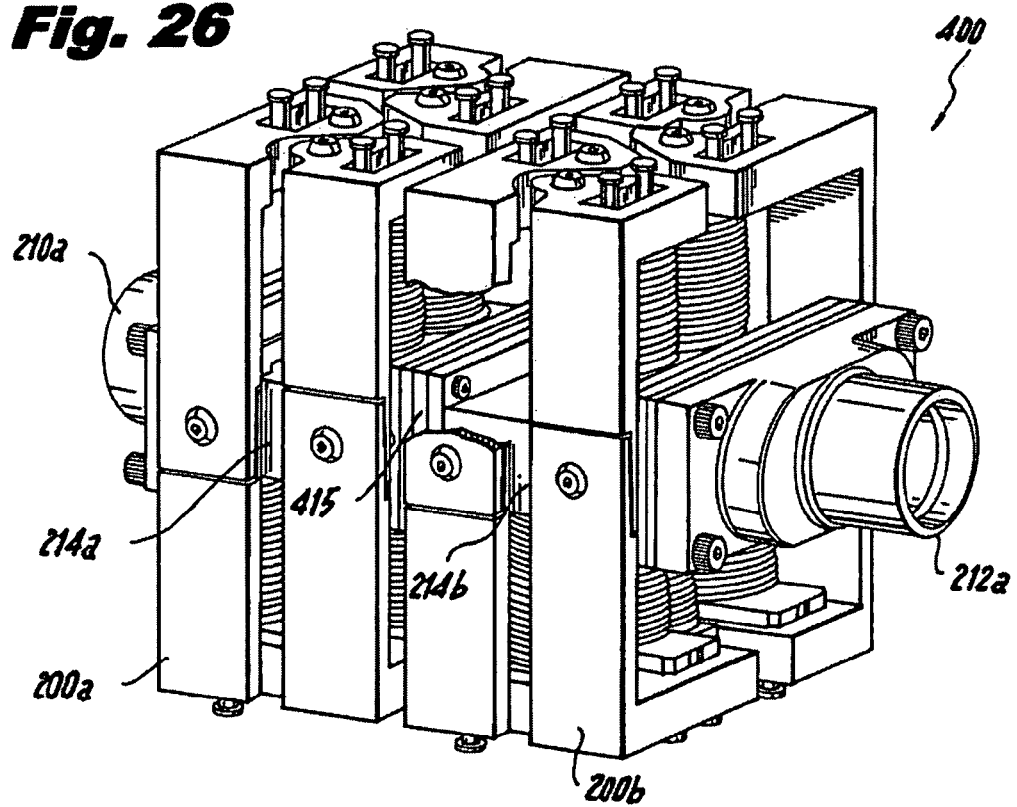
FIG. 26 is a perspective of the four-valve assembly shown in FIG. 25, with the sidewalls sectioned to illustrate the interior of the serially connected valve casings and the structure of the return straps that form part of the magnetic flux paths extending between diagonally opposed electromagnets.

Referring now to FIGS. 25 and 26, there is illustrated a four-bit latching oscillating valve assembly having torsion spring actuated valves, which is designated generally by reference numeral 400 and which is comprised of two cooperating two-bit valve assemblies 200a and 200b. In this arrangement, the inlet fitting 210 is operatively associated with the inlet side of valve assembly 200a, while the outlet fitting 212a is operatively associated with the outlet side of valve assembly 200b. An intermediate bridge plate 415 is disposed between the two valve assemblies to facilitate fluid communication therebetween, as to the primary fuel flow path and the modulated fuel flow paths. The bridge plate 415 is appropriately ported and channeled to communicate with the outlet side of valve assembly 200a and the inlet side of valve assembly 200b. Those skilled in the art will readily appreciate that any number of two-bit valve assemblies could be conjoined in the manner illustrated in FIGS. 25 and 26, so as to provide higher resolution and more control over fuel flow conditions.

Latching Oscillating Valve Assembly with Cantilever Spring Oscillation

Figure 27:
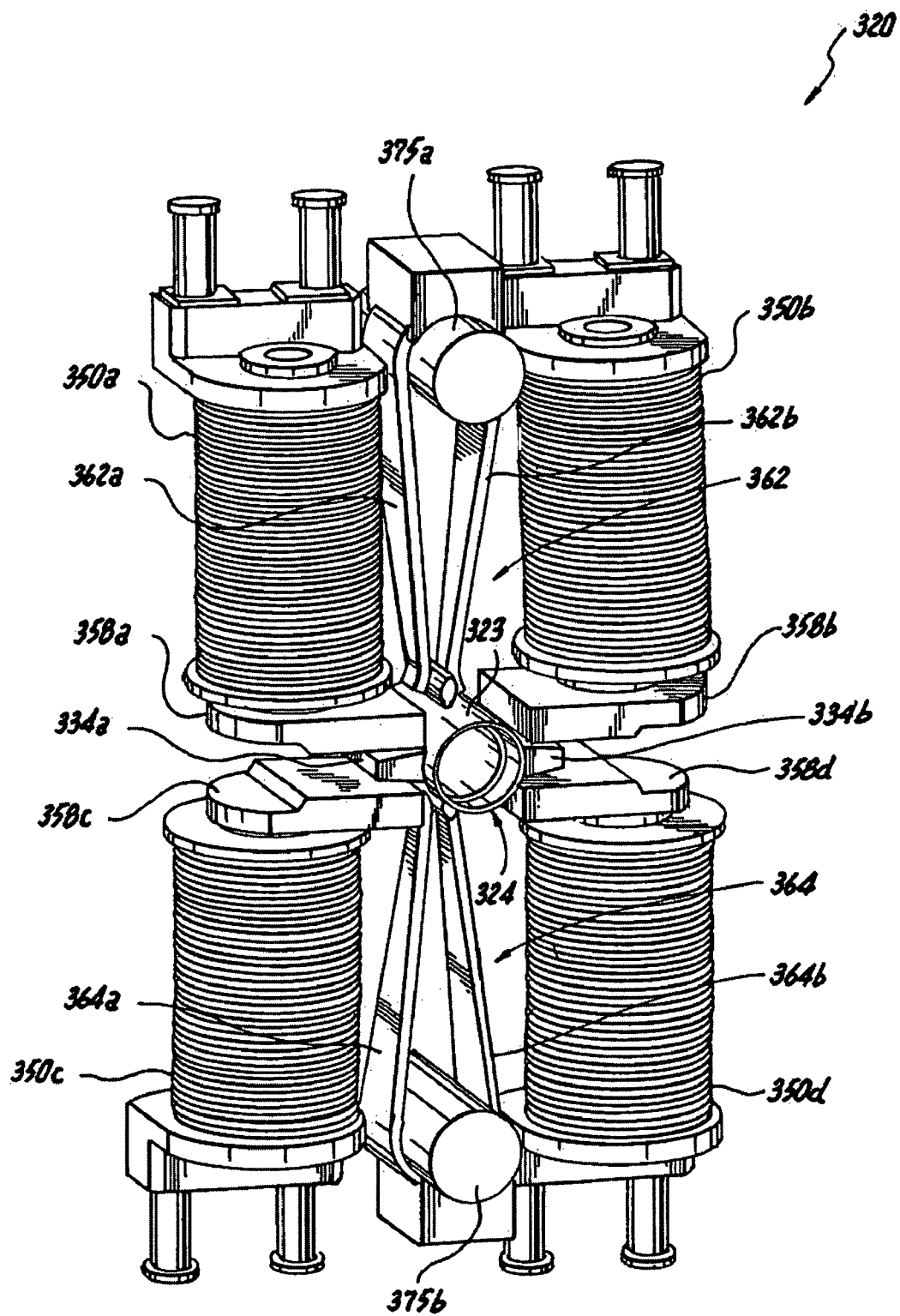
FIG. 27 is a perspective view of another type of valve rotor assembly constructed in accordance with a preferred embodiment of the subject invention, which includes opposed upper and lower cantilever springs for storing the mechanical energy needed to accelerate the valve rotor between open and closed magnetically latched positions.

Referring to FIG. 27, there is illustrated another latching oscillating valve unit for use in conjunction with the valve assemblies of the subject invention, which is designated generally by reference numeral 320. Valve unit 320 includes four electromagnets, including upper electromagnets 350a, 350b and lower electromagnets 350c, 350d. The upper electromagnets 350a, 350b are operatively connected to respective upper latching plates 358a, 358b, and the lower electromagnets 350c, 350d are operatively connected to respective lower latching plate 358c, 358d.

Figure 28:
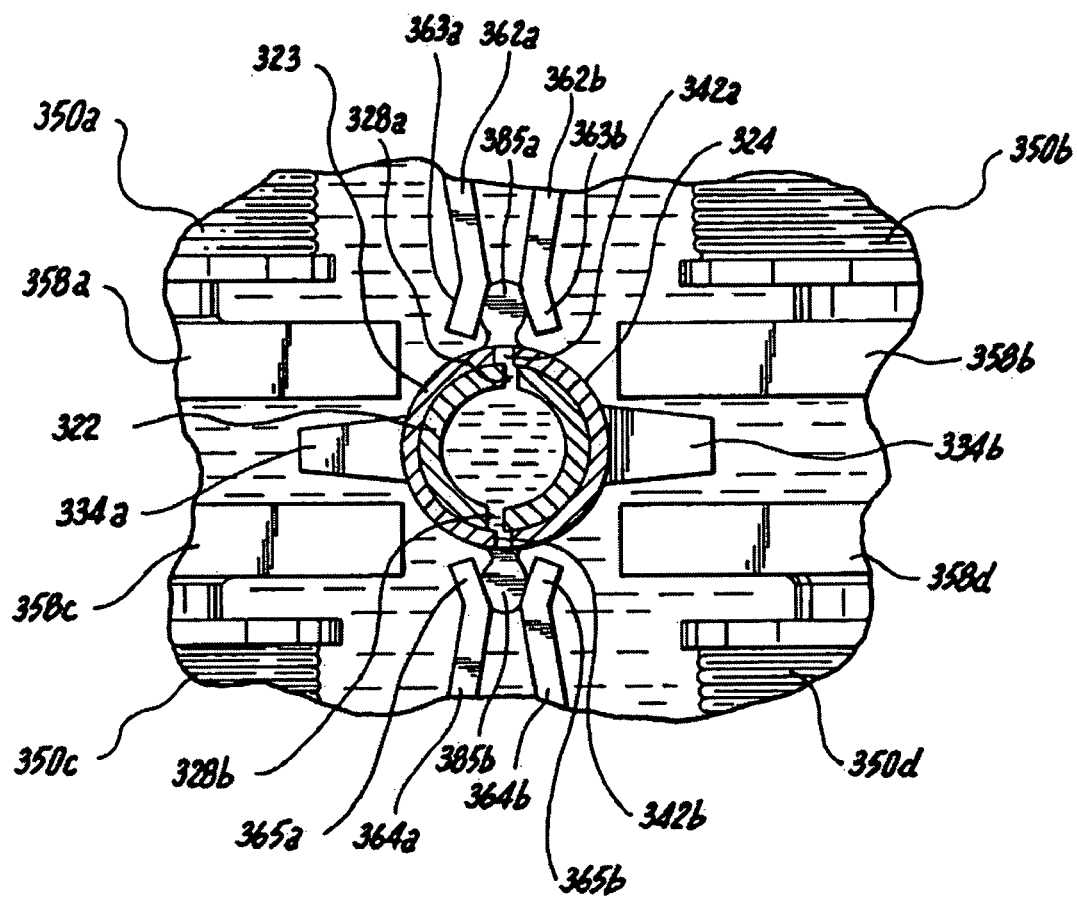
FIG. 28 is a cross-sectional view of the rotor assembly of FIG. 27, with the valve rotor in a neutral position, wherein the legs of the cantilever springs have a neutral bias.

Valve unit 320 includes a valve rotor 324 having a cylindrical body portion 323 that is dimensioned and configured to receive an elongated valve shaft 322 in rotationally supporting relationship (see e.g., FIG. 28). Laterally opposed wing portions 334a and 334b extend from body portion 323 to interact with the upper and lower latching surfaces 358a-358d associated with electromagnets 350a-350d. Valve unit 320 further includes opposed upper and lower cantilever springs 362 and 364 which store the mechanical energy to rapidly oscillate or otherwise accelerate the valve rotor 324 between open and closed magnetically latched positions to modulate fuel flow within the valve shaft 322 during operation.

With continuing reference to FIG. 27, the upper cantilever spring 362 has two inwardly biased legs 362a and 362b supported on an upper mounting rod 375a. The upper legs 362a and 362b include respective curved distal end portions 363a and 363b that interface with the involute surfaces of an upper engagement tooth 385a that extends upwardly from the central body portion 323 of valve rotor 324, as best seen in FIG. 28. Similarly, the lower cantilever spring 364 has two inwardly biased legs 364a and 364b that are supported on a lower mounting rod 375b. The lower legs 364a and 364b include respective curved distal end portions 365a and 365b that interface with the involute surfaces of a lower engagement tooth 385b that extends downwardly from the central body portion 323 of valve rotor 324, as best seen in FIG. 28.

The mechanical interaction between the opposed curved distal end portions (363a, 363b and 365a, 365b) of the spring legs (362a, 362b and 364a, 364b) of the upper and lower cantilever springs 362 and 364, and the involute surfaces of the upper and lower engagement teeth 385a and 385b, which is shown in FIG. 28, is similar to the interaction between two cooperating intermeshed spur gears. This serves to maximize rolling contact and minimize sliding friction between the spring legs and rotor engagement teeth.

In FIG. 28, valve rotor 324 is depicted in an unlatched neutral position, which occurs when none of the four electromagnets 350a-350d are de-energized. This position corresponds to a mean fuel flow condition, wherein the opposed fuel feed ports 342a, 342b of valve rotor 324 are partially aligned with the opposed fuel inlet ports 328a, 328b in valve shaft 322.

Figure 29:
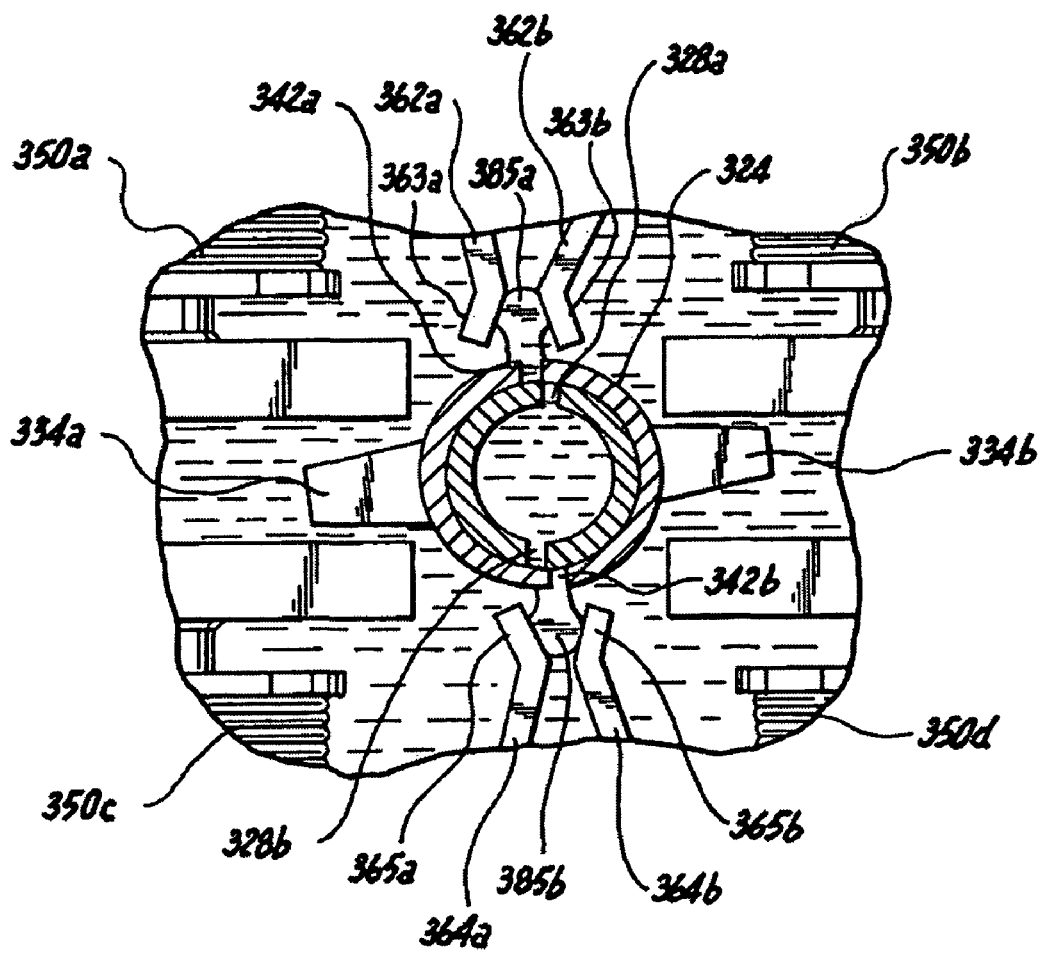
FIG. 29 is a cross-sectional view of the rotor assembly of FIG. 27, with the valve rotor magnetically latched in a fully closed position, when the legs of the opposed cantilever springs are biased toward the open position of FIG. 30.

Referring to FIG. 29, when valve rotor 324 is in a closed position, it is rotated in a first or counter-clockwise direction from the neutral position shown in FIG. 28. Accordingly, the opposed fuel feed ports 342a, 342b of valve rotor 324 are moved completely out of alignment with the opposed fuel inlet ports 328a, 328b in valve shaft 322. In this position, diagonally opposed electromagnets 350b and 350c are energized so that valve rotor 324 is magnetically latched with respect to the diagonally opposed latching plates 358b and 358c.

When valve rotor 324 is magnetically latched in the closed position of FIG. 29, spring leg 362a of the upper cantilever spring 362 and spring leg 364b of the lower cantilever spring 364 are deflected, thus storing mechanical energy. The stored mechanical energy in the two spring legs 362a, 364b is sufficient to move the valve rotor 324 toward the open position shown in FIG. 30, when the valve rotor 324 is unlatched and diagonally opposed electromagnets 350a and 350c are concomitantly energized. The force generated by the deflected spring legs 362a, 364b is insufficient however, to overcome the magnetic latching forces holding valve rotor 324 in the closed position of FIG. 30.

Figure 30:
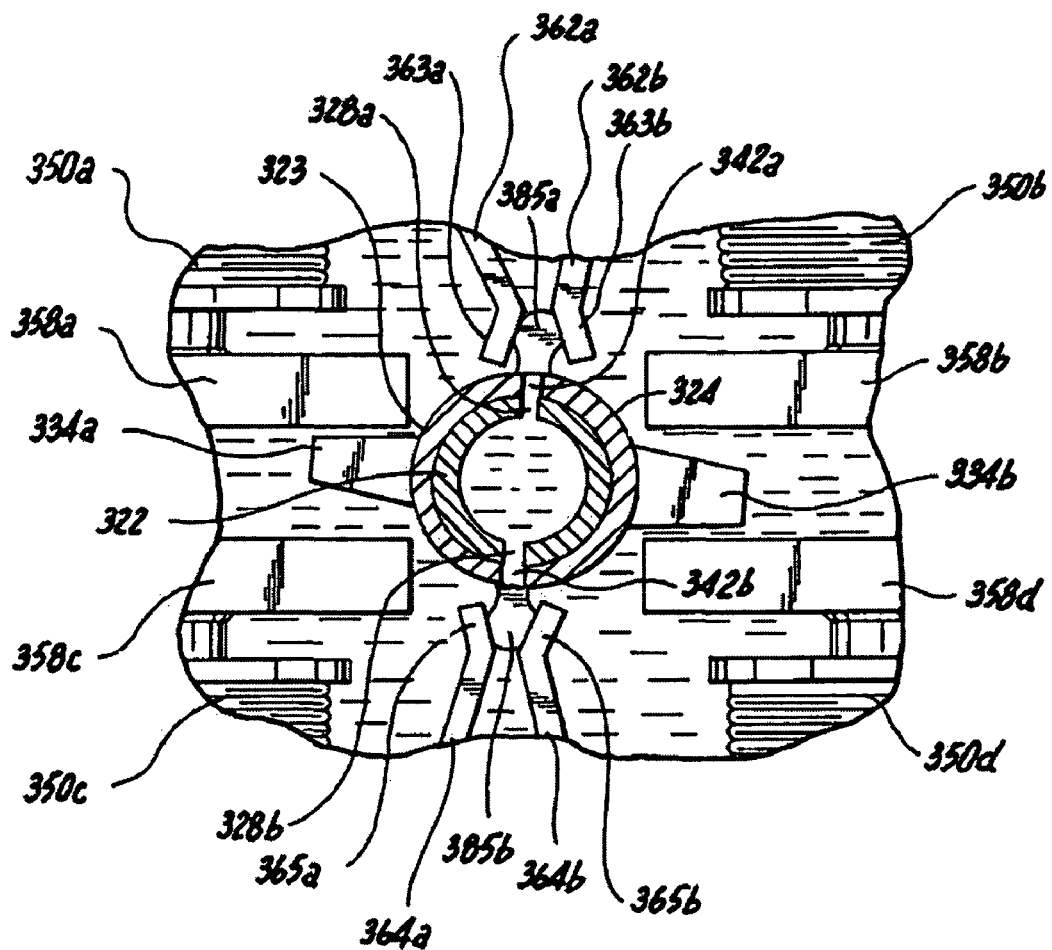
FIG. 30 is a cross-sectional view of the rotor assembly of FIG. 27, with the valve rotor magnetically latched in a fully open position, when the legs of the opposed cantilever springs are biased toward the closed position of FIG. 29.

Referring to FIG. 30, when valve rotor 324 is in an open position, it is rotated in a second or clockwise direction from the neutral position shown in FIG. 28. Accordingly, the opposed fuel feed ports 342a, 342b of valve rotor 324 are wholly aligned with the opposed fuel inlet ports 328a, 328b in valve shaft 322. In this position, diagonally opposed electromagnets 350a and 350d are energized so that valve rotor 324 is magnetically latched with respect to the diagonally opposed latching plates 358a and 358d.

When the valve rotor 324 is magnetically latched in the open position of FIG. 30, spring leg 362b of the upper cantilever spring 362 and spring leg 364a of the lower cantilever spring 364 are deflected, thus storing mechanical energy. The stored mechanical energy in the two deflected spring legs 362b, 364a is sufficient to move the valve rotor 324 toward the closed position shown in FIG. 29, when the valve rotor 324 is unlatched and diagonally opposed electromagnets 350b and 350d are concomitantly energized. The force generated by the deflected spring legs 362b, 364a is not sufficient however, to overcome the magnetic latching force holding valve rotor 324 in the open position of FIG. 30.

Latching Oscillating Valve Assembly with Non-Intersecting Flux Paths

Referring now to FIGS. 31-45, there is illustrated another latching oscillating valve assembly for modulating the flow of fuel to a fuel injector of a gas turbine engine, which is constructed in accordance with a preferred embodiment of the subject invention and designated generally by reference numeral 400. Valve assembly 400 differs from the previously described embodiments of the subject invention in that it operates without any by-pass flow through the valve housing. Thus, the modulated fuel flow through the valve rotors is the only output flow from the valve assembly. Consequently, the average fuel flow rate for this valve assembly corresponds to the neutral position of its valve rotors, as explained in more detail below.

Like the valve assembly 200 shown in FIGS. 15-24, valve assembly 400 includes valve rotors and torsion springs which oscillate in conjunction with one another between magnetically latched positions at the natural frequency of the system. Valve assembly 400 differs from the previously described embodiments of the invention with respect to the course of the magnetic circuits or flux paths defined within the valve assembly relative to the valve rotors. More particularly, in valve assembly 400, the course of each magnetic circuit allow the supply and return path for the circuit to be on a single side of the rotor such that the open and closed magnetic paths do not intersect one another. This also allows any air gaps in the magnetic flux path to close when the rotor is in a latched position.

In contrast, in the previously described embodiments of the valve assembly of the subject invention, because of the close proximity of the coils to one another, there was magnetic leakage or "cross-talk" between coils and poles for both the return and supply paths of the same magnetic circuits, as well as leakage between the circuits of two different valve bits. The flow of magnetic energy across magnetic paths at undesired locations results in reduced magnetic forces acting on the rotors. The reduced torque on the rotors prevents the rotors from fully opening or closing the metering ports that regulate the flow of fuel through the valve assembly, as well as preventing the rotors from fully latching. If the rotors do not fully latch to the open or closed positions during operation, then modulation of the fuel does not reach its maximum possible amplitude. This can lead to asymmetric pressure oscillations within the engine combustor, reducing performance and preventing the suppression of combustion instabilities.

Figures 31, 32:
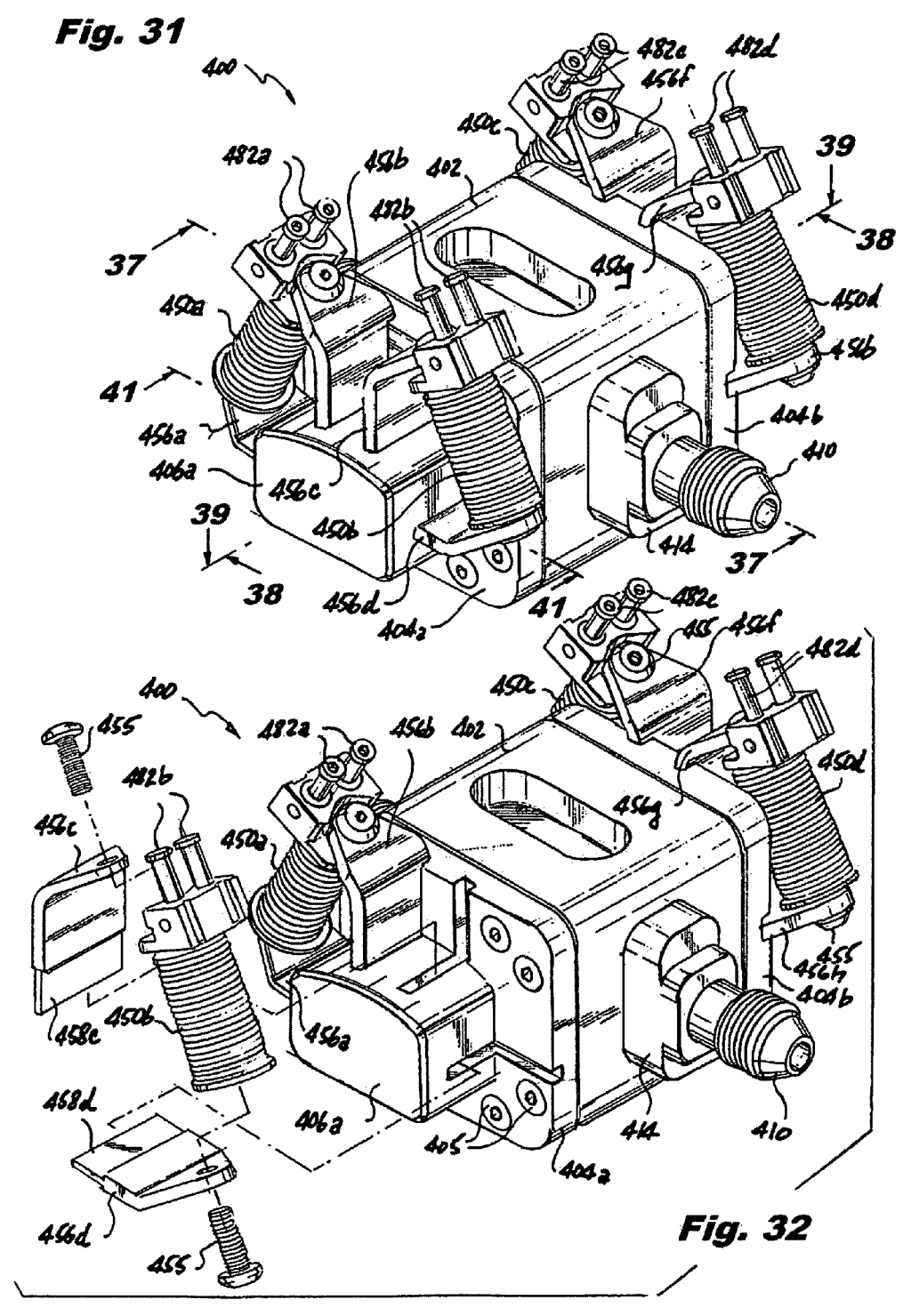
Figure 33:
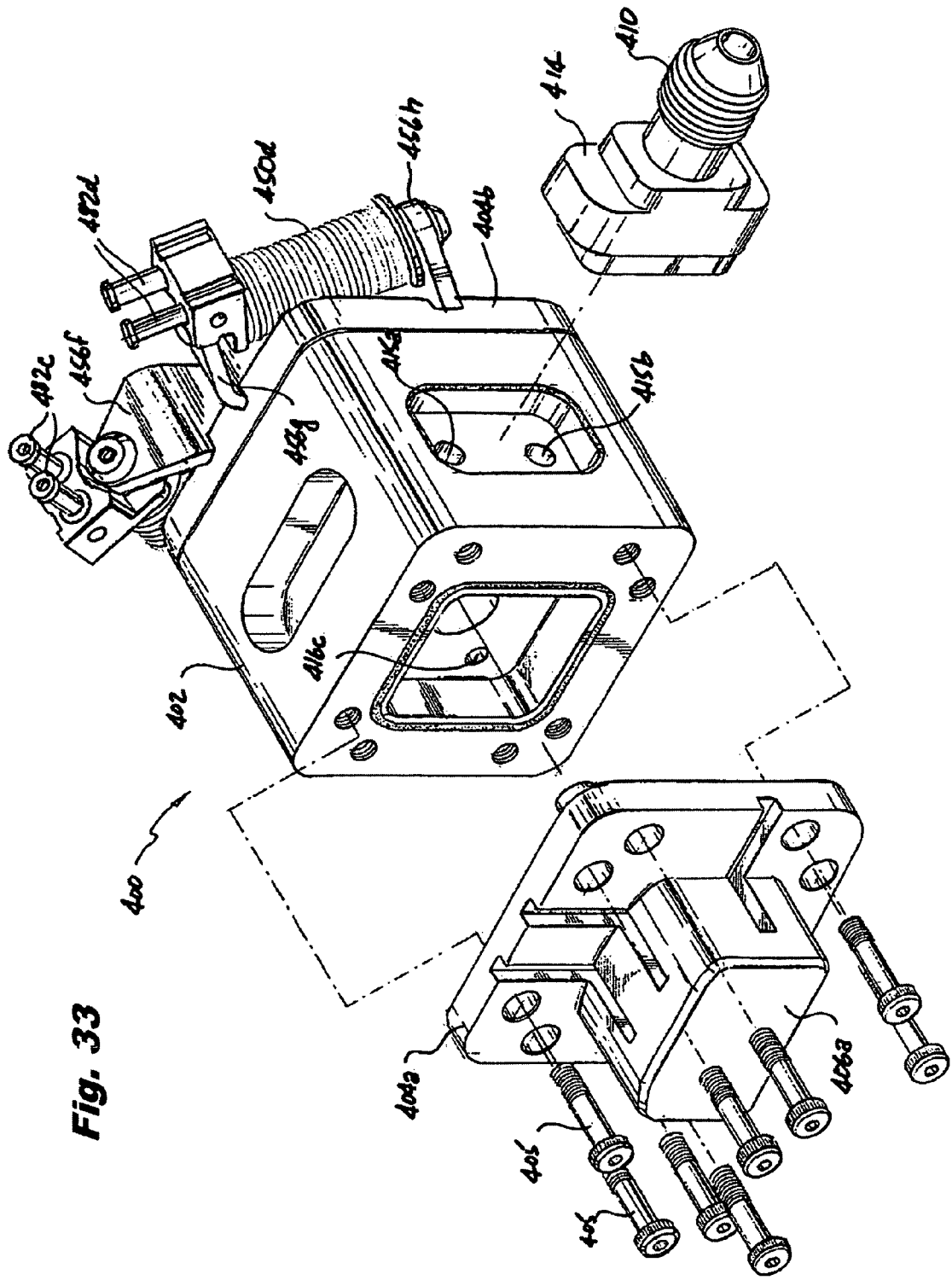
FIG. 33 is a partially exploded perspective view of the valve assembly of FIG. 31, with the valve housing separated from the fuel distribution block to illustrate internal features of the fuel distribution block.
Figure 37:
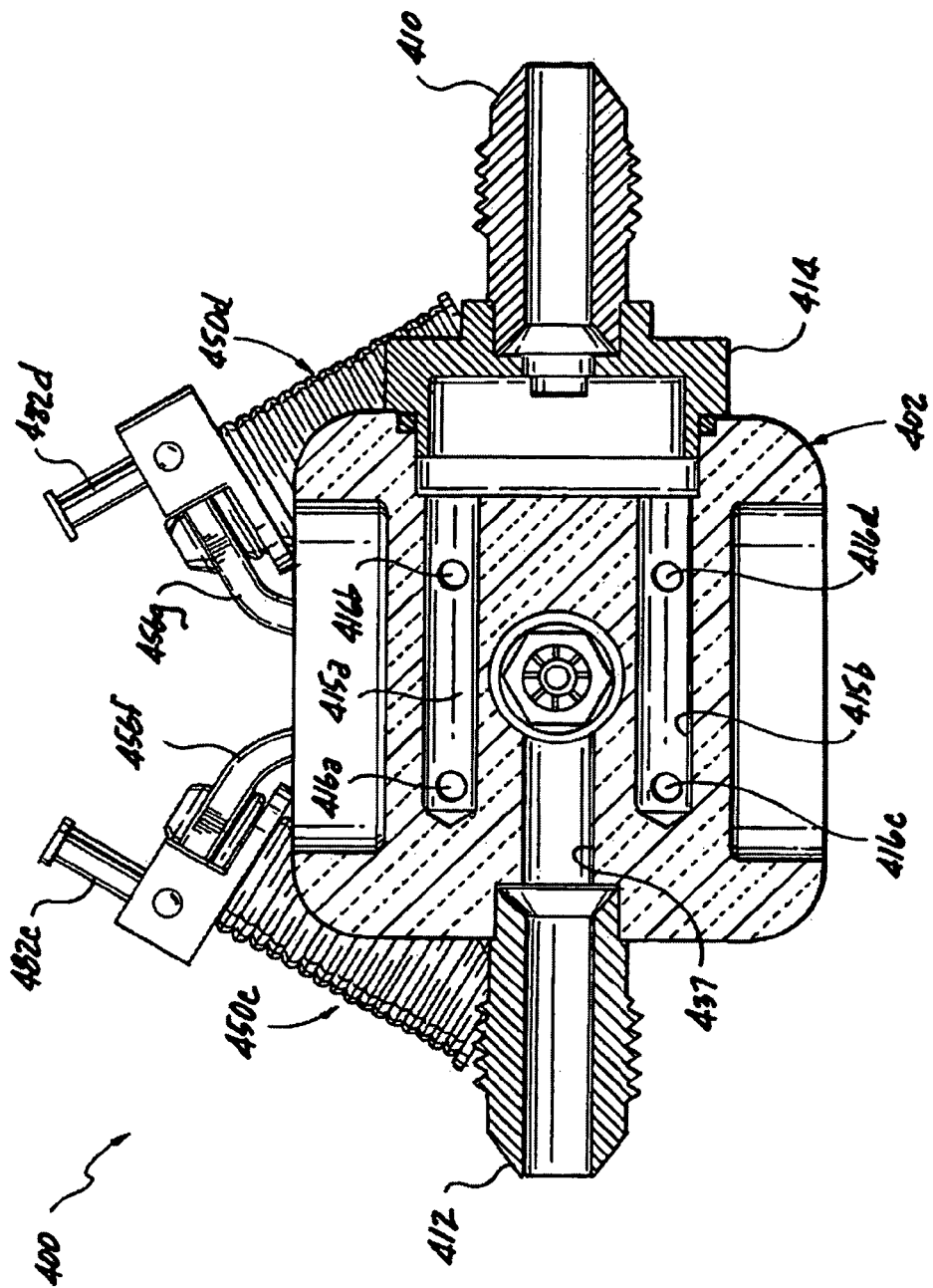
FIG. 37 is a cross-sectional view of the valve assembly of the subject invention taken along line 37-37 of FIG. 31.

Referring now to FIGS. 31 and 32, valve assembly 400 includes a main body section defined by a fuel distribution block 402, which as described in greater detail below defines a series of internal chambers for accommodating various internal components (see FIG. 38) and internal passages for accommodating the flow of fuel (see FIGS. 33 and 40). Fuel distribution block 402 includes an inlet fitting 410 and an outlet fitting 412 (see FIG. 37). Lateral valve plates 404a and 404b are fastened to opposite sides of distribution block 402 by a plurality of threaded fasteners 405. Valve plate 404a includes a valve housing 406a while valve plate 404b includes a valve housing 406a. Valve housings 406a and 406b form chambers that accommodate valve units 420a and 420b, respectively (see FIGS. 38 and 39), the structure and function of which will be described in greater detail below with respect to FIGS. 34-36.

The valve plates 404a, 404b also support the four electromagnets 450a-450d that are adapted and configured to effectuate the magnetic latching of the rotors of valve units 420a, 420b in open and closed positions during operation, which will be described in greater detail below with respect to FIGS. 41-45. More particularly, electromagnets 450a and 450b are associated with valve plate 404a, while electromagnets 450c and 450d are associated with valve plate 404b. The location and relative orientation of the electromagnets 450a-450d facilitates the non-intersecting magnetic flux paths that serve to beneficially differentiate valve assembly 400 from the previously described embodiments of the subject invention, as will be discussed in greater detail below with respect to FIGS. 42a and 42b.

Each electromagnet 450a-450d has a pair of associated magnetic pole plates that define, in pertinent part, the supply/return paths for the non-intersecting magnetic flux circuits of valve assembly 400. Electromagnet 450a includes pole plates 456a and 456b, while electromagnet 450b includes pole plates 456c and 456d. Similarly, electromagnet 450c includes pole plates 456e, 456f, while electromagnet 450d includes pole plates 456g, 456h. The pole plates 456a-456h are attached to the electromagnets 450a-450d using threaded fasteners 455 or the like.

Each pole plate 456a-456h has an associated latching arm 458a-458h for magnetically interacting with valve rotors 424a, 424b within the valve housings 406a, 406b, as described in more detail below with respect to FIGS. 43-45. As shown for example in FIGS. 42a and 42b, each electromagnet includes a wire coil 452 wound about a central core 454. In addition, electromagnets 450a-450d include respective wiring terminals 482a-482d for individually connecting the electromagnets 450a-450d to an electrical power source.

Figure 38:
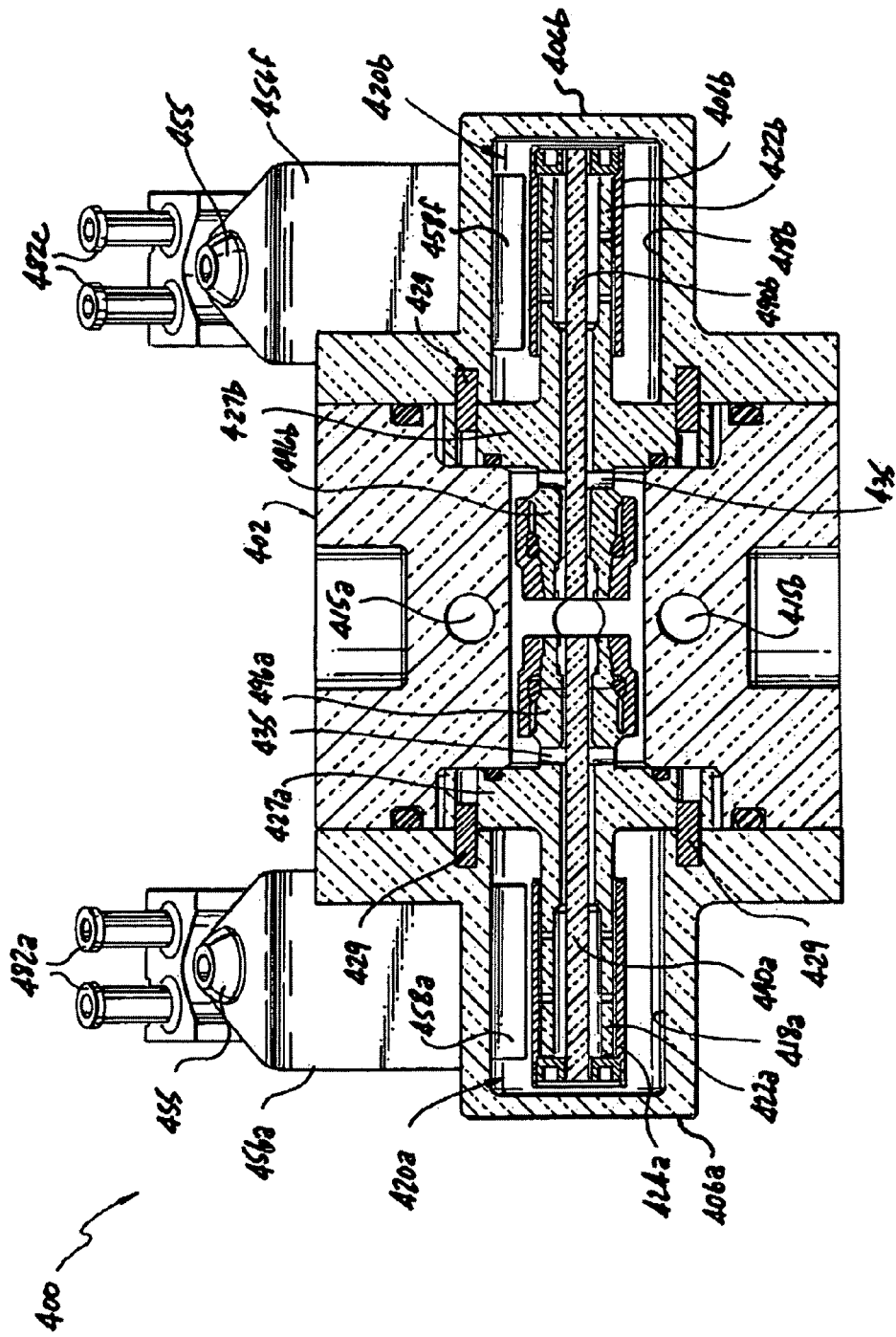
FIG. 38 is a cross-sectional view of the valve assembly of the subject invention taken along line 38-38 of FIG. 31.
Figure 39:
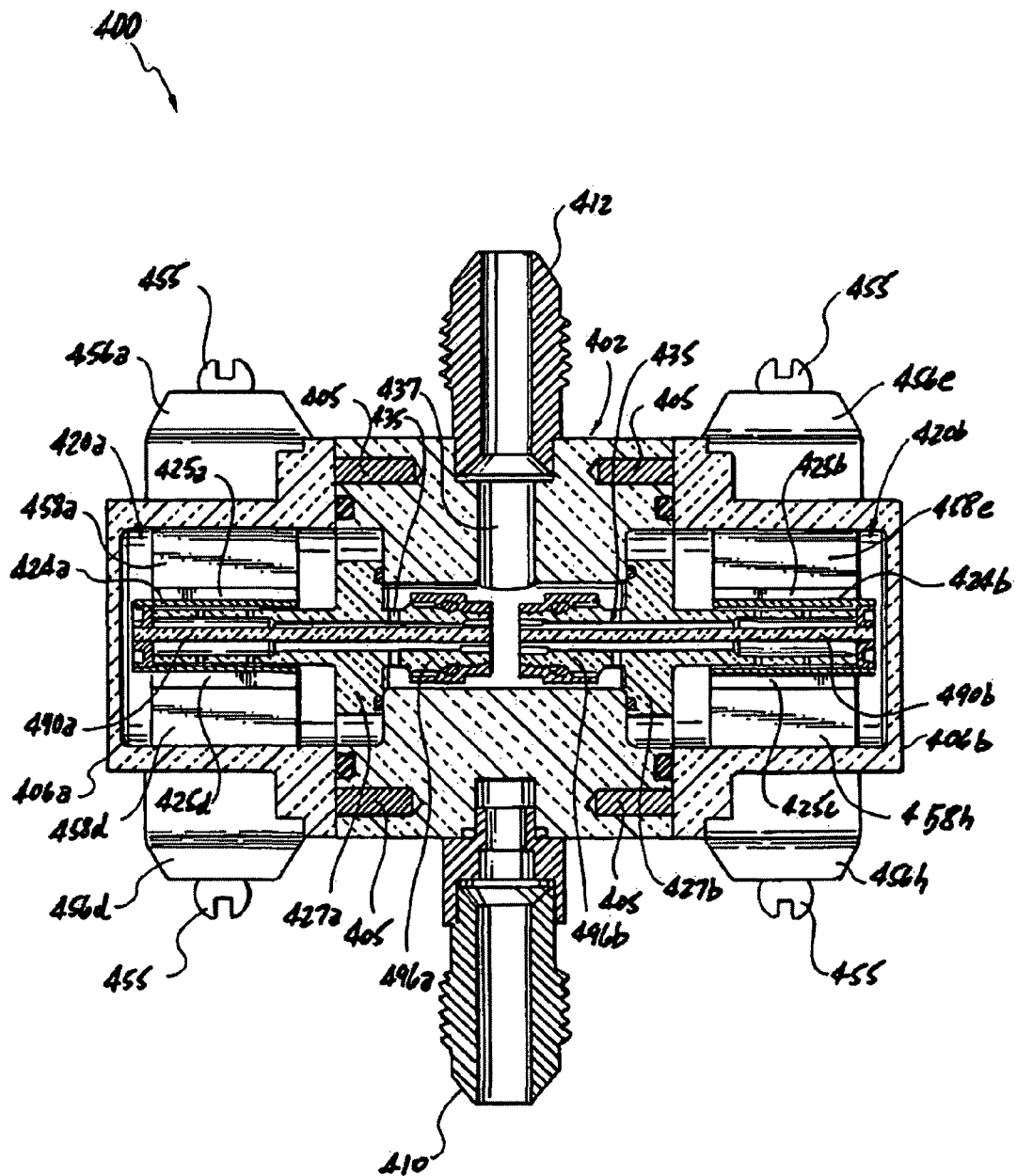
FIG. 39 is a cross-sectional view of the valve assembly of the subject invention taken along line 39-39 of FIG. 31.

As mentioned above, valve assembly 400 includes two valve units 420a and 420b. In this embodiment of the subject invention, the valve units are separated from one another on either side of the distribution block 402, such that their axis of rotation about the axially aligned valve shafts 422a, 422b are co-linear, as shown in FIGS. 38 and 39. In other words, the valve shafts are not arranged parallel to one another as in the previous embodiment of the invention, as shown for example in FIG. 21. This shaft arrangement allows the electromagnets associated with each rotor unit to be spaced substantially further apart from one another than in the previously described embodiments This minimizes the possibility of cross-talking between the magnetic flux circuits of each rotor unit, and ultimately increases the stability and predictability of valve operation.

Referring now to FIGS. 34-36, by way of example, there is illustrated valve unit 420a and the associated valve plate 404a. Valve unit 420a includes valve rotor 424a, which is mounted for rotational oscillatory movement on an elongated valve shaft 422a, which is best seen in FIG. 34a. Valve rotor 424 includes four elongated, radially outwardly extending winglets 425a-425d, which are arranged in diametrically opposed pairs, spaced 180° apart from each other. Winglets 425a and 425b form one pair and they are spaced 30° apart from one another. The second pair of winglets 425c and 425d are also spaced 30° apart from one another. The winglets of opposed pairs are spaced 60° apart. That is, winglets 425b and 425c are spaced 60° apart from one another, as are winglets 425a and 425d.

If the winglets were evenly spaced, the magnetic poles for the two flux circuits would be closer to one another, thus increasing the opportunity for the magnetic flux to pass from one circuit to the other. By spacing the two flux circuits further apart, the winglets of the same circuit are brought closer together. As a result, there is less chance for the magnetic flux from one circuit to leak to the other across the rotor. In addition, a shorter, less resistive path is provided for the magnetic flux of a single circuit, thus allowing for higher frequency response during operation.

As best seen in FIG. 35, the cylindrical body portion 432a of valve rotor 424a includes a plurality of circumferentially disposed, radially extending fuel feed apertures 442. Although they are all not shown in the figures, there are eight fuel feed apertures that are positioned to selectively deliver fuel into the central bore 426a of valve shaft 422a by way of an equal number of correspondingly positioned radial fuel ports 428 formed in valve shaft 422a. The selective alignment of these fuel metering ports (442, 428) depends upon the position of the rotor 424a with respect to the valve shaft 422a, as described below with respect to FIGS. 43-45.

Referring to FIGS. 35 and 36, valve rotor 424a is fastened to an elongated cylindrical torsion spring 490a that extends through the central bore 426 of valve shaft 422a. More particularly, the leading end of torsion spring 490a is brazed or otherwise fastened to an annular fitting 492a, which in turn, is secured within the central bore 433 of the cylindrical body portion 432a of valve rotor 424a by an annular locking ring 493a. Therefore, valve rotor 424a and torsion spring 490a will oscillate in conjunction with one another between magnetically latched positions. In operation, the oscillation of the conjoined torsion spring and valve rotor occurs at the natural resonant frequency of the system. This same structural arrangement is associated with valve unit 420b, as shown in FIGS. 38 and 39, wherein the valve rotor 424b is mounted for oscillatory rotation on valve shaft 422b under the influence of a torsion spring 490b.

Figure 40:
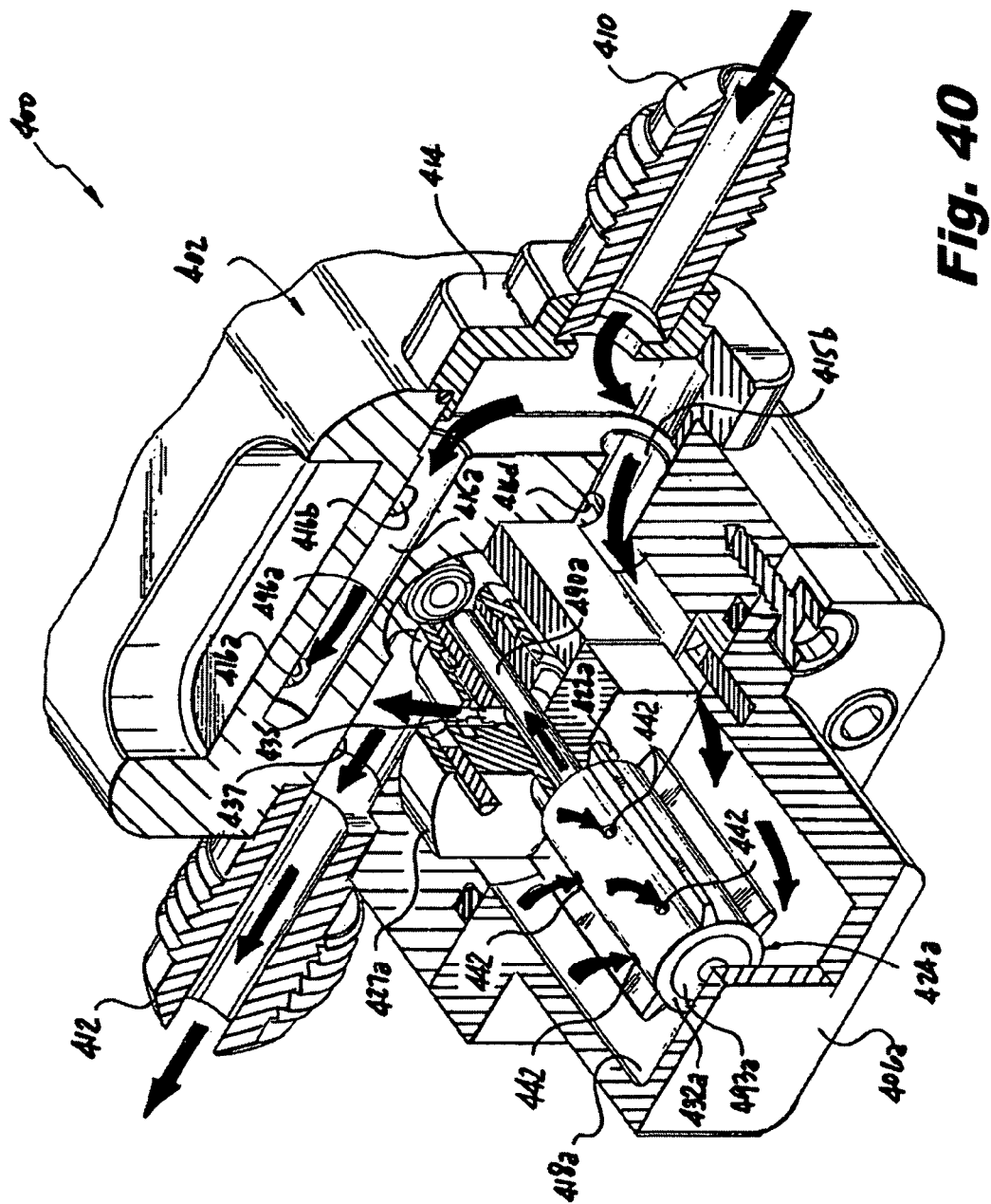
FIG. 40 is a perspective cross-sectional view of the of the valve assembly of the subject invention, illustrating the fuel flow path from the inlet, through the fuel distribution block, to the outlet, via the valve rotors.
Figure 41:
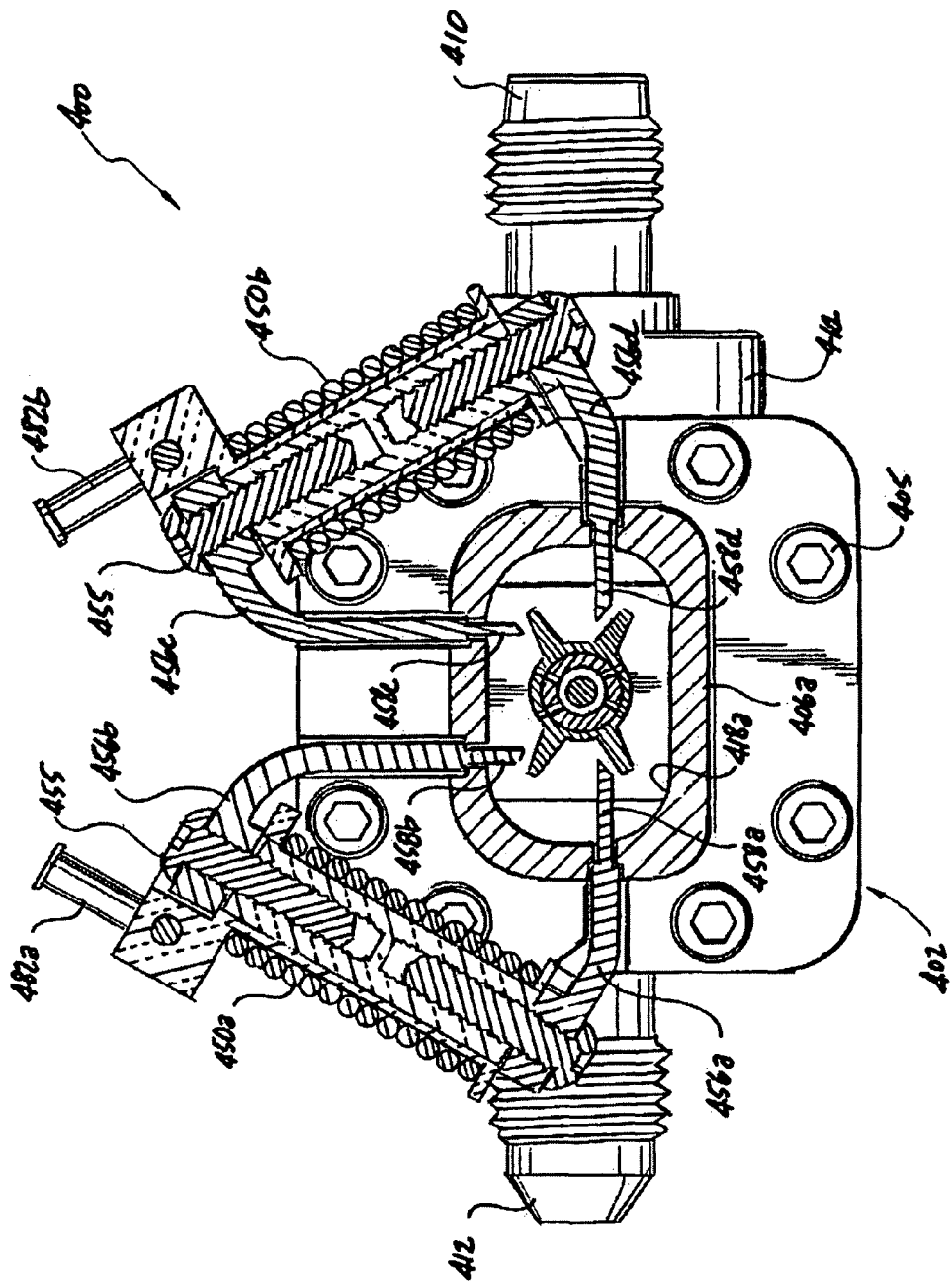
FIG. 41 is a cross-sectional view of the valve assembly of the subject invention taken along line 41-41 of FIG. 31, illustrating the interior of the valve housing with the rotor assembly disposed in a neutral position.

With continuing reference to FIGS. 35 and 36, by way of example, valve shaft 422a includes a fuel intake section 423a within which the radial fuel ports 428 are formed, a central support section 427a for securing the valve shaft 422a within the valve housing 406a and distribution block 402, and a fuel discharge section 429a having a plurality of circumferentially disposed radial outlet ports 435 for conveying fuel from the central bore 426a of valve shaft 422a back into fuel distribution bock 402, as discussed in more detail below with respect to FIG. 40.

Valve shaft 422a further includes a terminal bushing 494a that is thread ably associated with an adjustable collet nut 496a that compressively locks the trailing end of torsion spring 490a to the valve shaft 422a. The collet nut 496a is adapted and configured to facilitate the proper alignment of torsion spring 490a relative to valve rotor 424a so as to obtain the appropriate spring bias necessary to achieve the requisite oscillatory acceleration from one magnetically latched portion to another. A set of four alignment pins 429 are provided to secure the central support section 427a of valve shaft 422a within the fuel distribution block 402. An identical structural arrangement is associated with valve unit 420b, as best seen in FIGS. 38 and 39, wherein the valve shaft 422b includes a central support section 427b secured within distribution block 402 by a plurality of alignment pins 429, and wherein a collet nut 496b locks the trailing end of torsion spring 490b to valve shaft 422b to facilitate the proper alignment of torsion spring 490b relative to valve rotor 424b.

As mentioned above, the fuel distribution block 402 defines passages for conveying fuel from the inlet fitting 410 to the outlet fitting 412. These passages are best seen in FIGS. 37-40. In particular, the inlet fitting 410 communicates with a fuel splitter 414, which divides the inlet flow into two fuel circuits 415a, 415b, before passing the fuel into the distribution block 402. It is envisioned that an accumulator could be employed with or could wholly replace the fuel splitter 414 to dampen any harmful fuel oscillations generated upstream from the valve assembly 400.

Once the inlet flow is divided into the two fuel circuits 415a, 415b, it passes into the fuel distribution block 402, where each fuel circuit divides into two lateral fuel feed passages. That is, fuel circuit 415a divides into two upper lateral fuel feed passages 416a, 416b, while fuel circuit 415b divides into two lower lateral fuel feed passage 416c, 416d. The upper and lower lateral fuel feed passages 416a-416d deliver fuel into two large valve chambers 418a, 418b, which are formed in valve housings 406a, 406b, respectively. Fuel chamber 418a surrounds valve rotor 424a, while valve chamber 418b surrounds valve rotor 424b. The valve chambers 418a, 418b are in fluid communication with one another through the various fuel feed passages so as to maintain equal pressure on the outside of each rotor 424a, 424b, ensuring equal mass flow through each rotor assembly.

As best seen in FIG. 40 and by way of example, depending upon the position of the valve rotor 424a relative to the rotor shaft 422a, fuel from the valve chamber 418a flows through the fuel metering orifices defines by the fuel feed ports 442 in rotor body 432a and the fuel feed apertures 428 in valve shaft 422a. After passing through the metering orifices, fuel enters the central bore 426a of valve shaft 422a, flowing through the annular passages formed by the torsion spring 490a. Fuel exits the central bore 426 of valve shaft 422a through the circumferentially arranged radial outlet ports 435 formed in the discharge section 429a of valve shaft 422a. The radial outlet ports 435 of rotor assembly 424a, as well as rotor assembly 424b, feed a common outlet passage 437 that is in direct communication with the outlet fitting 412 of valve assembly 400. Fuel exits valve assembly 400 from the outlet fitting 412.

In operation, fuel is modulated by the rotational movement of valve rotors 424a, 424b about their respective valve shafts 422a, 422b, to open and close the fluid paths by aligning and un-aligning the fuel metering orifices (442, 428) in the rotors and valve shafts. As discussed in more detail below with respect to FIGS. 43-44, when a rotor 424a, 424b is in a neutral position (no torque applied) the metering orifices (442, 428) partially overlap, such that the flow rate through the valve unit is half the maximum flow rate, as shown for example in FIG. 41. When an electromagnet is energized, torque is applied to its respective rotor, causing the rotor to rotate until the winglets of the rotor make contact with the end of the magnetic poles plates associated therewith, as described in more detail below.

Figure 42A:
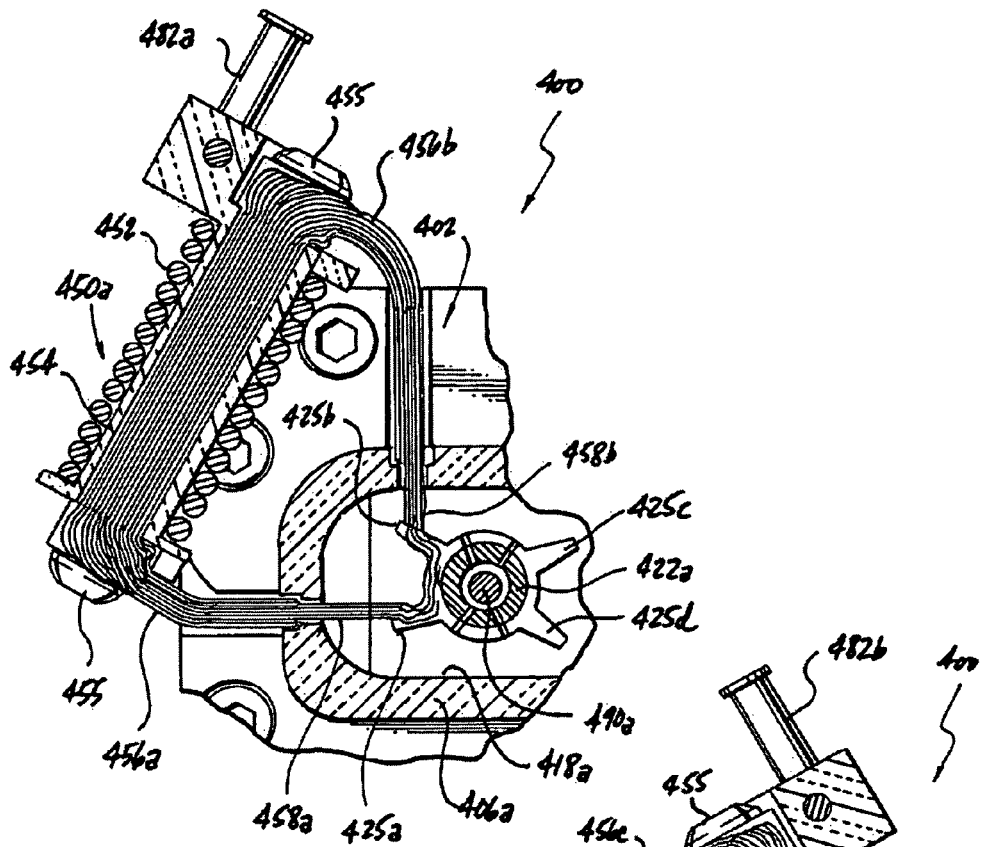
FIG. 42a illustrates the supply and return paths of magnetic flux for a circuit that exists on a first side of a valve rotor, when that valve rotor is magnetically latched in a fully open position.
Figure 42B:
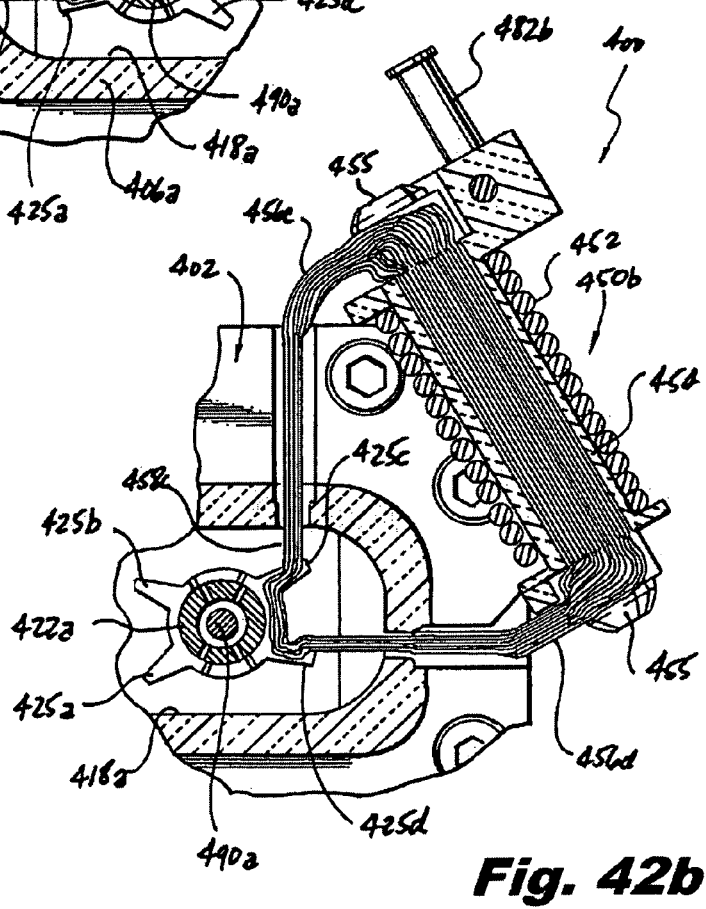
FIG. 42b illustrates the supply and return paths of magnetic flux for a circuit that exists on a second side of a valve rotor, when that valve rotor is magnetically latched in a fully closed position.

Referring to FIGS. 42a and 42b, each rotor unit (420a, 420b) has two magnetic circuits: one circuit to open the fluid path for maximum fuel flow and one to close the fluid path for no fuel flow. By way of example, as shown in FIG. 42a, a single magnetic flux circuit is defined by an electromagnetic coil 450a, a set of pole plates 456a, 456b and a portion of a rotor 424a defined by the adjacent winglets 425a, 425b and a section of the rotor body 432a therebetween. A second magnetic flux circuit on the opposite side of valve rotor 424a is shown in FIG. 42b. Here the magnetic flux circuit is defined by electromagnetic coil 450b, a set of pole plates 456c, 456d and a portion of a rotor 424a defined by the adjacent winglets 425c, 425d and a section of the rotor body 432a therebetween. Thus, the magnetic field defined by each circuit will extend through a side of the rotor without crossing the center plane of the rotor. As in the previous embodiments of the subject invention, the rotors (424a, 424b) are formed from a ferritic magnetic flux permeable material.

Figure 43:
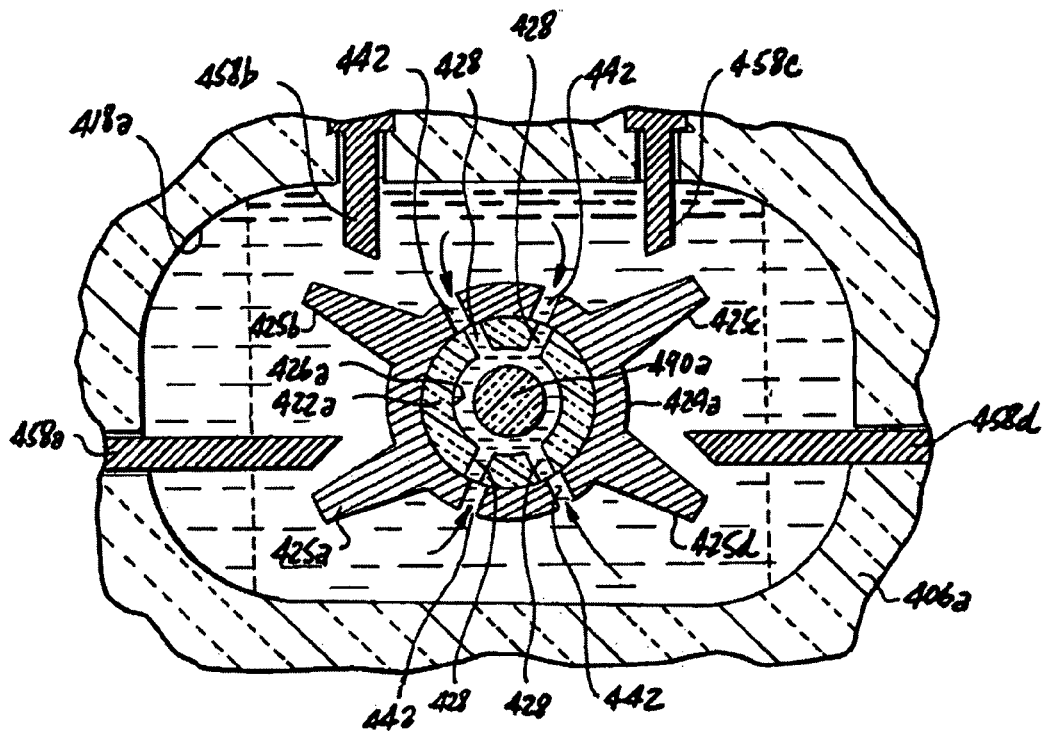
FIG. 43 is a cross-sectional view of the valve housing and rotor assembly shown in FIG. 41, with the rotor disposed in a neutral position.

Referring to FIG. 43, by way of example, the valve rotor 424a of valve unit 420a is depicted in an unlatched neutral position, which occurs when neither of the electromagnets 450a and 450b are energized. This condition corresponds to a mean fuel flow condition, wherein the valve rotor 424a is disposed in a partially open position. In this position, the fuel feed ports 442 of valve rotor 424a are partially aligned with the corresponding fuel inlet ports 428 in valve shaft 422a, so that fuel flows into the annular fuel passage defined between the torsion spring 490a and the interior wall of the fuel passage 426a.

Figure 44:
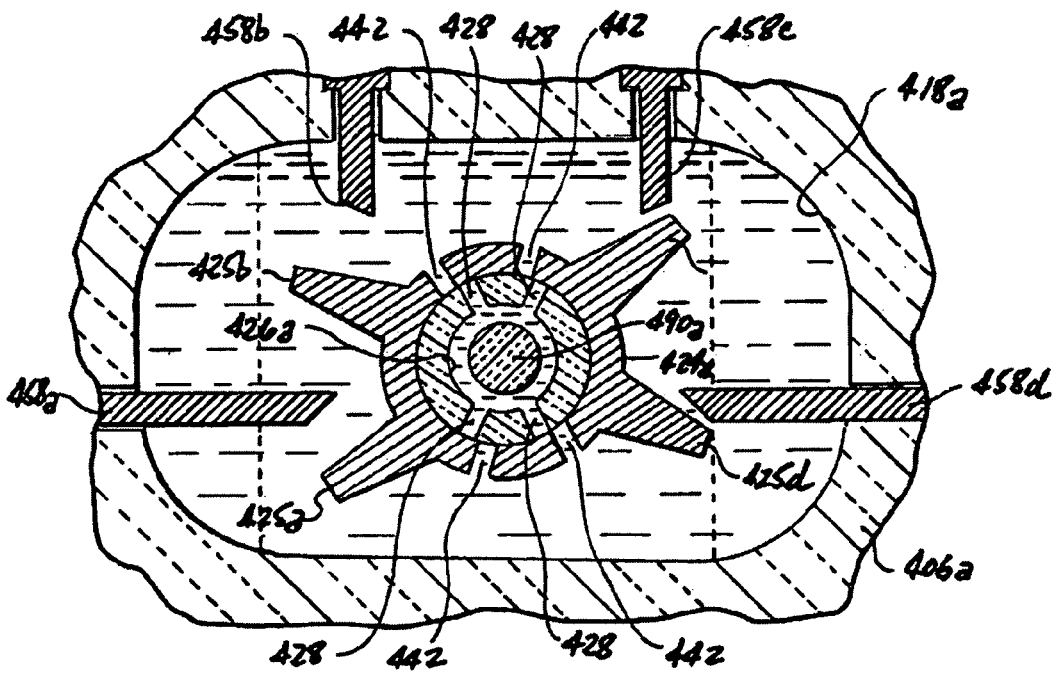
FIG. 44 is a cross-sectional view of the valve housing and rotor assembly shown in FIG. 41, with the valve rotor magnetically latched in a fully closed position, against the bias of the torsion spring, as shown in FIG. 42b.

When valve rotor 424a is in the fully closed position shown in FIG. 44, it is rotated in a first or counter-clockwise direction from the neutral position shown in FIG. 43. Accordingly, the fuel feed ports 442 of valve rotor 424a are moved completely out of alignment with the fuel inlet ports 428 in valve shaft 422a. In this position, electromagnet 450b is energized so that valve rotor 424a is magnetically latched with respect to the diagonally latching arms 458c and 458d of pole plates 456c and 456d.

When valve rotor 424a is magnetically latched in this closed position of FIG. 44, torsion spring 490a is twisted in a counter-clockwise direction, thus storing mechanical energy in the form of torque. The stored mechanical energy in the torsion spring 490a is sufficient to accelerate or otherwise rapidly move the valve rotor 424a toward the open position shown in FIG. 45 when the valve rotor 424a is unlatched from latching arms 458c and 458d and electromagnet 450a is concomitantly energized. In this instance, the torque generated by the twisted torsion spring 490a is insufficient however, to overcome the magnetic latching force holding the valve rotor 424a in the closed position of FIG. 44.

Figure 45:
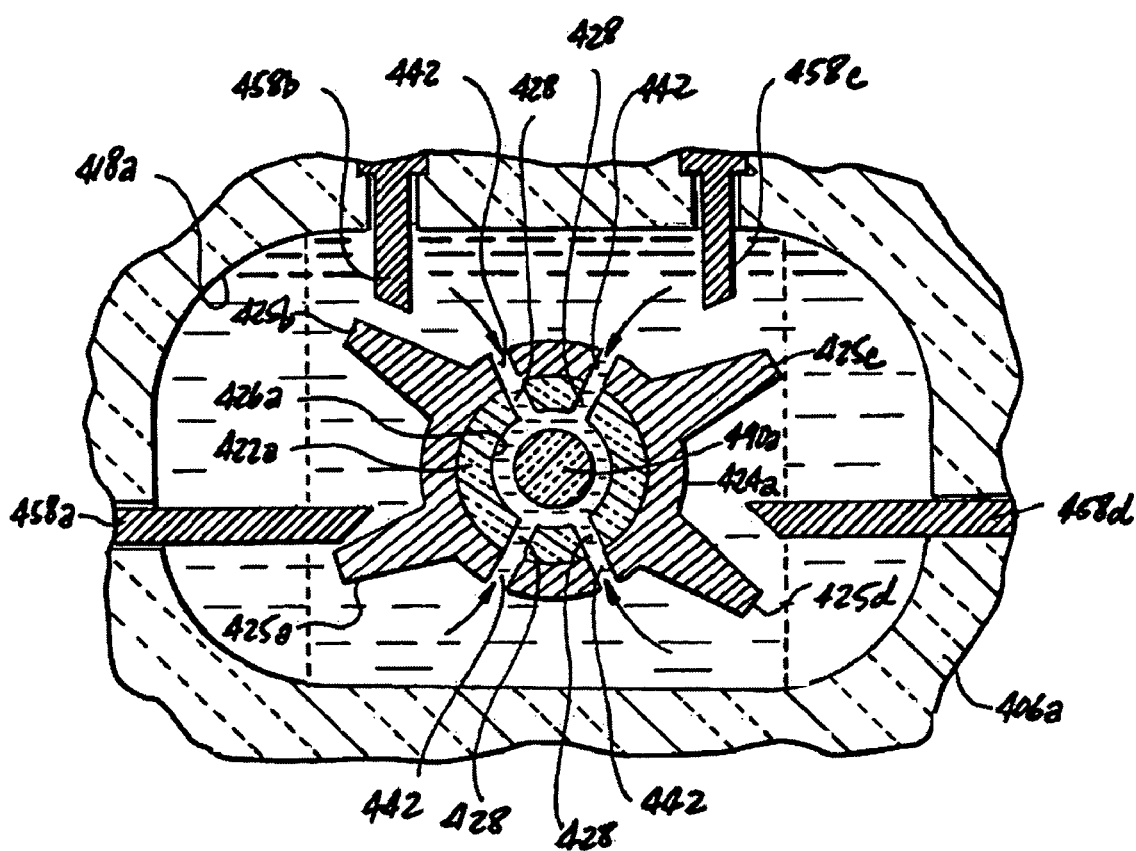

When valve rotor 424 is in the fully open position shown in FIG. 45, it is rotated in a second or clockwise direction from the neutral position shown in FIG. 43. Accordingly, the fuel feed ports 442 of valve rotor 424a are wholly aligned with the fuel inlet ports 428 in valve shaft 422a. In this position, electromagnets 450a is energized so that valve rotor 424a is magnetically latched with respect to latching arms 458a and 458b of pole plates 456a and 456b.

When valve rotor 424a is magnetically latched in this open position of FIG. 45, torsion spring 490a is twisted in a clockwise direction, thus storing mechanical energy in the form of torque. This stored mechanical energy in the torsion spring 490a is sufficient to rapidly move the valve rotor 424a toward the closed position shown in FIG. 44 when valve rotor 424a is unlatched from latching arms 458a and 458b and electromagnet 450b is concomitantly energized. In this instance, the torque generated by the twisted torsion spring 490a is insufficient however, to overcome the magnetic latching force holding the valve rotor 424a in the open position of FIG. 45.

In accordance with the subject invention, computer software commands the electronic drive device to alternately energize and de-energize opposing coils on each rotor (when the open coil is energized the closed coil is de-energized, and vice versa). The frequency at which this switching occurs is dictated by the computer software, as is the phase shift between the energizing/de-energizing of the coils of the opposing rotors in order to control the magnitude of the fuel modulation. For example, when the rotors (424a, 424b) are 180° out of phase (i.e., when one rotor is completely open and the other is completely closed) the net effect is that there is no modulation of the fuel flow. In contrast, when the rotors (424a, 424b) are modulated at 0° phase shift (i.e., when they are in phase) the modulation is at maximum.

Those skilled in the art will readily appreciate that the valve assembly of the present invention is designed to mitigate combustion instabilities by modulating the fuel flow rate to a fuel injector at a frequency equal to, but out of phase with the combustion instability, as detected by optical and/or acoustic sensors. There are presently no flow control devices in the prior art that are capable of generating sufficient amplitude of fuel modulation over the frequency range in which combustion instabilities occur. It is envisioned by the inventors that such a device should be positioned extremely close to the fuel injector and would likely be integrated into the injector body itself to minimize the volume of fuel between the exit of the valve and the exit of the fuel injector. The greater the volume of fuel between these two locations, the more damping of the fuel modulation, thereby reducing the amplitude of modulation and the systems ability to suppress a given combustion instability. A larger distance also increases the response delay between the valve's modulation and the modulation of fuel to the fuel injection location. Thus, it is important that the modulating valve of the subject invention be as close to the fuel injector inlet as possible. Because the valve assembly would be in close proximity to the compressor discharge section of a gas turbine engine, the device should be designed to operate reliably in a temperature range of about 200° C. to 500° C.

Although the subject invention, and each of the components thereof, has been described with respect to preferred embodiments, those skilled in the art will readily appreciate that changes and modifications may be made thereto without departing from the spirit and scope of the subject invention as defined by the appended claims.

What is claimed is:

1. A valve assembly for modulating fuel flow comprising:
a) a valve housing having an inlet section and an outlet section; and
b) first and second valve rotors disposed between the inlet section and the outlet section for modulating the flow of fuel through the valve housing, wherein each valve rotor is mounted for rotational movement about a respective valve shaft within the valve housing between first and second magnetically latched positions, and wherein the valve shafts are axially aligned with one another, wherein each valve rotor defines first and second magnetic flux paths for latching the respective valve rotor in the first and second magnetically latched positions, such that neither of the first and second magnetic flux paths crosses a center plane of the respective valve rotor therebetween.

2. A valve assembly as recited in claim 1, wherein each valve rotor is formed from a ferritic magnetic flux permeable material and has a pair of electromagnets associated therewith for alternately latching the associated valve rotor in the first and second magnetically latched positions.

3. A valve assembly as recited in claim 2, wherein each valve rotor and the pair of electromagnets associated therewith define first and second magnetic flux paths, and wherein neither magnetic flux path crosses through the center of the valve rotor.

4. A valve assembly as recited in claim 3, wherein each valve rotor has a generally cylindrical body portion and two pairs of diametrically opposed winglets that extend radially outwardly from the body portion to interact with the pair of electromagnets associated therewith.

5. A valve assembly for modulating fuel flow comprising:
a) a valve housing having an inlet section and an outlet section;
b) at least one valve rotor disposed between the inlet section and the outlet section for modulating fuel flow through the valve housing, wherein the at least one valve rotor is formed from a ferritic magnetic flux permeable material and is mounted for rotational movement within the valve housing between first and second magnetically latched positions; and
c) electromagnetic means for alternately latching the at least one valve rotor in the first and second magnetically latched positions, wherein the electromagnetic means and the at least one valve rotor define first and second magnetic flux paths, wherein the first magnetic flux path is located on a first side of the at least one valve rotor and the second magnetic flux path is located on a second side of the at least one valve rotor, such that the first and second magnetic flux paths do not intersect one another, wherein the at least one valve rotor has a generally cylindrical body portion and two pairs of diametrically opposed winglets that extend radially outwardly from the body portion to interact with the electromagnetic means.

6. A valve assembly as recited in claim 5, wherein the winglets of each pair of diametrically opposed winglets are spaced 30° apart from one another, and wherein circumferentially adjacent winglets of diametrically opposed winglet pairs are spaced 60° apart from one another.

7. A valve assembly as recited in claim 6, wherein the electromagnetic means includes first and second electromagnets for alternately latching the at least one valve rotor in the first and second magnetically latched positions.

8. A valve assembly as recited in claim 7, wherein the first magnetic flux path is defined at least in part by the first electromagnet and an adjacent pair of winglets of the at least one valve rotor, and the second magnetic flux path is defined at least in part by the second electromagnet and an adjacent pair of winglets of the at least one valve rotor.

9. A valve assembly for modulating fuel flow comprising:
a) a valve housing having an inlet section and an outlet section; and
b) first and second valve rotors disposed between the inlet section and the outlet section for modulating the flow of fuel through the valve housing, wherein each valve rotor is mounted for rotational movement about a respective valve shaft within the valve housing between first and second magnetically latched positions, and wherein the valve shafts are axially aligned with one another, wherein each valve rotor is formed from a ferritic magnetic flux permeable material and has a pair of electromagnets associated therewith for alternately latching the associated valve rotor in the first and second magnetically latched positions, wherein each valve rotor and the pair of electromagnets associated therewith define first and second magnetic flux paths, and wherein neither magnetic flux path crosses through the center of the valve rotor, wherein each valve rotor has a generally cylindrical body portion and two pairs of diametrically opposed winglets that extend radially outwardly from the body portion to interact with the pair of electromagnets associated therewith.

10. A valve assembly as recited in claim 9, wherein the winglets of each pair of diametrically opposed winglets are spaced 30° apart from one another, and wherein circumferentially adjacent winglets of diametrically opposed winglet pairs are spaced 60° apart from one another.

11. A valve assembly as recited in claim 10, wherein the first magnetic flux path of each valve rotor is defined at least in part by a first electromagnet and an adjacent pair of winglets of the valve rotor, and the second magnetic flux path of each rotor is defined at least in part by a second electromagnet and an adjacent pair of winglets of the valve rotor.

12. A valve assembly as recited in claim 11, wherein each valve rotor rotates in a first direction, under the influence of a torsion spring, to the first magnetically latched position when the first electromagnet associated therewith is energized and wherein each valve rotor rotates in a second direction, under the influence of the torsion spring, to the second magnetically latched position when the second electromagnet associated therewith is energized.

13. A valve assembly as recited in claim 12, wherein each valve rotor is adapted for movement into a neutral position, under the influence of the torsion spring, when the two electromagnets associated therewith are both de-energized.

14. A valve assembly for modulating fuel flow comprising:
a) a valve housing having an inlet section and an outlet section;
b) at least one valve rotor disposed between the inlet section and the outlet section for modulating fuel flow through the valve housing, wherein the at least one valve rotor is formed from a ferritic magnetic flux permeable material and is mounted for rotational movement within the valve housing between first and second magnetically latched positions; and
c) electromagnetic means for alternately latching the at least one valve rotor in the first and second magnetically latched positions, wherein the electromagnetic means and the at least one valve rotor define first and second magnetic flux paths, wherein the first magnetic flux path is located on a first side of the at least one valve rotor and the second magnetic flux path is located on a second side of the at least one valve rotor, such that the first and second magnetic flux paths do not intersect one another, and such that neither of the first and second magnetic flux paths crosses a center plane of the valve rotor therebetween.

15. A valve assembly as recited in claim 14, wherein the at least one valve rotor is mounted for oscillatory movement on a valve shaft disposed within the valve housing.

16. A valve assembly as recited in claim 15, further including a torsion spring for alternately moving the at least one valve rotor from one magnetically latched position to another magnetically latched position.

17. A valve assembly as recited in claim 16, wherein the torsion spring is disposed within an interior bore of the valve shaft.

18. A valve assembly as recited in claim 17, wherein the at least one valve rotor and the valve shaft have corresponding fuel ports arranged so that when the at least one valve rotor is in the first magnetically latched position the fuel ports of the at least one valve rotor are aligned with the fuel ports of the valve shaft, and when the at least one valve rotor is in the second magnetically latched position the fuel ports of the at least one valve rotor are not aligned with the fuel ports of the valve shaft.

19. A valve assembly as recited in claim 18, wherein the fuel ports in the valve shaft communicate with a fuel passage defined in the interior bore of the valve shaft so that when the at least one valve rotor is in the first magnetically latched position fuel flows into the fuel passage of the valve shaft, and when the at least one valve rotor is in the second magnetically latched position fuel does not flow into the fuel passage of the valve shaft.

20. A valve assembly as recited in claim 16, wherein the at least one valve rotor rotates in a first direction, under the influence of the torsion spring, to the first magnetically latched position when the first magnetic flux path is energized and wherein the valve rotor rotates in a second direction, under the influence of the torsion spring, to the second magnetically latched position when the second magnetic flux path is energized.

21. A valve assembly as recited in claim 16, wherein the at least one valve rotor is adapted for movement into a neutral position, under the influence of the torsion spring, when the electromagnetic means are de-energized.

22. A valve assembly as recited in claim 14, wherein the at least one valve rotor has a generally cylindrical body portion and two pairs of diametrically opposed winglets that extend radially outwardly from the body portion to interact with the electromagnetic means.

* * * * *